(12) United States Patent
Cummings

(10) Patent No.: US 11,985,522 B2
(45) Date of Patent: May 14, 2024

(54) USING ORCHESTRATORS FOR FALSE POSITIVE DETECTION AND ROOT CAUSE ANALYSIS

(71) Applicant: Mark Cummings, Atherton, CA (US)

(72) Inventor: Mark Cummings, Atherton, CA (US)

( * ) Notice: Subject to any disclaimer, the term of this patent is extended or adjusted under 35 U.S.C. 154(b) by 0 days.

(21) Appl. No.: 18/214,310

(22) Filed: Jun. 26, 2023

(65) Prior Publication Data

US 2023/0403577 A1 Dec. 14, 2023

Related U.S. Application Data

(63) Continuation of application No. 17/893,975, filed on Aug. 23, 2022, now Pat. No. 11,729,642, which is a
(Continued)

(51) Int. Cl.
*H04W 24/02* (2009.01)
*G06F 9/4401* (2018.01)
(Continued)

(52) U.S. Cl.
CPC ........... *H04W 24/02* (2013.01); *G06F 9/4411* (2013.01); *G06F 21/554* (2013.01); *G06F 30/327* (2020.01); *H04L 67/10* (2013.01); *H04L 67/51* (2022.05); *H04L 67/535* (2022.05); *H04W 8/22* (2013.01); *H04W 28/0215* (2013.01);
(Continued)

(58) Field of Classification Search
None
See application file for complete search history.

(56) References Cited

U.S. PATENT DOCUMENTS 5,555,286 A    9/1996    Tendler
5,751,909 A    5/1998    Gower
(Continued)

FOREIGN PATENT DOCUMENTS

CN    1762130    4/2006
CN    101013957    8/2007
(Continued)

OTHER PUBLICATIONS

Accellera, Unified Power Format (UPF) Standard. Version 1.0. Feb. 22, 2007.
(Continued)

*Primary Examiner* — Diane L Lo
(74) *Attorney, Agent, or Firm* — Van Pelt, Yi & James LLP

(57) ABSTRACT

An alert that is generated by a first orchestrator associated with a first subsystem or received from one or more distributed orchestrators that are associated with one or more corresponding subsystems is analyzed. The alert is triggered by a change in behavior determined by a behavioral analysis algorithm associated with the first orchestrator or corresponding behavior analysis algorithms associated with the one or more distributed orchestrators. It is determined whether an alert is indicative of a false positive based on an objective associated with the first orchestrator, an algorithm associated with the first orchestrator and one or more constraints associated with the first orchestrator. The alert is filtered in response to determining that the alert is indicative of the false positive.

26 Claims, 28 Drawing Sheets

Related U.S. Application Data continuation of application No. 16/898,082, filed on Jun. 10, 2020, now Pat. No. 11,477,667, which is a continuation-in-part of application No. 16/008,673, filed on Jun. 14, 2018, now Pat. No. 10,694,402.

(60) Provisional application No. 62/884,292, filed on Aug. 8, 2019.

(51) Int. Cl.
| | | |
|---|---|---|
| *G06F 21/55* | (2013.01) | |
| *G06F 30/327* | (2020.01) | |
| *H04L 67/10* | (2022.01) | |
| *H04L 67/50* | (2022.01) | |
| *H04L 67/51* | (2022.01) | |
| *H04W 8/22* | (2009.01) | |
| *H04W 24/00* | (2009.01) | |
| *H04W 28/02* | (2009.01) | |
| *H04W 48/16* | (2009.01) | |

(52) U.S. Cl.
CPC ....... *H04W 48/16* (2013.01); *G06F 2221/034* (2013.01); *H04W 24/00* (2013.01)

(56) References Cited

U.S. PATENT DOCUMENTS

| | | | |
|---|---|---|---|
| 5,966,531 | A | 10/1999 | Skeen |
| 5,970,490 | A | 10/1999 | Morgenstern |
| 6,141,565 | A | 10/2000 | Feuerstein |
| 6,438,594 | B1 | 8/2002 | Bowman-Amuah |
| 6,618,805 | B1 | 9/2003 | Kampe |
| 6,711,624 | B1 | 3/2004 | Narurkar |
| 6,976,160 | B1 | 12/2005 | Yin |
| 7,200,848 | B1 | 4/2007 | Slaughter |
| 7,263,551 | B2 | 8/2007 | Belfiore |
| 7,571,069 | B1 | 8/2009 | Farkas |
| 8,291,468 | B1 | 10/2012 | Chickering |
| 8,775,218 | B2 | 7/2014 | Burgoon, Jr. |
| 9,317,843 | B2 | 4/2016 | Bradley |
| 2003/0074443 | A1 | 4/2003 | Melaku |
| 2004/0111590 | A1 | 6/2004 | Klein |
| 2004/0203385 | A1 | 10/2004 | Narayanan |
| 2004/0267965 | A1 | 12/2004 | Vasudevan |
| 2005/0055196 | A1 | 3/2005 | Cohen |
| 2005/0096055 | A1 | 5/2005 | Colban |
| 2005/0157660 | A1 | 7/2005 | Mandato |
| 2005/0203892 | A1 | 9/2005 | Wesley |
| 2005/0251501 | A1 | 11/2005 | Phillips |
| 2006/0007919 | A1 | 1/2006 | Steinheider |
| 2006/0190904 | A1 | 8/2006 | Haji-Aghajani |
| 2006/0223443 | A1 | 10/2006 | Reudink |
| 2007/0055552 | A1 | 3/2007 | St Clair |
| 2007/0087738 | A1 | 4/2007 | Melkesetian |
| 2007/0130208 | A1 | 6/2007 | Bornhoevd |
| 2007/0152708 | A1 | 7/2007 | Madurawe |
| 2007/0210826 | A1 | 9/2007 | Madurawe |
| 2007/0220342 | A1 | 9/2007 | Vieira |
| 2007/0283317 | A1 | 12/2007 | Sadler |
| 2008/0046292 | A1 | 2/2008 | Myers |
| 2008/0062871 | A1 | 3/2008 | Grayson |
| 2008/0068989 | A1 | 3/2008 | Wyk |
| 2008/0130645 | A1* | 6/2008 | Deshpande ............. H04L 45/28 370/392 |
| 2009/0070728 | A1 | 3/2009 | Solomon |
| 2009/0080408 | A1 | 3/2009 | Natoli |
| 2009/0100178 | A1 | 4/2009 | Gonzales |
| 2009/0125497 | A1 | 5/2009 | Jiang |
| 2009/0257351 | A1 | 10/2009 | Hande |
| 2009/0319685 | A1 | 12/2009 | Martin |
| 2010/0014533 | A1 | 1/2010 | Hirano |
| 2010/0056215 | A1 | 3/2010 | Gorokhov |
| 2010/0063930 | A1 | 3/2010 | Kenedy |
| 2010/0125664 | A1 | 5/2010 | Hadar |
| 2010/0191765 | A1 | 7/2010 | Gan |
| 2010/0192120 | A1 | 7/2010 | Raleigh |
| 2010/0202391 | A1 | 8/2010 | Palanki |
| 2011/0007708 | A1 | 1/2011 | Hapsari |
| 2011/0016214 | A1 | 1/2011 | Jackson |
| 2011/0055396 | A1 | 3/2011 | Dehaan |
| 2011/0086636 | A1 | 4/2011 | Lin |
| 2011/0116480 | A1 | 5/2011 | Li |
| 2011/0137805 | A1 | 6/2011 | Brookbanks |
| 2011/0138060 | A1 | 6/2011 | Purkayastha |
| 2011/0145153 | A1 | 6/2011 | Dawson |
| 2011/0145209 | A1 | 6/2011 | Kahn |
| 2011/0153854 | A1 | 6/2011 | Chickering |
| 2011/0182253 | A1 | 7/2011 | Shekalim |
| 2011/0246236 | A1 | 10/2011 | Green, III |
| 2011/0250911 | A1 | 10/2011 | Xu |
| 2011/0276713 | A1 | 11/2011 | Brand |
| 2012/0033621 | A1 | 2/2012 | Mueck |
| 2012/0096525 | A1 | 4/2012 | Bolgert |
| 2012/0116782 | A1 | 5/2012 | Punnoose |
| 2012/0239685 | A1 | 9/2012 | Kahn |
| 2013/0237182 | A1 | 9/2013 | Schlager |
| 2013/0298192 | A1 | 11/2013 | Kumar |
| 2015/0288709 | A1 | 10/2015 | Singhal |
| 2016/0081055 | A1 | 3/2016 | Chika |
| 2016/0119379 | A1 | 4/2016 | Nadkarni |
| 2016/0253425 | A1 | 9/2016 | Stoops |
| 2016/0259902 | A1 | 9/2016 | Feldman |
| 2016/0295372 | A1 | 10/2016 | Kapicioglu |
| 2017/0012870 | A1 | 1/2017 | Blair |
| 2017/0063656 | A1 | 3/2017 | Vidyarthi |
| 2017/0103215 | A1 | 4/2017 | Mahaffey |
| 2017/0147722 | A1 | 5/2017 | Greenwood |
| 2018/0189731 | A1* | 7/2018 | Nossam ............... G06Q 10/083 |
| 2018/0299495 | A1 | 10/2018 | Abbas |
| 2018/0367561 | A1 | 12/2018 | Givental |
| 2019/0327160 | A1* | 10/2019 | Sivaprakasam ..... G06F 11/3672 |

FOREIGN PATENT DOCUMENTS

| | | |
|---|---|---|
| CN | 101616007 | 12/2009 |
| EP | 1560451 | 10/2011 |
| EP | 2947915 | 11/2015 |
| WO | 2014110281 | 7/2014 |
| WO | 2014200493 | 12/2014 |
| WO | 2018093643 | 5/2018 |
| WO | 2018099767 | 6/2018 |

OTHER PUBLICATIONS

Amba Design Kit. Revision: r3p0. Technical Reference Manual. ARM DDI 0243C. Copyright (c) 2003, 2007.

Amba Designer ADR-400. Revision: r3p1. User Guide ARM DUI 0333K. Copyright (c) 2006-2010, 2011 ARM.

Anupam Bakshi, IDesignSpec (TM) Don't Fear Change, Embrace it. Agnisys Inc. May 1, 2008.

Author Unknown, IEEE Standard for IP-XACT, Standard Structure for Packaging, Integrating, and Reusing IP within Tool Flows. IEEE Computer Society and the IEE Standards Association Corporate Advisory Group. Sponsored by the Design Automation Standards Committee. Feb. 18, 2010.

Author Unknown, SDR Conference 2009. V1 4.

Author Unknown, Software Defined Radio Forum. SDR Forum. Use Cases for MLM Language in Modem Wireless Networks. SDRF-08-P-0009-V1.0.0. Jan. 28, 2009.

Author Unknown, SystemRDL V1.0: A Specification for a Register Description Language. Prepared by the Register Description Working Group of The Spirit Consortium. Mar. 24, 2009.

Author Unknown, VMM Register Abstraction Layer User Guide. Jul. 2011.

Cooklev et al., Networking Description Language for Ubiquitous Cognitive Networking. SDR Technical Conference, Washington, DC, Oct. 2008.

Cummings et al., Via Commercial Wireless Metalanguage Scenario. SDR Technical Conference. 2007.

(56) References Cited

OTHER PUBLICATIONS

Cummings et al. IEEE 802.21: The Leading Edge of a Larger Challenge. 2008.
Cummings et al., ECSG Adhoc Use Case Tutorial. IEEE 802 Executive Committee Study Group on TV White Spaces—Adhoc Use Case Sub-Group. Jan. 20, 2009.
Cummings et al., en Via. The Role of a Metalanguage in the Context of Cognitive Radio Lifecycle Support. SDR Technical Conference. Orlando, Nov. 16, 2006.
Cummings et al., Activities of SDR Forum MLM Working Group on a Language for Advanced Communication Systems Applications. SDR Technical Conference, Washington, DC, Oct. 2008.
Cummings et al., Changing Metalanguage Landscape. IPFW Indiana University—Purdue University Fort Wayne. SDR Conference 2009.
Cummings et al., Changing Metalanguage Landscape. Proceedings of the SDR '09 Technical Conference and Product Exposition, Copyright (c) 2009 SDR Form, Inc.
Cummings et al., Commercial Wireless Metalanguage Scenario. SDR Technical Conference. v13. 2007.
Cummings et al., en Via II. Perspectives on a Meta Language for Configurable Wireless Systems. SDR Forum Technical Conference Phoenix, Nov. 2004.
Cummings et al., en Via. Commercial Wireless Metalanguage Scenario. SDR Technical Conference, Denver, CO. Nov. 2007.
Cummings et al., The Role of a Metalanguage in the Context of Cognitive Radio Lifecycle Support. SDR Technical Conference. 2006.
Dave Murray, duolog technologies. Using IP-XPACT (TM) in Complex SoC i/o Integration and SoC Register Management. IP-XACT Users Group: Session 1 (In association with Texas Instruments). Jul. 8, 2008.
Fette et al., Next-Generation Design Issued in Communications. Portable Design. Mar. 2008.
G.V. Tsoulos et al., Research Gate, Dynamic Wireless Network Shaping via Moving Cells: The Nomadic Nodes Case, Jan. 2017.
Google, Inc., Authorized Ex Parte Contract—Unlicensed Operation in the TV Broadcast Bands (ET Docket No. 04-186). Apr. 10, 2009.
Hwang et al., A Moving Cell Bearer Management Architecture for LTE-Advanced System, Wireless Transmission Research Section, Electronics and Telecommunications Research Institute, Korea, Jul. 1-3, 2015.
Kokar et al., Towards a Unified Policy Language for Future Communication Networks: A Process. Dyspan Conference, Chicago Oct. 2008.
Kokar et al., Towards a Unified Policy Language for Future Communication Networks: A Process. DySpan. NDL v10. 2008.
Lawton, G. New Protocol Improves Interaction among Networked Devices and Applications. Computing Now [online], Jul. 2010 [retrieved on Feb. 23, 2012]. Retrieved from the Internet: <URL: http//www.computer.org/portal/web/computingnow/archive/news065>.
Mark Cummings, Creating a New Wireless World. EE Times. Aug. 23, 2004.
Mark Cummings, Commercial SDR Drivers & Status SDR Forum Technical Plenary. RFco Semiconductor. Toronto. Jun. 15, 2004.
Mark Cummings, en Via II. Managing Complexity as Networks Evolve. Future Wireless Workshop. SDR Form. Seoul, South Korea. Sep. 13, 2004.
Mark Cummings, en Via II. SDR Forum: Commercial SDR Initiative. GSPx, Sep. 30, 2004.
Mark Cummings, IEEE P802.19 Wireless Coexistence. Directions to a TV White Space Coexistence Mechanisms Par. Aug. 17, 2009.
Mark Cummings, Status and Future Directions of Technology for Software Defined Radios and Implications for Regulators. Symposium on Download Security and Regulatory Issues. RFco. Tokyo. Apr. 14, 2003.
Mark Cummings, System of Systems Joint E2R / SDR Forum Workshop. RFco Semiconductor. Mainz. Apr. 20, 2004.
Mark Cummings, Vision, Trend and Challenges of SDR. RFco. ITU Workshop. Geneva. Dec. 3, 2003.
Mark Cummings. Alternatives For Coexistence Mechanisms in White Space. doc.: IEEE 802.19-09/0044r0. Jul. 7, 2009.
Matthew Sherman. TV Whitespace Tutorial Intro. IEEE 802 Executive Committee Study Group on TV White Spaces. Mar. 10, 2009.
Paine et al., IEEE P802.19. Wireless Coexistence. WhiteSpace Coexistence Ue Cases. Jul. 2009.
Patrick Mannion, Cognitive Radio Hailed as Next Big Thing: in Wireless. EE Times. Aug. 23, 2004.
Subrahmanyam et al., Perspectives on a Metalanguage for Configurable Wireless Systems. SDR Technical Conference. 2004.
Synopsys, Inc., An Introduction to the VMM Register Abstraction Layer. SOCentral. Jul. 30, 2007.
Trusted Computing Group, TCG Trusted Network Connect, TNC IF-MAP Binding for SOAP, Specification Version 1.1, Revision 5, May 18, 2009.
Visarius et al. 'Generic Integration infrastructure for IP-based design processes and tools with a unified XML format. Integration, the VLSI Journal—Special issue: IP and design reuse', vol. 37, Issue 4. Published Sep. 2004 [online] Retrieved from the Internet <URL:http://www.sciencedirect.com/science/article/pii/S016792600400033>.
Wagner et al., 'Strategies for the integration of hardware and software IP components in embedded systems-on-chip'. In Integration, the VLSI Journal, vol. 37. Published Sep. 2004 [online] Retrieved from the Internet <URL http://www.sciencedirect.com/science/article/pii/S0167926003001093>.
Wirthlin et al. Future Field Programmable Gate Array (FPGA) Design Methodologies and Tool Flows. Report AFRL-RY-WP-TR-2008-1228 of the Air Force Research Laboratory [online]. Published Jul. 2008. [retrieved on Mar. 8, 2012] Retrieved from the Internet <URL:http://www.dtic.mil/cgi-bin/GetTRDoc?AD=ADA492273&Location=U2&doc=GetTRDoc.pdf>.
Wirthlin et al. 'OpenFPGA CoreLib core library interoperability effort'. In Journal of Parallel Computing, vol. 34, issue 4-5 [online]. Published May 2008. [retrieved on Mar. 8, 2012] Retrieved from the Internet <URL:http://ce-serv.et.tudelft.nl/publicationfiles/1605_1002_OpenFPGA.pdf>.

\* cited by examiner

USING ORCHESTRATORS FOR FALSE POSITIVE DETECTION AND ROOT CAUSE ANALYSIS

CROSS REFERENCE TO OTHER APPLICATIONS

This application is a continuation of U.S. patent application Ser. No. 17/893,975 entitled USING ORCHESTRATORS FOR FALSE POSITIVE DETECTION AND ROOT CAUSE ANALYSIS filed Aug. 23, 2022, which is a continuation of U.S. patent application Ser. No. 16/898,082, now U.S. Pat. No. 11,477,667, entitled USING ORCHESTRATORS FOR FALSE POSITIVE DETECTION AND ROOT CAUSE ANALYSIS filed Jun. 10, 2020, which claims priority to U.S. Provisional Patent Application No. 62/884,292 entitled USING ORCHESTRATORS FOR FALSE POSITIVE DETECTION AND ROOT CAUSE ANALYSIS filed Aug. 8, 2019, each of which is incorporated herein by reference for all purposes.

This application is a continuation of U.S. patent application Ser. No. 17/893,975 entitled USING ORCHESTRATORS FOR FALSE POSITIVE DETECTION AND ROOT CAUSE ANALYSIS filed Aug. 23, 2022, which is a continuation of U.S. patent application Ser. No. 16/898,082 entitled USING ORCHESTRATORS FOR FALSE POSITIVE DETECTION AND ROOT CAUSE ANALYSIS filed Jun. 10, 2020, which is a continuation in part of U.S. patent application Ser. No. 16/008,673, now U.S. Pat. No. 10,694,402, entitled SECURITY ORCHESTRATION AND NETWORK IMMUNE SYSTEM DEPLOYMENT FRAMEWORK filed Jun. 14, 2018, each of which is incorporated herein by reference for all purposes.

BACKGROUND OF THE INVENTION

Most information systems today are comprised of combinations of computers and communications systems. The daily lives of people today are ever more dependent on these information systems. Problems may occur in such information systems, either naturally occurring or resulting from attacks. There are two specific aspects of dealing with these problems that have a major impact on reliability, availability, robustness, affordability, and security of these information systems. These two aspects are commonly referred to as false positive filtering and root cause analysis.

False positive filtering and root cause analysis have been performed for quite some time. However, systems have greatly accelerated the increase in scale, complexity and volatility, which makes it difficult to perform false positive filtering and root cause analysis. This is true of a full range of information systems. This is also true at any level of granularity in information systems from inside semiconductors, inside memory systems, inside communications systems, inside computers, inside networks, inside record systems, inside Clouds, etc. All consist of layers of legacy subsystems, incompatible subsystems, vendor proprietary solutions, etc. These often-incompatible subsystems in layer upon layer are one cause of the complexity. The speed of adding new layers and making changes is what generates the volatility. The "digitization" of the world is what is creating the scale problem.

These problems may be illustrated through a couple of examples. In a first example, the Internet archive is taking snapshots of the entire Web and storing them in a single memory system. This is creating file sizes not seen outside of classified systems. These file sizes were never anticipated by the people who wrote the drivers for the memory devices holding these files. One of the results is that the Internet Archive is discovering error conditions caused by these drivers that have not been seen before.

In a second example, until the early 2000s, Intel Corporation had a policy that only three people in the corporation were allowed to know the full architecture of a processor chip. This was done to protect the corporation's intellectual property. Then, the scale, complexity and volatility became so great that it was impossible for anybody to understand the full architecture of a processor chip and the company discontinued all the controls it had previously enforced.

The scale, complexity, and volatility problems described above are also true of many other types of systems including: electrical grids, multimodal transportation systems, mechanical systems, and even manual processes and procedures. For example, electrical grids were designed to have a very few very large sources of power. Now, they are faced with a large and growing number of small sustainable sources. At the same time, climate change is forcing power companies to confront new operational requirements to prevent fires. This, while the world is trying to move from fossil fuels to electricity.

Airliners now have so many sensors that it is said that on a transatlantic flight, the cost of acquiring, communicating, storing, and processing all the data is greater than the cost of the fuel. Freight systems driven by globalization and on-line shopping are seeing a combination of dramatic increases in volume, from an increasing number and types of sources, with rapidly increasing demands for lowering costs while guaranteeing on time delivery.

The digitization of medical and health systems is producing ever increasing amounts of data. But, it is getting more and more difficult to move and combine it. The move to Smart Cities is confronting similar problems with incompatible data that needs to be combined.

Against this background, existing ways of doing false positive filtering and root cause analysis are struggling. These approaches can deal with scale, or complexity, or volatility but struggle to deal with the combination of all three. Generally speaking, well-trained staff can be very good at these tasks. They are particularly good at identifying dynamic problems and determining dynamic solutions to them. But, they can only handle a limited number in a unit of time. With today's scale the numbers are quite large while response time requirements make the units of time quite small. Thus, the staff is unable to identify and solve all of the dynamic problems within the unit of time. Furthermore, the complexity makes it from difficult to impossible to have staff trained in every aspect limiting the availability and functionality of staff. This limitation can lead to staff relying on hunches built on underlying prejudices, reliance on 'playbooks' that can lead to 'fat finger failures', and inaction based on fear of these two. So, manual systems can face potentially catastrophic outcomes.

On the other hand, today's centralized automated systems can handle large amounts of data. Unfortunately, the amounts of data being generated are so large that it can take hours, days, or longer to find a particular pattern in the sea of data. Artificial intelligence (AI) has helped with identifying the patterns to look for, but it can take weeks to train an AI system to identify new patterns and then it faces delays searching the sea of data. So, these systems face challenges in finding dynamic problems and responding with dynamic solutions.

These delays can be deadly. For example, on a flight from San Francisco to Amsterdam in 2019, an airplane lost cabin pressure and performed an emergency decent to 9,000 feet. The pilot flew around in circles for 1.5 hours talking to airline flight operations, and the airplane manufacturer's emergency services. Those discussions over that 1.5 hours resulted in a decision to fly at 9,000 feet altitude to Newark airport ~2 hours away. Thirty minutes into that two hours, the oxygen masks deployed. This should not have happened at 9,000 feet. But the two operations staffs performing root cause analysis determined that a mechanical problem with the two air compressors was the root cause for the lost cabin pressure and a delayed reaction by the oxygen masks was a result of the mechanical problem. The plane made an emergency landing in Bangor, Maine, which the pilot did not believe was necessary. After the plane landed, passengers were unable to get their checked luggage because the plane had lost hydraulics. Hydraulics are how the control surfaces on the plane are put into and maintained in the desired configuration. Without hydraulics, it is between extremely difficult and impossible to prevent a catastrophic crash.

The plane example is an example of a root cause analysis failure. The plane has two jet engines, each with a corresponding generator that delivers power to a centralized power management system. The air compressors and hydraulic systems are driven by electric motors. The hydraulics system, however, has a pressure tank to act as a buffer against large short duration demands for pressure. Changes in control surfaces, etc. draw on the pressure in the tank and the electrical pump replenishes the tank. It never occurred to airline flight operations nor manufacturer emergency support that there could be a problem in the electrical power management system. Their prejudices told them to look for mechanical trouble with the air compressors. Even when the oxygen masks deployed, they still looked for a mechanical fault in the air compressors and told themselves that the masks deploying was just a delayed reaction to the air pressure drop. In reality, what happened was that the electrical power management system was failing and as it failed it reduced electrical power to various parts of the plane. When the hydraulic pump stopped working, the pilot only had the pressure in the tank to fly and land the plane. By the time the plane was on the ground, all that pressure was gone. Another few minutes of flight time would have caused a catastrophic crash.

In this airplane example, time is an important parameter. The root cause analysis system must find the right answer in the right amount of time to keep the plane from crashing. The root cause analysis failure was a result of the fact that both airline flight operations staff and manufacturer emergency support staff acted based on their prejudices. The central site root cause analysis systems they were using were not able to find the true problem in time, because they had to search through the airplane's data lake and use the patterns their system had been trained to detect. The failure of the electrical power management system does not happen frequently enough that there was a predefined pattern that the AI system could use to match it against. Given the complexity of modern airplanes, and the combinations and permutations there are innumerable potential system failures that do not have patterns. The result was that the crew and passengers were in mortal danger because the combination of staff and AI tools could not find the root cause fast enough to save the plane. It was only luck that there was enough pressure in the hydraulic tank to land the plane.

Two recent lab tests on false positives and false negatives provide illustrative examples of other types of problems with scale, complexity, and volatility. Both false negatives and false positives are generally subsumed under the title of false positives. One lab test and audit of a particular organization's set of cyber security systems using extensive ex post facto analysis (that could not be completed in production for lack of time, human and computer resources, etc.) was performed. It found that those security systems had generated ~10,000 alerts in one week of which all were considered false positives and on which no action was taken on any of the alerts. With the tools available to that lab, they found that there were 12 actual security events of which 7 were actionable.

In another lab test, all the input data that went to an industry leading cyber security product was collected along with all outputs of that system. Applying extensive ex post facto analysis, it was found that the security system had identified all the static attacks and applied all the static solutions. However, it was not able to find the dynamic attacks. That is, the type of attack that changes its mode of operation quickly so that there is no pattern that can be matched from one attack to another. The dynamic attacks that were found in the months of detailed analysis by cyber security and data analysis Ph.D.'s turned out to be 70% of the attacks.

In cyber security systems, time is also an important parameter. In 2019, the US Department of Defense published a report that said that if one small portion of an information system was successfully penetrated by a sophisticated attacker, the system had 19 minutes to find the attack and perform remediation or the entire information system would be compromised.

A common response to the problems described above has been the creation of specialized tools to solve each special type of problem. This can be called the 1,000 tools for the 1,000 problems approach. Examples in the cyber security space include special tools to protect against ransomware, or specialized tools to protect against certain types of email attacks, etc. Each specialized tool doing its own false positive filtering and root cause analysis. In the short term, the proliferation of these specialized tools may seem to provide benefits, but they actually increase the scale, complexity, and volatility problems.

Timeliness has been described above. But in addition to solving specific problems within specific tight time constraints, there is a bigger timeliness problem—keeping the whole system in sync. That is, not just taking the one action required to address the immediate action, but making sure that the whole system stays in sync by taking actions elsewhere necessary to maintain this synchronization.

This leads to the final and most comprehensive need. That is maintaining these large complex volatile systems that operate in a dynamic environment configured in such a fashion that they do the best possible job of meeting the overall objectives of the system as a whole. That is, the system does what it was intended to do in the way it was intended to do it and does not do what it was not intended to do. Root cause and false positive analysis systems in a wide range of types of applications are struggling with scale (e.g., number of components/subsystems and the volume of data), complexity (e.g., increasing number of incompatible layers and types of components/sub systems), and volatility (e.g., things changing rapidly making the use of patterns difficult (dynamic problems needing dynamic solutions) plus shrinking critical time frames.

BRIEF DESCRIPTION OF THE DRAWINGS

Various embodiments of the invention are disclosed in the following detailed description and the accompanying drawings.

DETAILED DESCRIPTION

Figure 1A:
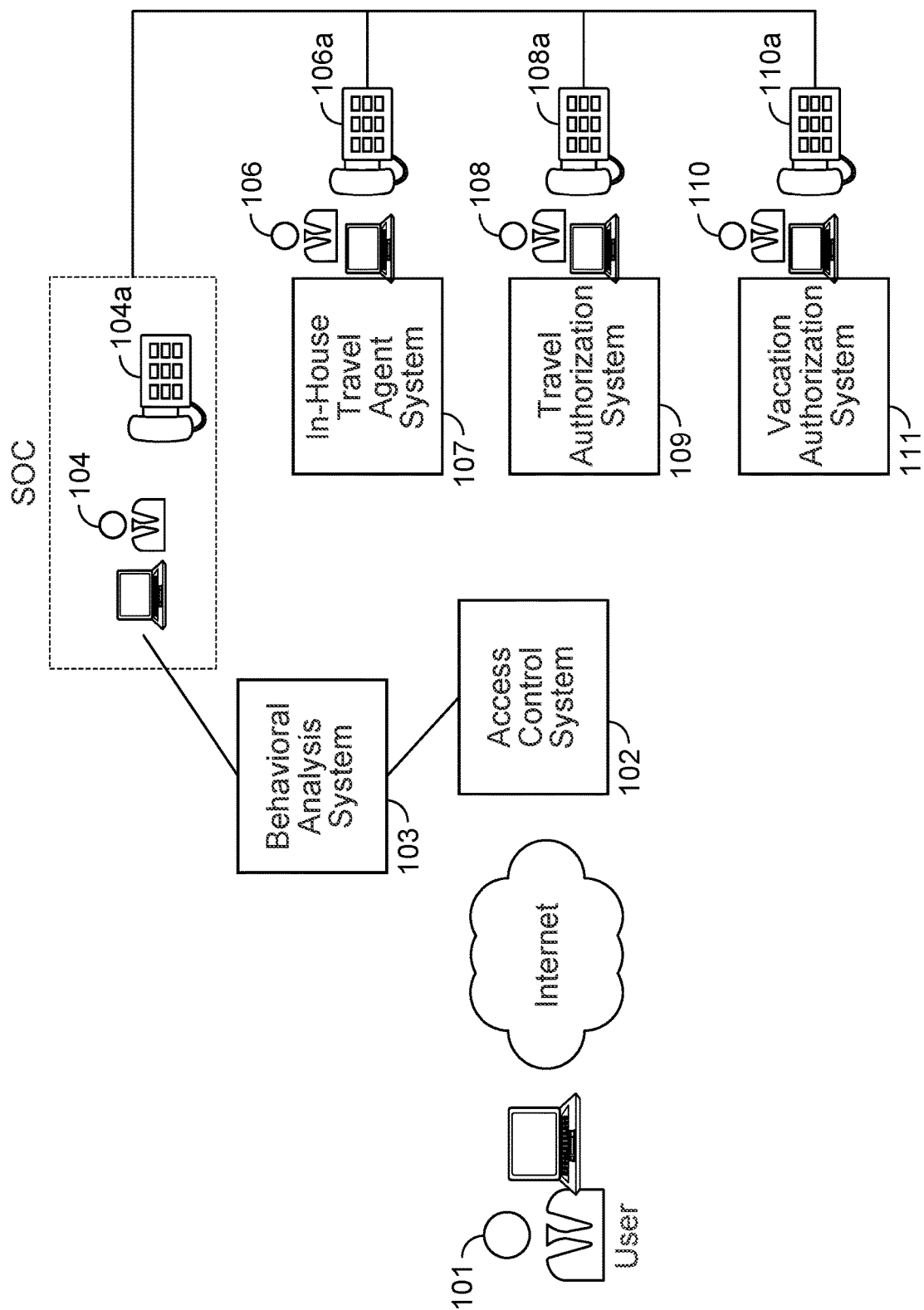
FIG. 1A illustrates an example of a system to provide false positive filtering.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system may include a plurality of subsystems. A subsystem may include one or more devices and/or one or more components. At some point in time, the system may experience one or more problems. For example, one of the subsystems may generate an alert. The frequency at which alerts are generated and the total number of alerts may make it difficult to determine whether an alert is a true positive, i.e., there is an actual problem with the system, or a false positive, e.g., the system is working fine, but a setting is causing an alert to be generated. Furthermore, it may be difficult to determine a root cause of the one or more problems because the plurality of subsystems are often interconnected and dependent on each other.

Using techniques disclosed herein, in various embodiments, a corresponding orchestrator is associated with each of at least a subset of the subsystems of the system. Distributed orchestrators strategically deployed throughout a system are able to solve and handle increases in scale, complexity, and volatility problems in general, as discussed above, and in many other types of systems including, but not limited to: IoT (Internet of Things), smart city systems, smart nation systems, smart highway systems, electrical distribution systems, multimodal transportation systems, health and medical systems, mechanical systems, manual processes and procedures, factory robot systems, etc. The plurality of orchestrators are configured to communicate with each other. Each orchestrator has one or more corresponding objectives, one or more corresponding algorithms, and one or more corresponding constraints. An orchestrator or a combination of orchestrators may be able to determine whether one or more alarms generated by the system are indicative of a true positive or a false positive using the corresponding objectives, the corresponding algorithms, and the one or more corresponding constraints. An orchestrator or a combination of orchestrators may also be able to determine a root cause of the one or more problems using the corresponding objectives, the corresponding algorithms, and the one or more corresponding constraints.

Each orchestrator has access to real time data about the subsystem with which it is associated and others in that subsystem's local neighborhood. In this way, the use of distributed orchestrators overcomes all the scale problems including the data volume overload problem because each orchestrator only has its local data to analyze and can do so extremely quickly. Each orchestrator has a bridge function that translates its local data model to and from an umbrella model. The umbrella model combines the data from different local data models of the distributed orchestrators in such a way as to produce a single data model that allows the data from the different local data models of the distributed orchestrators to be compared and analyzed. Analysis and decisions may be made based on the data in the umbrella model. This overcomes the complexity problem of different non-compatible components/subsystems and layers of legacy/future technologies. The umbrella model also handles volatility and can be changed in real time while the system is running. As the underlying subsystems go through software upgrades, etc., and new types of components or devices are added to a subsystem, the umbrella model can stay fully current. The orchestrators work together overcoming other aspects of the volatility problem by using a negotiation process to identify both static and dynamic problems and to apply both static and dynamic solutions. In this way they collectively solve problems.

Distributed orchestrators can use the output of behavioral analysis systems, can feed data to behavioral analysis systems, and can contain behavioral analysis systems. The result is something much better and very different from all the existing ways of solving these problems. In the above airplane example, using distributed orchestrators could have provided a unique and timely solution. If an array of orchestrators were in the airplane, each with its extremely fast access to local data, and appropriate algorithms, objectives, and constraints, they would have identified the problem in the power management system. They would have done so in less than a second. Based on that, the orchestrators would have recommended proceeding to the nearest airport immediately. If the orchestrators were on the ground, they would have identified the problem source within a second of receiving all the data. In the first cyber security example described above, orchestrators associated with each of the security systems producing alarms would have correctly indicated which alarms were false positives, which were true positives, and which were actionable. It would have done this within less than a second of each alarms initial appearance. In the second cyber security example described above, a group of orchestrators would have correctly identified the attacks that were dynamic as well as the attacks that were static. They would have applied both static and dynamic responses as appropriate to each.

The distributed orchestrators disclosed herein may handle static and dynamic attacks because each orchestrator analyzes the alarms associated with the subsystem to which it is associated regardless if an attack is static or dynamic. Instead of analyzing a large number of alarms (e.g., 10,000) that a central site might analyze and matching the alarms to a known pattern of attacks, each orchestrator is analyzing a smaller number of alarms (e.g., 10). Each orchestrator may perform false positive filtering on the smaller number of alarms, as disclosed herein, to determine the true positives (i.e., actual attacks). Each orchestrator may analyze the remaining alarms, i.e., the true positives, alone or with the help of one or more other orchestrators of the system. Using techniques disclosed herein, the orchestrator, alone or in combination with one or more other orchestrators, may determine if a remaining alarm is indicative of a symptom of a problem or a root cause of the problem.

False Positive Filtering

False positive filtering in cyber security is the process of determining which alerts actually indicate an attack so that proper action can be taken on them while resources are not wasted. For example, a medium sized Managed Security Service Provider that provides security services to a number of corporations) recently measured on its' system an average of 6 million raw security threats a week, of which 26 were actionable. These security threats are the cyber attacks that get through the outer skin of defenses, such as access control systems and firewalls. The alerts are generally produced by behavioral analysis systems, but the false positive issue is the same no matter what method generates the alert.

Behavioral analysis initially focused on intrusion detection (often called IDS for Intrusion Detection System). An IDS was deployed to identify an unauthorized use of an authorized user's credentials to gain unauthorized access to system resources. The IDS built a typical behavior pattern for an authorized user and then issued an alert when the authorized user's behavior deviated from that pattern. The question then, was whether the alert was a false positive or not. Human security staff had to make this determination, which caused problems in resource application and unintended consequences. The number of false positive alerts is so high that if all alerts are acted on, the resources required to do so cost more than the damage that is being protected against. Additionally, the risk of unintended consequences from acting on false positives is very high.

Intrusion Detection

FIG. 1A illustrates an example of this problem. User 101 may log on through access control system 102 every weekday morning between 9:00 and 9:15 am from his office in Menlo Park and log out between 4:45 and 5:00 pm. Behavioral analysis system 103 using log data from access control system 102 may develop a behavior pattern for user 101 based on this time and place pattern. Then access control system 102 may detect that user 101 is logging on from Hong Kong on Saturday night. This is a deviation from "normal" behavior associated with user 101 and access control system 102 may generate an alert. Now, the security staff has to determine if this is a false positive. If access control system 102 assumes that this is not a false positive and user 101 is logging on to support the user's presentation at a conference in Hong Kong and his account is disabled, user 101 will have spent a lot of time and money to prepare and travel to make the presentation and will not be able to actually do it. On the other hand, if there is really an attacker in the system, and it is ignored, then serious damage can happen. So, correctly determining if this is a false positive has significant consequences.

In the example, to determine if this alert is a false positive, security staff 104 investigates alternative explanations. As possible alternative explanations are found to be not true, the probability that the alert could be a false positive decreases. It is seldom possible to test all possible alternative explanations because it is difficult to determine that all truly possible alternative explanations have been identified and exhaustively tested. So, practically, there is a point when the obvious alternative explanations have been ruled out and the probability it is still a false positive is low enough, that it is prudent to act on the alert.

In this example, the obvious alternative explanations have to do with user 101 traveling. First, the security staff may call travel authorization system staff 108 to see if user 101 is on business travel. If so, travel authorization system staff 108 may call the organization's travel agent 106 to see if user 101 has airplane tickets to Hong Kong and a reservation at a hotel that might be consistent with the origin of the log-on. If so, the alert is marked as a false positive and no remediation action is taken. If not, then travel authorization system staff 108 may call the in-house vacation authorization staff 110 to see if user 101 might be on vacation and traveling, etc. In essence travel authorization staff 108 tries to determine if there is a high probability that although there is a behavior pattern deviation, the deviation can be explained by other sources of information.

Figure 1B:
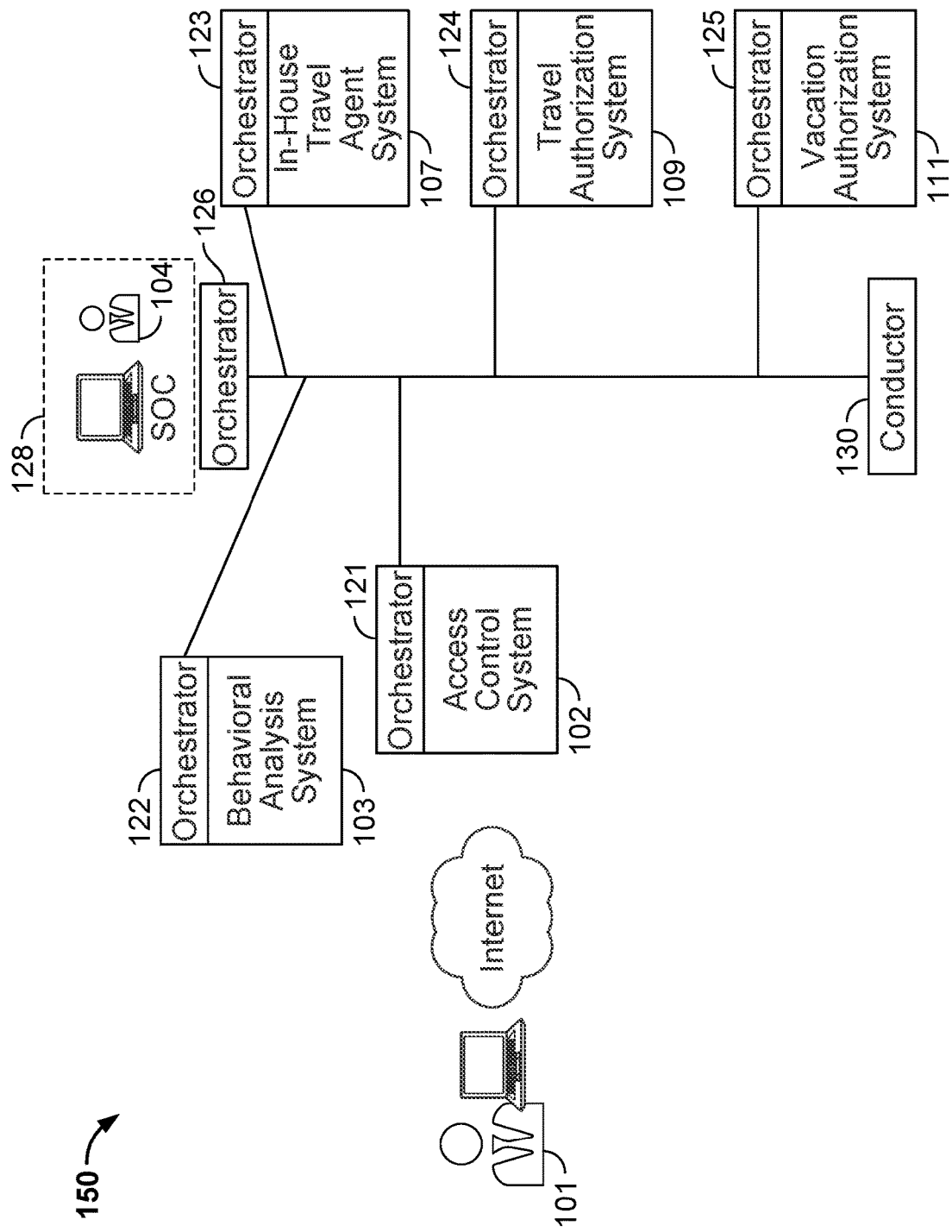
FIG. 1B illustrates an embodiment of a system to provide false positive filtering.

The manual process described above may be automated. FIG. 1B illustrates a system 150 implementing an automated behavioral analysis process in accordance with some embodiments. In the example shown, access control system 102, behavioral analysis system 103, travel authorization system 109, in house travel agent system 107, vacation authorization system 111, and security operations center (SOC) operator 104 are associated with corresponding orchestrators. Orchestrators 121, 122, 123, 124, 125, 126 may use corresponding algorithms, corresponding objectives, and corresponding constraints to perform the same kind of alternative explanation analysis as is done by the human staff. These can be based on a combination of set scripts and/or a negotiation process. The negotiation process as described in U.S. patent application Ser. No. 13/290,736 entitled "Orchestrating Wireless Network Operations," filed on Nov. 7, 2011, which is incorporated herein by reference for all purposes, may be used.

In this example shown, orchestrator 122 may generate an alert and/or receive information from at least one of the orchestrators 121, 123, 124, 125, 126. Orchestrator 122 may use a scoring algorithm, or other type of algorithm, to determine the probability of a true positive. Then, based on the constraints associated with orchestrator 122, orchestrator 122 may determine if the probability of the alert being a false positive is low enough to take action to disable access to the system by user 101. If yes, orchestrator 122 may instruct orchestrator 122 to cause access control system 102 to disable user 101's access.

There are many different possible embodiments based on different sets of objectives, algorithms, and constraints. In the above example, a scoring algorithm is used. Constraints are based on the scoring algorithm. Thus, different scoring algorithms may have different constraints. Objectives may include operating in a secure fashion and maintaining maximum possible availability of services. Since these objectives can be conflicting, such conflicts may be resolved by the scoring algorithm and associated constraints.

The orchestrators may have the necessary information as a result of their normal functioning. For example, orchestrators 123, 124, 125 have provided orchestrator 122 with the data to perform its normal functioning. Orchestrator 122 may contain a plurality of data elements, such as a "travel.authorization" data element, a "ticket" data element, a "vacation authorization" data element, etc. The data elements may be the result of the data received from the different orchestrators. For example, the "travel.authorization" data element is derived from the data received from orchestrator 124, which is associated with travel authorization system 109. The "ticket" data element is derived from the data received from orchestrator 123, which is associated with in-house travel agent system 107. The "vacation authorization" data element is derived from the data received from orchestrator 125, which is associated with vacation authorization system 111. Orchestrator 122 has the data required to do the scoring using its corresponding scoring algorithm because the events of interest in other parts of the system have automatically triggered the sending of the data concerning them to orchestrator 122. Since orchestrator 122 sees all the data elements in its local data model, the originating sources of the data are not shown below. A local data model is comprised of one or more data elements. A value associated with a data element may be determined based on data associated with orchestrator 122 or data associated one or more other orchestrators.

To perform the scoring, orchestrator 122 may use its current view of the local data model and do the following:
1) Call data element "user.travel.authorization" and scores the data element a "0" if there is no authorization. If there is an authorization, orchestrator 122 scores the data element "1" and marks that data element's read parameter as read.
2) Call data element "user.ticket" and scores the data element a "0" if no ticket has been issued. If not, orchestrator 122 scores the data element a "1." There may be additional tests and associated scoring based on where the ticket indicates where travel is to, what hotel has been booked, etc.
3) Call data element "user.vacation.authorization" and scores the data element a "0" if no vacation has been authorized. If not, orchestrator 122 scores the data element a "1."

Sum the scores steps 1-3. In this example, the sum of the scores is 3. The constraint associated with orchestrator 122 may be set such that if the score is two or higher, orchestrator 122 may be configured to mark this alert as a false positive, add the alert to a log of false positives, and deliver the log of false positives periodically (e.g., every eight hours covering the last eight hours) to the SOC 128. Thus, orchestrators may economically and accurately automate the filtering of false positives. This may result in improved security, lower losses through security breaches, reduced expenses associated with security staffs, and problems caused by responding to false positives.

Network Behavioral Analysis

Behavioral analysis systems may track the behavior of computing and networking subsystems, such as servers/Clouds, Apps, semiconductor processors, TCU's (Telecommunications Control Units in vehicles, etc.), IoT, Smart Home, Smart Office, factory automation, Smart City, etc. Manual efforts may be relied on to filter false positives. The manual efforts seek to determine the probability that a change in workload, software update, addition of new component, a naturally occurring failure, etc. caused the behavior change. The problem is that there are too many false positive alerts and the effort to filter them out is too large to be accurately performed by typical security staffs because the number of false positives is many orders of magnitude more than the true positives. With large employee staffs, customers, suppliers, etc. accessing large complex systems there are a large number of alerts generated. As more system components are instrumented and more types of data collected from each, the number of alerts becomes overwhelming. As system complexity, scale, and volatility grow, the number of alerts is growing non-linearly. This growth is happening in the context of time compression. As autonomous and smart systems proliferate and cyber attacks become more and more sophisticated, the time to respond to attacks is shrinking dramatically.

Figure 2:
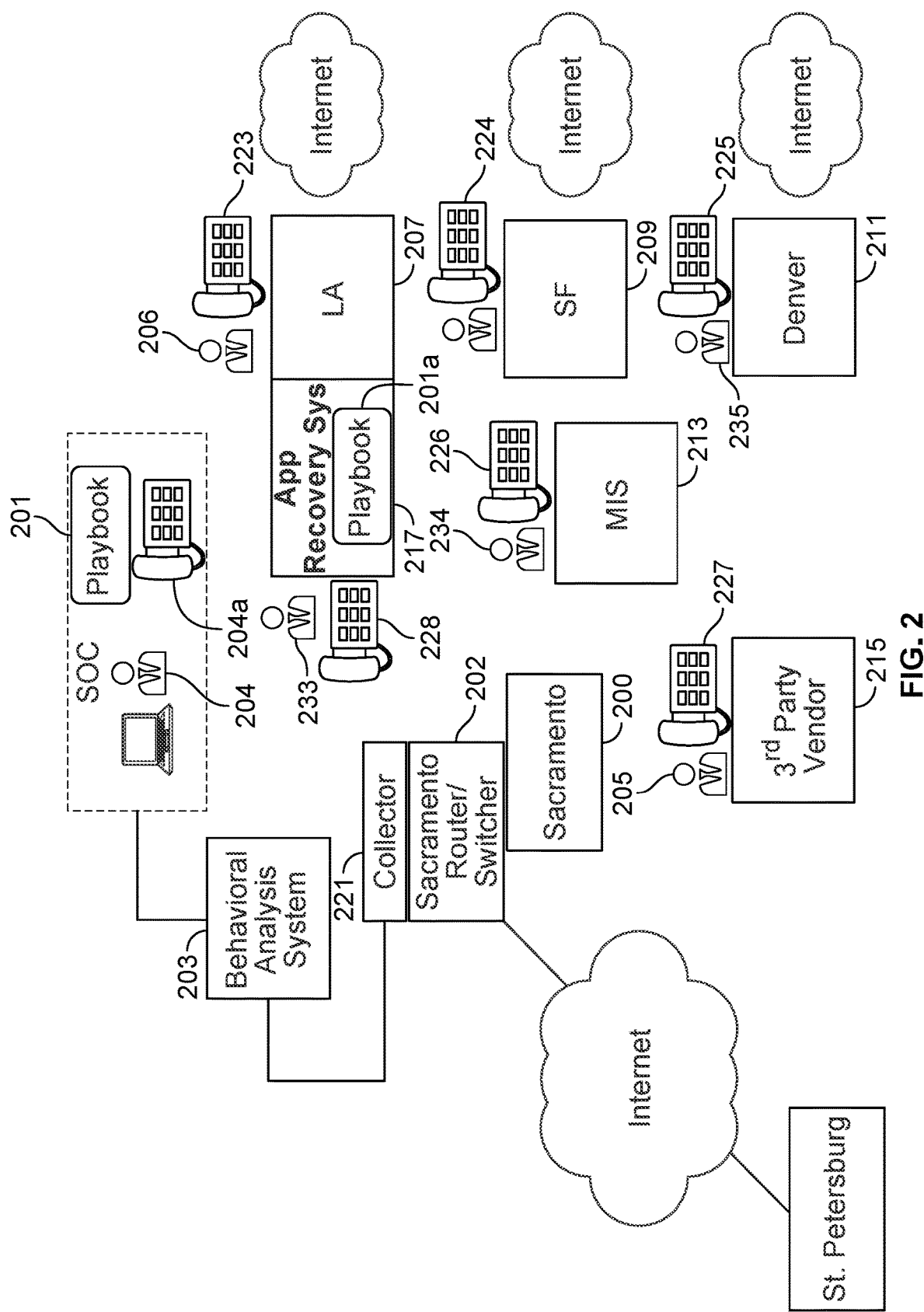
FIG. 2 illustrates an example communication system.

FIG. 2 illustrates an example communication system. In the example shown, a system 200 based in Sacramento, California is configured to communicate with a system 207 in Los Angeles (LA), a system 209 in San Francisco (SF), and a system 211 in Denver, Colorado. System 200 may receive new client registrations. These registrations may come from end points in the Sacramento region and from the systems 207, 209, 211. The registrations may contain Social Security Numbers (SSNs) that are then stored in records for each client. System 200 via Sacramento Switcher/Router 202 may receive requests for confirmation of SSNs. In response to those requests, system 200 may send out a yes or no answer tied to the message number of the request. System 200 may be configured to never send out SSNs. In this example, the corporate headquarters associated with systems 200, 207, 209, 211 is located in SF. In SF, there is a management information system (MIS) group 224 that is configured to manage a system that keeps a current description of the network. In LA, there is an MIS group 223 that is configured to manage a system that sends software updates to the software app that receives client information and provides SSN confirmations. In Denver, there is an outside third party vendor 205 that is configured to provide the third party platform the app in Sacramento runs on. The corporation may maintain a recovery system 217 in a separate processing facility, which is also in LA.

In this example, at 11:45 PM on a Saturday evening (attackers know when the least senior staff will be on duty, etc.) the central site behavioral analysis system 203 using IP address data delivered from the collector 221 alerts SOC operator 204 that a behavioral anomaly has occurred. For example, router/switch 202 may be sending data to an IP address other than the fixed IP addresses of system 207, system 209, and system 211. SOC operator 204 now sets out to determine if this is a false positive. SOC operator 204 does so by trying to determine if this change in behavior can be explained by anything else happening in the system (normal changes, or naturally occurring problems/failures).

SOC operator 204 may first call staff member 234 at phone 226 in the MIS group 213 located in SF to ask if there has been a new node added to the system. Staff member 234 may check his system and then call SOC operator 204 back and inform SOC operator 204 that a new node has not been added to the system. Then, SOC operator 204 may call staff member 206 at phone 223 that is associated with system 207 located in LA and ask if there has been an update to the app that would involve the app sending messages to a new IP address. Staff member 206 may check, call back SOC operator 204, and inform SOC operator 204 that there hasn't been an update to the app that would involve the app sending messages to a new IP address. Then, SOC operator 204 may call a staff member 235 at phone 225 associated with system 211 located in Denver and ask if $3^{rd}$ party vendor 215 has made a software update that would trigger a new IP address. Staff member 235 may inform SOC operator 204 that he will check. Staff member 235 may call the $3^{rd}$ party vendor rep 205 at his phone 227 at his office 215. The $3^{rd}$ party vendor rep 205 may check, call the staff member 203, and inform staff member 203 that there hasn't been a software update that would trigger a new IP address. In response, staff member 203 may call SOC Operator 204 and inform SOC Operator 204 that there hasn't been a software update that would trigger a new IP address. In spite of the fact that all the initial calls are made in quick succession, normal phone tag, etc. may result in these series of answers coming through at 4:55 PM on the following Friday afternoon.

Having exhausted all the possible alternative explanations SOC Operator 204 may conclude that this alert is a true positive. Therefore, SOC Operator 204 may start remediation by selecting the appropriate playbook 201 from a plurality of playbooks. Playbook 201 may inform SOC Operator 204 to call App Recovery in LA and request that the app be deleted and restored from a known good source. In many cases, a playbook will call for a security staff member to execute the restore function directly. This may introduce several potential pitfalls including the lack of knowledge of every system by the SOC staff member, and the possibility that a computer or network operations staff member could be working on the configuration of the same system at the same time leading to unpredictable colliding instructions with unpredictable and dangerous results. Playbook 201 may have been prepared a long time in the past and may assume that either an unauthorized code segment has been introduced or an unauthorized alteration of existing code has been made in system 202. Playbook 201 may call for SOC Operator 204 to call staff member 233. Based on a playbook instruction, SOC Operator 204 may call staff member 233 and request that the app in router/switcher 202 be recovered.

The system described above may be owned by a large corporation with many such systems developed in many different ways using many different types of hardware, operating system, Cloud software, $3^{rd}$ party platforms, $3^{rd}$ party frameworks, Apps, etc. acquired from many different vendors, based on many different eras/generations of technology. App Recovery System 217 and its staff may have to support all of these. It is difficult and nearly impossible (financially and talent availability) to have staff 24/7 knowledgeable in all of these systems. So the App Recovery Staff may use one or more playbooks.

When the call from SOC Operator 204 reaches App Recovery System 217, it may be received during a shift change. The staff member who receives the call makes notes and turns the job over to the evening shift. Shifts are usually assigned by seniority. Friday evening is the least desirable shift and therefore likely has the least senior staff. The Friday evening staff member may select the correct Playbook, e.g., playbook 201a and begin to follow the instructions included in playbook 201a. The instructions may call for the staff member sitting at his terminal to manually initiate a special separate backup, delete the $3^{rd}$ party software and the current app and all its data, reinstall the $3^{rd}$ party software from the $3^{rd}$ party vendor's system (known good source), correctly configure it, install the App from the App Recovery System (known good source), and check that the basic App is running correctly. Then, the staff member may roll back the standard backup to well before the behavioral anomaly was discovered and install that data set in the App. Then, the staff member may perform a first test of the App to see if it is performing as specified and not exhibiting the anomalous behavior. If the first test is successful, the staff member may then delete that data set and install the special data backup data set the staff member had just previously captured. The staff member may perform a second test to see if the App is performing as specified and not exhibiting the anomalous behavior (e.g., to make sure that anomalous code has not been introduced into the data set). If the second test is successful, the staff member may return the App to production. If not successful, the staff member may delete the data set used for the second test, and notify both the business unit supported by the App and the forensics part of the SOC staff to find and remove what is causing the problem in the data set associated with the second test.

Somewhere in the process described above, the App Recovery staff member, such as staff member 233, may inadvertently hit a wrong key on his keyboard (also known as a "fat finger problem"). Staff member 233 may not be aware that he has done so. However, at some point, it becomes clear to staff member 233 that when he enters information at his keyboard, he is not getting the responses that playbook 201a tells him he should get. Guided by a general policy, staff member 233 may stop entering information from his keyboard and ask for help from his supervisor. Neither staff member 233 nor his supervisor are familiar with the App nor the technology/vendor product set supporting it. So, after spending some time, trying it figure out what is wrong, they may call the on-call expert. The on-call expert tries to figure it out. Although the on-call expert understands some parts of the system, he has never worked with the rest of the system. He is stumped too. This goes on all weekend, with multiple escalation steps. Finally, on Monday morning, a very senior staff member arrives who is able to resolve the problem and bring the App in a "clean" state, back up online.

During the week that it takes for the SOC staff to determine that the anomalous behavior is a true positive, client data is being continuously exfiltrated (e.g., data is released to unauthorized user(s)). This may cause serious damage to the clients and to the reputation/brand of the business that results in a decrease in the stock price of the corporation. During the three and a half days that App Recovery staff are working on remediation, exfiltration has ceased, but also, the business unit supported by the App does not have access to the app. This may cause financial losses, data losses, and business staff stress.

Figure 3A:
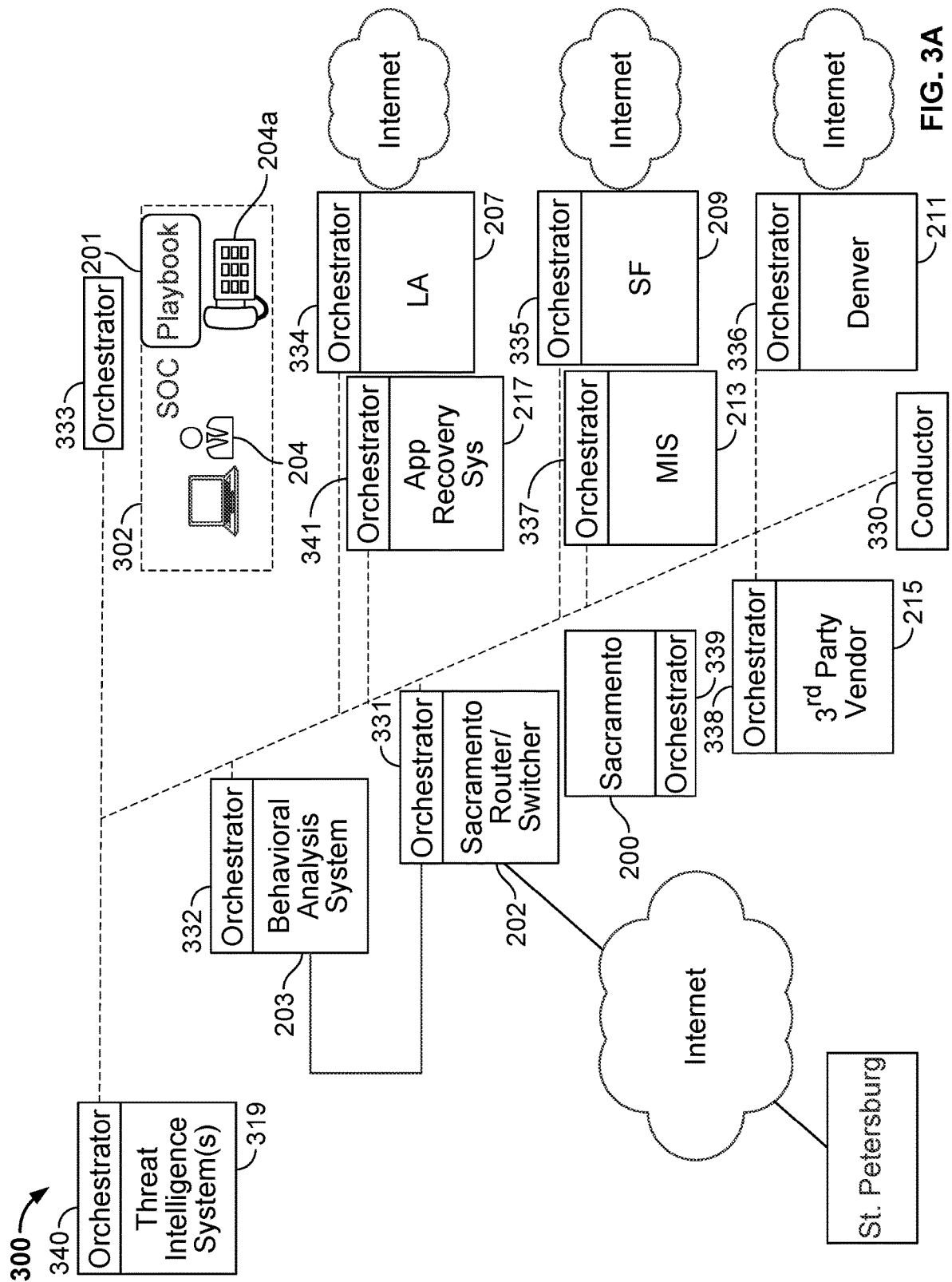
FIG. 3A is a block diagram illustrating a communication system in accordance with some embodiments.

FIG. 3A is a block diagram illustrating a communication system in accordance with some embodiments. System 300 is similar to the system shown in FIG. 2A, except that staff members (except for SOC Operator 204) and telephones have been replaced with orchestrators. Router/switch 202, behavioral analysis system 203, SOC 302, system 207, system 209, system 211, MIS 213, 3$^{rd}$ party vendor system 215, system 200, threat intelligence system 319, and app recovery system 217 are associated with orchestrators 331, 332, 333, 334, 335, 336, 337, 338 339, 340, 341, respectively. The system also includes conductor 330. The orchestrators 331-341 and conductor 330 operate based on corresponding one or more objectives, corresponding one or more algorithms, and corresponding one or more constraints. Objectives associated with a first orchestrator may include operating in a secure fashion and maintaining maximum possible availability of services. One or more other orchestrators may have one or more different objectives. Since the objectives associated with a plurality of orchestrators may be conflicting, such conflicts may be resolved by the scoring algorithm associated with an orchestrator and one or more constraints associated with the scoring algorithm.

Orchestrator 331 may gather and deliver to central site Behavioral Analysis System 203 the IP address information that was previously gathered by a collector, such as collector 221, that is, orchestrator 331 is configured to perform the function that was performed by collector 221. Behavioral Analysis System 203 may detect that there is an IP address other than the fixed IP addresses associated with system 207, system 209, and system 211 and generate an alert. Orchestrator 332 may detect the alert and provide the alert to orchestrator 339.

The objectives of orchestrator 339 may be operating in a secure fashion while maintaining maximum possible availability of services. This may cause orchestrator 339 to take false positive filtering action before implementing remediation that could cause a decrease in system availability. In this case, the relationship between the two objectives associated with orchestrator 339 may be achieved by employing a "if, then, else" algorithm instead of a complex algorithm, such as a scoring or other type of algorithm.

In this example, a scoring algorithm is used in the false positive filtering. A score of "0" or "1" is given based on parameters that will be described below. Conductor 330 is configured to configure the nature and form of the corresponding scoring algorithms associated with the orchestrators. In some embodiments, fractional values are used. For example, the presence of a software upgrade may be given a preliminary value of "1," then modified based on the amount of time that occurred between the software upgrade and the arrival of the anomaly. In some embodiments, a default scoring algorithm may score two events that are closer in time (e.g., 10 minutes) higher than two events that are not as close in time (e.g., 10 days). However, some attackers are including a sleep function in their attack code such that it lies dormant for hours, days, weeks, months, etc. In some embodiments, information about current types of attacks targeting the system's industry, etc. is delivered from one or more threat intelligence systems 319 to conductor 330 by orchestrator 340. In response to receiving such information, conductor 330 may modify the corresponding scoring algorithms associated with the orchestrators.

Based on the above, orchestrator 339 may perform the following scoring. Orchestrator 339 may have all the data required to do the scoring because the events of interest in other parts of the system have automatically triggered the sending of the data concerning them to orchestrator 339. For example, orchestrators 331-338 may send their corresponding data to orchestrator 339. Since Orchestrator 339 sees all the data elements in its local data model, the originating sources of the data as described in FIG. 2 and its accompanying text are not shown below.

To perform the scoring, orchestrator 339 may use its current view of the local data model (sometimes referred to as an "Umbrella Model" or a "local view of the Umbrella data model.") and do the following:

1.) Call data element "sacramento.ipaddress parameter change.ipaddress" and score the data element a "1" if there has been no change. If there is a change, score the data element a "0" and mark that data element's read parameter as read. A change can be the result of a normal action or the result of a problem/failure. If the change is a result of a normal problem/failure, a note is attached to the score.
2.) Call data element "network.nodes parameter change.node" and score the data element a "0" if a node has been added. If not, score the data element a "1." A node can be added as the result of a normal action, or the result of a problem/failure. If the change is a result of a normal problem/failure, a note is attached to the score.
3.) Call data element "sacramento.app parameter app.softwareupgrade" and score the data element a "0" if a software upgrade has been made in the last 5 days. If not, score the data element a "1." A software update can be the result of a normal action or the result of a problem/failure. If the change is a result of a normal problem/failure, a note is attached to the score.

4.) Call data element "sacramento.platform parameter app.vendor.softwareupgrade" and score the data element a "0" if a software upgrade has been made in the last 5 days. If not, score the data element a "1." A software update can be the result of a normal action or the result of a problem/failure. If the change is a result of a normal problem/failure, a note is attached to the score.

5.) Sum the scores for each step above.

In this example, the sum of the scores is 4.

In this embodiment, the constraints for action associated with orchestrator 339 based on false positive scoring are (1) if the total score is 3 or higher, check to see if physical and virtual neighboring nodes' orchestrators are reporting security alerts. If not, then immediately implement automated remediation and inform SOC 302 after remediation is complete. If yes, proceed to root cause analysis; (2) if the total score is higher than 2 but less than 3, notify SOC 302, and (3) if the total score is less than 1, log as a probable false positive. Check to see if there are any notes attached to the scores. If there are notes, perform root cause analysis.

When the algorithm and constraint associated with orchestrator 339 trigger notification of SOC 302, orchestrator 339 may send a message to orchestrator 333 which uses its corresponding algorithms and constraints to determine how to present the data to the SOC systems and staff. In some embodiments, there may be a direct connection between the behavioral analysis system 203 and SOC 302. In such an embodiment, SOC staff can have a monitor that shows the alert arriving from behavioral analysis system 203, the result of scoring, and the action taken. This may also be captured in an SOC log file.

In this example the total score is 4, so orchestrator 339 is configured to send a message to orchestrator 341, i.e., the orchestrator associated with app recovery system 217 to initiate remediation of the Sacramento system 200. Orchestrator 341's algorithm for remediation of system 200 may be as follows:
  a.) Initiate a special separate backup of the app data and label it as data set 3.
  b.) Delete the $3^{rd}$ party software and the current app and all its data (e.g., data set 1).
  c.) Download and (re)install the $3^{rd}$ party software from $3^{rd}$ party vendor system 215.
  d.) Correctly configure the $3^{rd}$ party software.
  e.) (Re)install the App from App Recovery System 217.
  f.) Install a test data set and run App test script (test1). If the test is successful, proceed to next step. If the test is unsuccessful, stop all action on Sacramento system 200 and send "test1.fail" message to SOC's Orchestrator 333.
  g.) Roll back the standard backup to five days before the alert. Install that data set (data set 2) in the App.
  h.) Test the App (test 2) to see if it is performing as specified and not exhibiting the anomalous behavior. If the test is successful, proceed to next step. If the test is unsuccessful, stop all action on Sacramento system 200 and send "test2.fail" message to SOC Orchestrator 333.
  i.) Delete data set 2.
  j.) Install the special data backup data set (data set 3).
  k.) Test (test 3) to see if the App is performing as specified and not exhibiting the anomalous behavior. If test 3 is successful, return the App to production and send success message to the SOC Orchestrator 333 of actions taken and success in remediation. If not successful, delete the data set used for test 3, stop all further action on Sacramento system 200 and send test3.fail message to the SOC Orchestrator 333.

Depending on propagation delay, performance of the various systems involved, etc., the time from generation of the alert and the successful remediation (assuming that the attack is not buried in the app data (data set 3)), is measured in seconds to a few minutes. In this example, the alert was generated at 11:45 PM on a Saturday night. In the FIG. 3A example, full remediation was completed well before midnight. In contrast, the remediation, described above with respect to FIG. 2, took eight days.

Figure 3B:
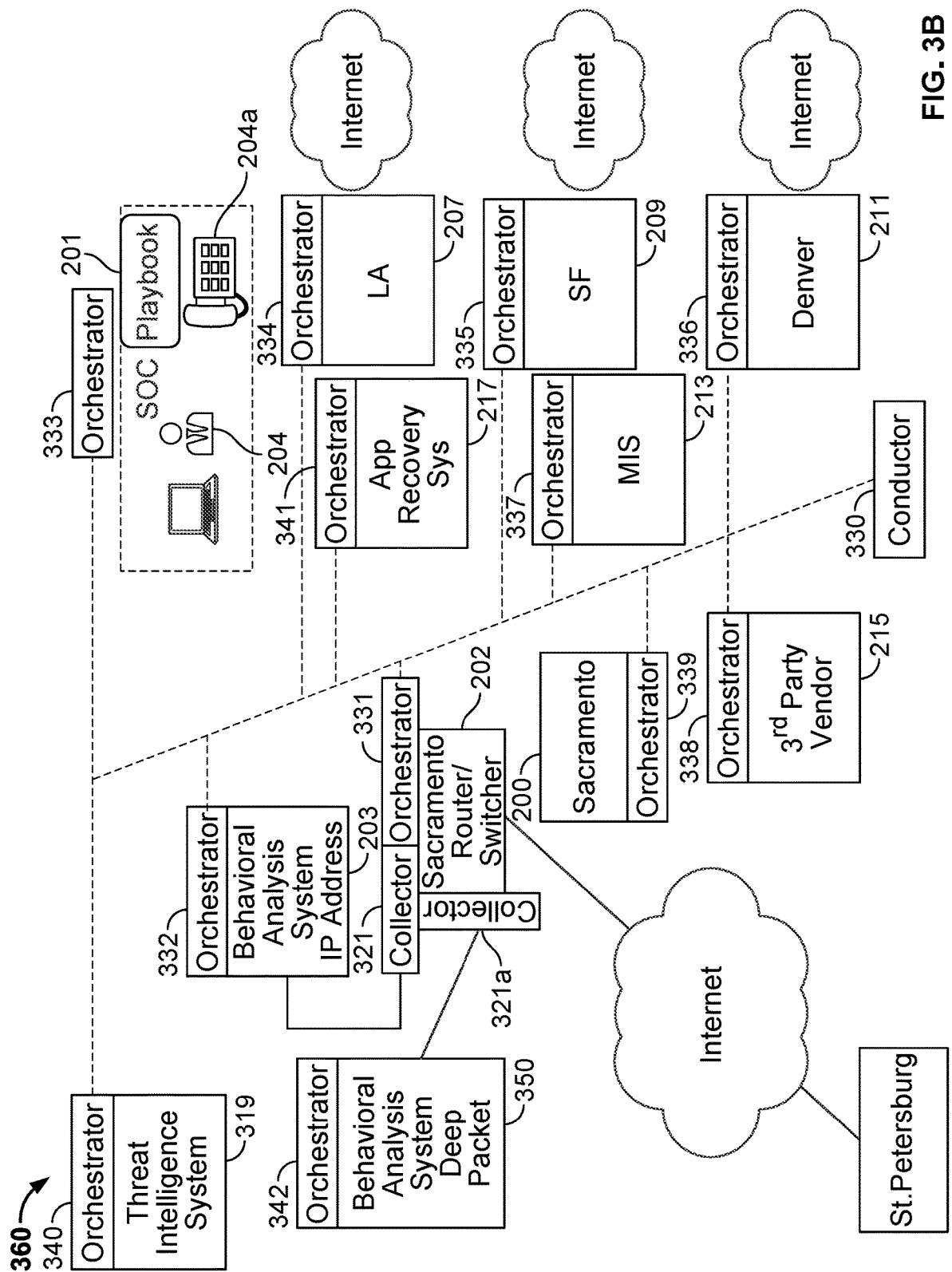
FIG. 3B is a block diagram illustrating a communication system in accordance with some embodiments.

FIG. 3B is a block diagram illustrating a communication system in accordance with some embodiments. In this embodiment, things are the same as in FIG. 3A and its accompanying descriptive text except for differences in at least i) operation of the behavioral analysis function, ii) types and use of threat intelligence information, and iii) the scoring system.

Operation and Action of the Behavioral Analysis Function

Because of the volume of data captured by central site behavioral analysis systems and the difficulty of storing and searching such large volumes, central site systems generally only work with one type of behavioral information. For example, in FIG. 3A, behavioral analysis system 203 used IP address data. In the example in FIG. 3B, the behavioral analysis function may use deep packet inspection as well as IP address data. FIG. 3B includes two collectors: collector 321 for IP Address Information and collector 321a for Deep Packet Inspection Information. FIG. 3B includes two separate central site Behavioral Analysis Systems and associated Orchestrators (e.g., behavioral analysis system 350/orchestrator 342 for Deep Packet Inspection and behavioral analysis system 203/orchestrator 332 using IP Address Data.).

As a result, conductor 330 may configure orchestrator 332 such that the IP address anomaly function is triggered to send an alert of a detected behavior change in IP address information sent by router 202 to orchestrator 339. Orchestrator 332 may be configured such that the deep packet inspection function is triggered to send an alert of a detected behavior change in packet content flowing through router 202 to orchestrator 339. In addition to the change in packet content in general, orchestrator 339 may also be configured to filter, detect, and alarm on the appearance of SSN's in outgoing packets. Orchestrator 339 may receive three alerts of the three different types.

The behavioral analysis function may be a histogram behavioral analysis algorithm. A histogram is a list of parameters and their frequency (number of occurrences) in a given period of time. For example, a histogram may be generated for a data element and track the values of the data element and the number of times each value was generated. In one embodiment, histograms are used in approximate query to create a metadata structure of files that are then searched for patterns. In such an embodiment, a significant amount of effort is needed to specify the structure of the histograms and the patterns being searched for. Furthermore, even with approximate query technology, there is no use of all the potential data sources because of the data volume problem.

An automated process that observes all of the available data sources may be implemented to determine the proper timing of samples for creation of histograms. A statistical algorithm is used to automatically determine the valid sample size for each implementation. The frequency of activity is observed and used to automatically calculate the minimum time segment required to produce a statistically valid sample. Then, histogram(s) may be created for that sample period. For example, a sample period may correspond to every second, every minute, every 10 minutes, every half hour, every hour, every 6 hours, every 12 hours, every day, every other day, etc. Sample periods are tracked and automatically updated if necessary.

The histograms are constructed without regard to "meaning", nor manually created search patterns (whether or not augmented by automated processes). They are merely counts. A moving sum statistically valid average histogram is constructed from the first and succeeding histograms. The number of histograms needed for this moving sum average is automatically determined by a statistical algorithm. Newly created histograms are compared to this moving sum average as they are created. Any change of more than a threshold amount (e.g., given percentage, a given amount) than the moving sum average may generate an alert. This percentage may be automatically set by a statistical algorithm for each implementation. In most types of attack a significant change of behavior will occur. Once the orchestrators are widely deployed throughout a system, it is possible that attackers will vary their attacks and seek to trickle their activity so that it doesn't reach the trigger percentage. To guard against this, an automated process may specifically and automatically search for trickle patterns in the histograms separate from the moving sum averages. Based on inputs from orchestrators associated with threat intelligence systems, the orchestrator building and tracking histograms may use its objectives, algorithms, and constraints to trigger alerts based on specific patterns in the histograms and their changes.

The histogram behavioral analysis algorithm may be performed in an orchestrator, a conductor, or a collector. The histogram behavior analysis algorithm may be performed by any combination of one or more orchestrators, one or more conductors, and/or one or more collectors. The orchestrators or collectors can get data to work with by connecting to existing interfaces. These interfaces may generate streams of information in their normal operation that the orchestrators or collectors can "tap," that is, listen to in a non-disruptive fashion. Other interfaces may only respond to requests sometimes called "polls".

In some embodiments, the histogram behavioral analysis algorithm is performed in a distributed process. This allows the amount of data that has to be dealt with at each behavior analysis engine to be greatly reduced. Furthermore, the histogram behavioral analysis algorithm does not require keeping the underlying data. Once a histogram has been created for a sample data set, that data set can be discarded. Thus, an orchestrator employing the histogram behavioral analysis algorithm does not need to store the full data sets from which it is counting parameters. This is in contrast to behavioral analysis systems that must keep multiple such full data sets covering days, weeks, months, etc. In contrast, the histogram behavioral analysis algorithm described here may only need to keep the small moving sum average histogram data set and the currently being assembled histogram data set. By distributing the capture and analysis of the input data, the volume of data, even when all sources are employed, that each behavioral analysis engine has to deal with is limited to a manageable level. This distributed system with is data volume advantages may be used in conjunction with traditional existing types of behavioral analysis systems (e.g., classical behavioral systems, approximate query behavioral analysis systems, etc.) or with combinations of the moving sum average histogram and the existing ones mentioned above. Central site behavior analysis systems can still be used to employ the moving sum average algorithm by themselves or in combination with some or all of the alternatives mentioned above.

Types and Use of Threat Intelligence Information

In FIG. 3B, Threat Intelligence System 319 delivers via orchestrator 340 information that there is an attack targeting the industry supported by the system in FIG. 3B. The information may indicate that the attack originates from St. Petersburg and that it originates from a specific set of IP addresses: a3.1, a3.2, and a3.3. In response to receiving such information, conductor 330 may configure orchestrator 331 to filter, detect, and alert on the appearance of addresses a3.1, a3.2, and a3.3 in outbound packets. This can be further broken down into appearance of inbound and outbound packets, but is not described in this embodiment.

Scoring System

As a result of i.) and ii.) above, new data elements may be added to the overall data model and additions to the scoring system algorithm associated with an orchestrator and constraints associated with an orchestrator. For example, the new data elements may be "ipaddressmatch," "packetcontent," and "packetssn #." The change in the algorithm associated with an orchestrator is described below. Conductor 330 may configure orchestrator 339 (and all similar Orchestrators in this system) to add the new data elements and to modify the corresponding scoring system algorithm and corresponding constraints. The model may be continually updated as the system is running.

To perform scoring now, the scoring algorithm associated with orchestrator 339 in addition to 1.) through 5.) above, may now include:

6.) Call data element "sacramento.ipaddressmatch.alert" and score the data element a "0" if there is no alert. If there is an alert, orchestrator 339 scores the data element a "1" and marks that data element's read parameter as read.

7.) Call data element "sacramento.packetcontentchange.alert" and score the data element a "0" if there is no alert. If there is an alert, orchestrator 339 scores the data element "1" and marks that data element's read parameter as read.

8.) Call data element "sacramento.packetssn #.alert" and score it a "0" if there is no alert. If there is an alert, orchestrator 339 scores it "1" and marks that data element's read parameter as read.

Now instead of a total possible score of 4, the total possible score is 7. Conductor 330, therefore, may reconfigure orchestrator 339 such that the constraint for action based on false positive scoring associated with orchestrator 339 is, if the total score is:

5 or higher, check to see if physical and virtual neighboring nodes' orchestrators are reporting security alerts. If not, then immediately implement automated remediation and inform SOC 302 after remediation is complete. If yes, then root cause analysis may be performed;

higher than 2, but less than 5 notify SOC 204;

less than 2, log as a probable false positive;

As in the description of FIG. 3A above, if what is being observed is a result of a naturally occurring (normal) problem/failure a note is made. If the alert is considered to be a false positive, a check is performed to see if there are any notes attached to the scores. If there are notes, then root cause analysis may be performed.

Orchestrator 339 may be associated with much more complex filtering algorithms and action constraints, but are not described herein for explanation purposes. Although a binary (0,1) scoring algorithm is described above and below, in some embodiments, more complex parameters may be appropriate. For example, the parameters may be represented in one or more numeric system and/or one or more alphabetic systems, and/or one or more ideographic systems, etc. Depending on the type of parameters, there are many types of scoring systems that can be used including scoring systems based on statistical analysis, Bayesian techniques, Content Analysis, etc.

Figure 3C:
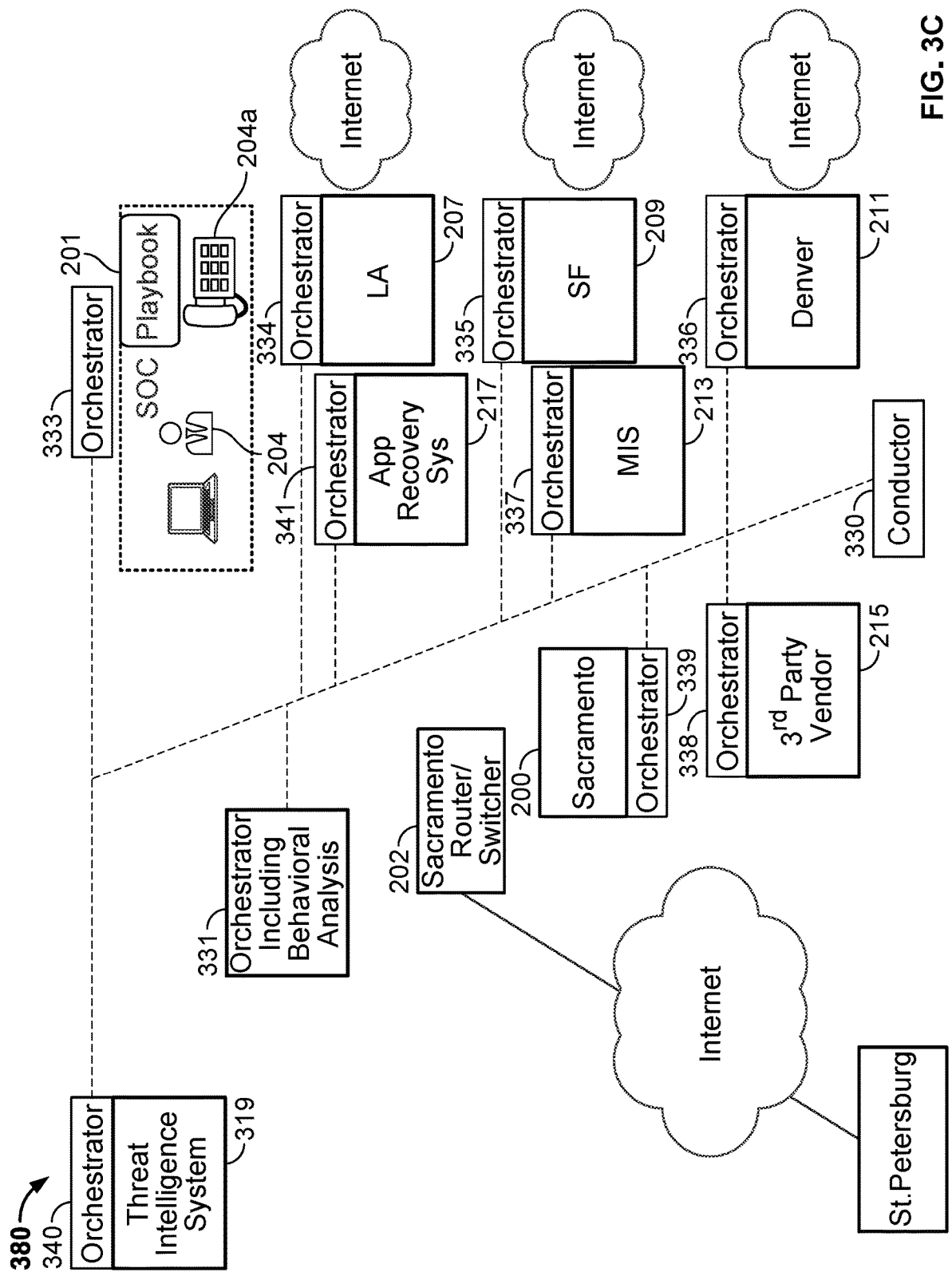
FIG. 3C is a block diagram illustrating a communication system in accordance with some embodiments.

FIG. 3C is a block diagram illustrating a communication system in accordance with some embodiments. In this example, collectors 321, 321a, behavioral analysis systems 203, 350, and orchestrators 332, 342, shown in FIG. 3B, are no longer present. Instead, the suite of algorithms and constraints associated with orchestrator 331 has been expanded. This expansion has the effect of accomplishing the data collection function and the behavioral analysis function locally in orchestrator 331. As a result of this distribution of function, there is no longer the problems of storing and searching a huge data store. Orchestrator 331 may only deal with the data from router/switch 202, which is several orders of magnitude lower than the data volume with which the central site behavioral analysis systems in FIG. 3B had to deal.

The above embodiment has the false positive filtering done at the affected system's orchestrator. In other embodiments, the false positive filtering is performed at other orchestrators, such as orchestrator 333. In other embodiments, the false positive filtering is performed by conductor 330.

In some embodiments, a tracking and pattern development function is implemented, alone or in combination, by one or more orchestrators. In other embodiments, a conductor is configured to implement a tracking and pattern development function. In other embodiments, a dedicated orchestrator is configured to implements the tracking and pattern development function.

A tracking and pattern development function may identify patterns. For example, the determination that an alert or set of alerts was filtered as a false positive can be compared with later experience. Did it recur? Was it later proved to really be a true positive? These determinations are probabilistic so there may be no absolute determination. Does follow-on experience seem to indicate that it was a false positive? Have similar patterns of alerts been identified as false positives that follow-on experience seems to validate? If so, then these patterns can be used to help quickly identify other false positives (e.g., implemented as step 0 added to the above algorithms, which would start the algorithm with a pattern match step). Conversely, have certain patterns identified as false positives turned out to be true positives? Here again, these patterns can be used to increase the accuracy of the false positive filter.

Maybe more important is capturing data about effective remediation. When a true positive is identified, generally (if there is not the root cause analysis function at work), there is a triage of remediation actions. The triage starts with the fastest, least cost, least impact on user experience alternative. If that proves not to be effective, then the next one in rank order is tried. When a pattern of alerts identifies a particular type of attack, patterns of effective remediation against this kind of attack can be brought to bear. For example, in the above scenario, restoring software from a known good source was used. However, if there is an open (vulnerable) attack vector in that software, that an automated attacker is waiting to see reappear, the software will quickly become compromised again. If there is no historical pattern, then the orchestrators will continue to use the same remediation technique until the pattern is detected. Then, move to the next one down in rank order. In this example, that next one is installing a software patch (there are many possible remediation approaches and these are just examples). If, on the other hand, the pattern has been previously detected, captured as a pattern, and the appropriate orchestrators' algorithms updated by the conductor, then the updated orchestrators can skip directly to installing the patch. As above, this tracking function can be accomplished in whole or in part in the affected subsystem's orchestrator, the SOC orchestrator, other orchestrator(s), and/or the conductor.

The tracking and pattern development function can be maintained totally internally to update the algorithms and constraints associated with an orchestrator. The tracking and pattern development function can also connect (outbound for this activity) through the Threat Intelligence Service Orchestrator(s) 340 to outside service(s) and/or other types of tracking systems. Some governments operate systems that seek to collect data on cyber security breaches in their countries and may have open API's for delivering such data. There are some not-for-profit organizations that run similar systems. Some commercial systems allow subscribers (and in some cases require some, or all, of their subscribers) to provide such information. Finally, the organization capturing the pattern information may offer it as a for profit service. The use of the orchestrator 340 is critical in this area because a bridge function include in orchestrator 340 may provide a way to connect to the full variety of Threat Intelligence Systems with their different protocols, data models, etc. and make automated use of the data obtained.

Failure modes not caused by intentional attack, that is operations generated alerts that are the result of "natural failures", can also be subject to false positives and thereby require false positive filtering. With the increasing use of artificial intelligence (AI) systems to interpret operational data, this is becoming more frequent. AI systems, such as machine learning, neural networks, deep learning, etc., may be used in conjunction with the false positive detection system described above. Such AI systems may be trained to detect abnormal behavior and may be used to generate alerts in response to deviations from the normal behavior of a system/component. However, such AI systems, in general, tend to generate a higher number of alarms. The premise is that in doing so, they generate fewer false negatives, but as a consequence, also generate more false positives. An AI detection system may be coupled to one or more orchestrators. An output of an orchestrator may be provided to an AI detection system to determine whether or not there is a problem with a subsystem. In some embodiments, in the event an orchestrator and the AI detection system both determine that a subsystem is exhibiting abnormal behavior, then an alert is generated and/or a remediation is implemented.

There are very many domains where false positive filtering is important including semi design, semi operation, autonomous vehicle operation, Smart City/highway/street/office/factory etc., Multi-modal freight transportation and associated information networks, Clouds, medical services, IoT, Manufacturing, general IT, etc. Attacks may include data exfiltration, subversion of control systems to produce outcomes other than what the systems were designed to do, etc. The false positive filtering technique described herein can also be used in conjunction with mechanical and/or manual systems. There are so many application areas, that it is not practical to list them all. The false positive filtering technique is not limited to the systems and/or implementations described herein.

Root Cause Analysis

In the above examples, behavior analysis (or some other form of attack detection) combined with false positive filtering may identify that an attack is under way, but in some cases there may be uncertainty about which particular subsystem(s) has been breached. Before efficient remediation can be undertaken root cause analysis needs to be performed. There is another type of attack where the objective is to impair or destroy the system. Behavioral analysis systems may detect such attacks, but in many cases the first indication of the attack are alerts from the operations subsystems that something is wrong. These operations subsystems merely generate alerts when specific components' operating parameters no longer fall within acceptable ranges. These alerts may be the result of cyber attacks or "natural causes." That is failure modes not caused by intentional attack. Such alerts include, but are not limited to, security generated alerts, operations generated alerts that turn out to be security related, operations alerts that turn out to be generated by 'natural causes', operations generated alerts that turn out to be false positives (that is an alert, but in reality no problem), etc.

In large complex systems, there are generally a number of alerts from a number of different subsystems. Determining which subsystem is the source of the problem is difficult. This determination is generally called root cause analysis. Some alerts are merely symptoms of the underlying problem and one of the alerts of the plurality of alerts represents (points to) where the root cause of the problem originates. Not correctly identifying the location of the root cause has many detrimental effects including, but not limited to, extended impairment of service—including in the case of cyber attack potential for spreading contamination, expensive efforts directed at the wrong subsystems, damage to the system caused by ill-fated remediation activities (e.g., the fat finger problem discussed above), and staff stress.

In some embodiments, root cause analysis is performed regardless of whether the problem is a result of a cyber attack or natural causes. And it needs to be done quickly because as described above, a system may have limited amount of time to identify and remedy a problem before the entire system is compromised. In some embodiments, one or more orchestrators may first perform false positive filtering on a security alert. If false positive filtering indicates that there is a high probability of the alert being a true positive, then if there are indications of what appear to be a series of security alerts that may be related, root cause analysis is performed. Once the subsystem (e.g., node) containing the root cause security problem has been identified, the one or more orchestrators can begin remediation.

For an alert generated by an operations system (as differentiated from an alert generated separately or concurrently by a security system such as a behavioral analysis system) it is in the later stages of alert analysis and just prior to the remediation process where the possibility of cyber attack must be considered. It may not be apparent initially if the problem is a result of natural failure modes or a cyber attack, so remediation steps should include the kinds of tests (e.g., test1 and test2) described above as well as other types of security related tests. There are many possible algorithms orchestrators can use to make such a determination. Examples of these algorithms include, but are not limited to, information from an external threat intelligence system, previously developed patterns, repetition of the problem, etc. If a repetition of the problem remediation is performed and then shortly thereafter another alarm of the some kind appears, having already done root cause analysis, it is unlikely that there is another subsystem experiencing a problem that is causing the recurring alarm. Therefore, it is likely to be a security problem. For example, an orchestrator may address what appears to be an operational problem by reconfiguring a parameter. When that parameter keeps changing back, the orchestrators may conclude that it is likely to be the result of a security breach and initiate a security related remediation action.

Root cause analysis may be performed in a very wide range of domains including computer/communications networks (such as, but not limited to, information systems), vehicle repair, factory systems, scientific systems (such as, but not limited to, mechanical systems), practice of medicine (such as, but not limited to, manual systems), etc. In many domains, it is performed in a completely manual fashion. In a few, ad hoc tools to assist in the process have been developed. These ad hoc tools tend to be tied to the specific implementation of the underlying system they are seeking to diagnose, and as a result are difficult/expensive to operate maintain, have difficulty handling new technology, can generate false and/or expensive to implement results, and cannot be generalized to support more than the narrow sliver of the domain they were created in. Sometimes, using manual processes, even with support from ad hoc tools, there are conflicting forces at work that make it difficult or impossible to actually solve the problem manually.

A generalizable solution for identifying and resolving otherwise conflicting forces that can be economically fielded, produces good results, and is inexpensive to maintain is disclosed herein.

Different embodiments that operate in different domains and both identify the root cause as well as resolve conflicting forces around resolution of the problem are described. The example use cases involve natural failure modes because these can sometimes be the most perplexing. A first example illustrates the identification of root cause in a Cellular network. A Cellular example is chosen because Cellular networks are good for showing the ability of a system that include distributed orchestrators to handle the combination of scale, complexity, and volatility. A second example illustrates how the distributed orchestrators can resolve otherwise intractable conflicting forces.

Root cause analysis generally involves analyzing fault alarms in a complex system that includes a large number of subsystems. Each subsystem may have its own monitoring and alarm subsystem. When there is a problem in one subsystem, it is often the case that many other subsystems generate alarms. Operations staff need to determine which of these alarms indicate "symptoms" and which indicate the root cause of the problem. Identifying the location of the root cause is critical to fixing the problem. If there is a mistake and instead, efforts are focused on "fixing" one of the symptoms, it can actually make the problem worse, lengthen disruption of service, and increase the financial damage.

Root cause analysis may involve pattern matching. The root cause of a problem detected in operations may be a result of a security attack. There are several ways that this can happen. A security attack may have the objective of disrupting the operation of the system. An operations problem can be the unintended result of successful exfiltration of data. For example, the volume of data being exfiltrated may overload the system. An operations problem may be another unintended effect of a cyber attack. For example, an attack gone wrong. Coming from the operations side, there can also be unintended security vulnerabilities created in fixing problems. For example, some systems are particularly vulnerable during recovery from certain types of problems. Attackers may wait for such problems to occur or may do things to create the problems so that they can attack during recovery. Because of these inter-relations between security systems, false positive filtering, and root cause analysis, it is advantageous to have these function resident in the same overlay system of orchestrators and conductor(s).

Finding a Difficult to Identify Root Cause and Remediating it

Figure 4A:
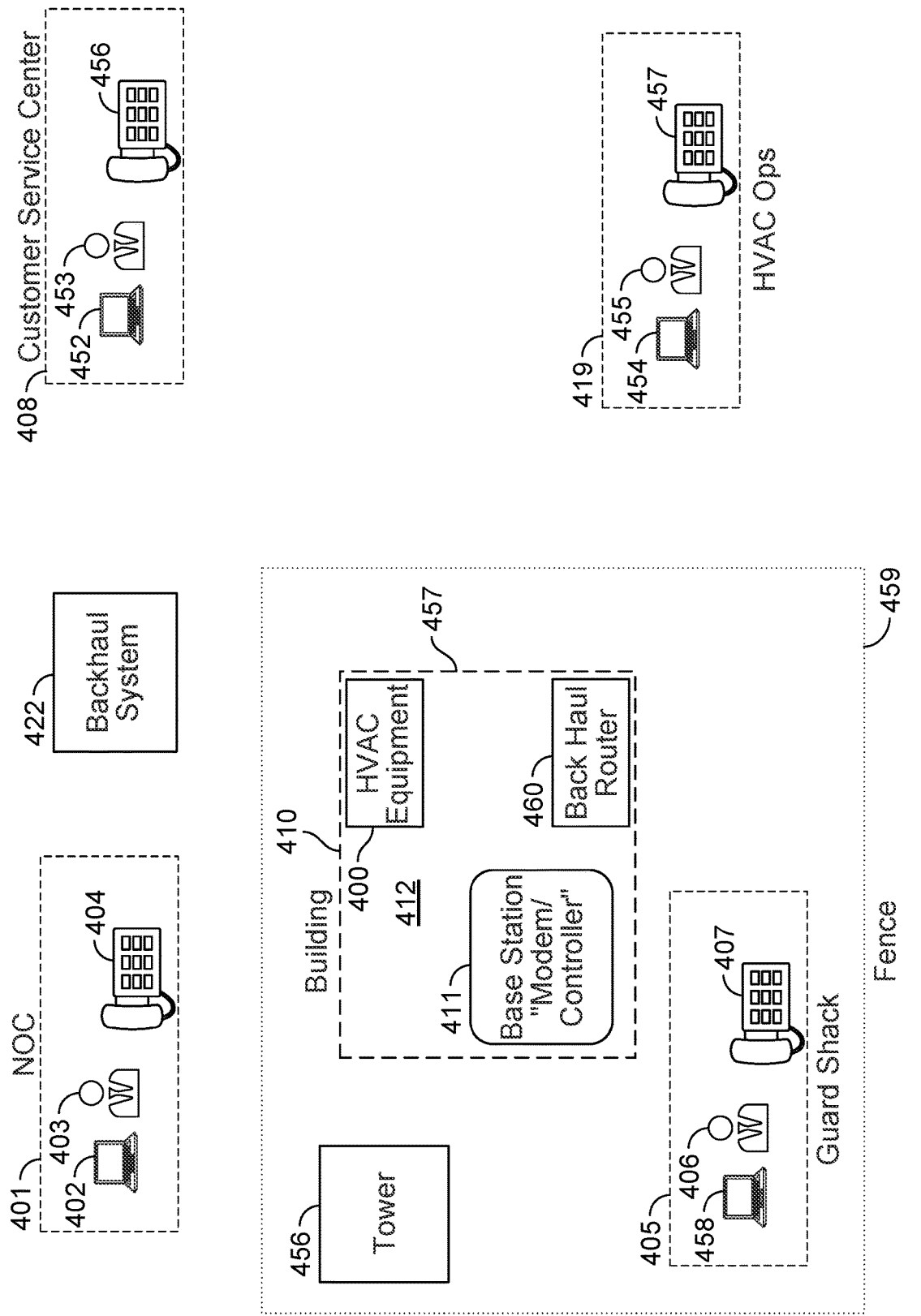
FIG. 4A illustrates an example of root cause analysis and remediation.

FIG. 4A illustrates an example of root cause analysis and remediation. This use case is a description of an actual real-life example. The example in FIG. 4A illustrates the difficulties in identifying a root cause of a problem and remediating the root cause of the problem. The system structure illustrated in FIG. 4A is comprised of an antenna tower 456 shared by many cellular operators, radio/TV stations, terrestrial microwave, etc. (tenants). The antenna tower 456 was in a compound surrounded by a chain link fence 459. Inside the fence 458 was a guard shack 405 that provided physical security for the compound. Inside guard shack 405 were guards 406. There were always at least two guards so that at least one was on duty when the other took coffee or meal breaks. Each tenant had a cinder block building inside the fence to contain the system components that worked with their antenna(s) on tower 456. One Cellular operator had such a building 410 with a door 457. Building 410 contained the part of a base station that stays on the ground (e.g., modem/controller 411), back haul router 460 and HVAC Equipment 400. The base station interfaces to a terminal 402 used by staff 403 in a network operations center (NOC) 401. The HVAC Equipment interfaces to a terminal 454 supporting staff 455 in the HVAC Operations Center 419. The Cellular operator also maintains a customer service center 408 that accepts calls from Cellular subscribers having trouble with their service.

In this example, NOC 401 was getting intermittent trouble alerts from base station 411 reporting a high number of dropped calls and backhaul system 422 reporting a high bit error rate (BER). Also, customer service center 408 was intermittently getting a high number of customer complaints about service in the area of this particular base station. At first, customer service staff 453 ignored the increase in calls, because they always went away. But after a while, they noticed that they kept coming back. So, finally, the customer service staff 453 used phone 456 to call phone 404 and tell NOC Staff 403 that customers where complaining about service in the area of the base station. NOC staff at first also ignored the alerts they were seeing for the same reason. But, when Customer Service relayed complaints, they decided that they needed to act. Meantime, HVAC staff 455 were getting intermittent alerts that the air conditioning system was not able to keep the temperature inside building 410 below the specified limit. At first, they too ignored the alerts because they always went away.

Terminal 458 in the guard shack 405 alerted guard staff 406 that intermittently the door 457 of building 410 was open. Staff 406 ignored this alert because they knew that one particular guard kept a chair inside building 410 and on nice days, he took his lunch, opened the door, sat in the sun and ate. When his lunch hour was over, the guard replaced the chair and closed the door.

Moved to act, NOC staff 403 was confronted with a difficult problem. What could be causing these alerts? They couldn't immediately determine a root cause, so they started with the least expensive intervention first. They sent a technician to building 410. The technician reported that all base station equipment seemed to be in order. Then, they sent a technician to climb tower 456 and check on the antenna and associated equipment on tower 456. That technician reported that everything seemed in order. NOC staff 403 continued to work their way through higher and higher cost interventions involving replacing base station components.

In the meantime, HVAC staff 455 did the same thing. Together, both organizations spent quite a bit of money, but the intermittent alerts continued. One day, a base station technician arrived at building 410 when the guard was sitting eating lunch with the door 457 open. The technician asked the guard if he often did that. The guard said yes. The technician went inside and closed the door. He waited while the room cooled down to its normal operating chill temperature and then hooked up diagnostic equipment to the base station 411. All readings were normal. He called NOC staff member 403 and asked if base station 411 had been showing a high BER alert and was now normal. He also asked if backhaul system 422 had been showing high retransmission rates and was now normal. Both answers were yes. Then, the technician called the HVAC ops staff 455 asked the same question and got the same result. The technician then went to the guard shack staff 406 and explained that it was very important that guard staff not sit with the door 457 of building 411 open.

After convincing the guard staff to keep the door closed, there were no more intermittent alerts and customer service stopped calling with customer complaints. So, the root cause was guard staff leaving the door open. When it is hot outside and with the door 457 open, HVAC system 400 is not able to keep the processors in the base station modem/controller and backhaul equipment 411 cool enough. The processors have automatic functions that slow their clock speed when they get too hot (to avoid catastrophic failure of the chips). As the processors slow down, the retransmission rate and BER go up. So, in this example, the root cause is that the door is open, and the HVAC system can't keep the processor cool. As we have seen, this was a very hard and expensive problem for manual staff to correctly identify.

Figure 4B:
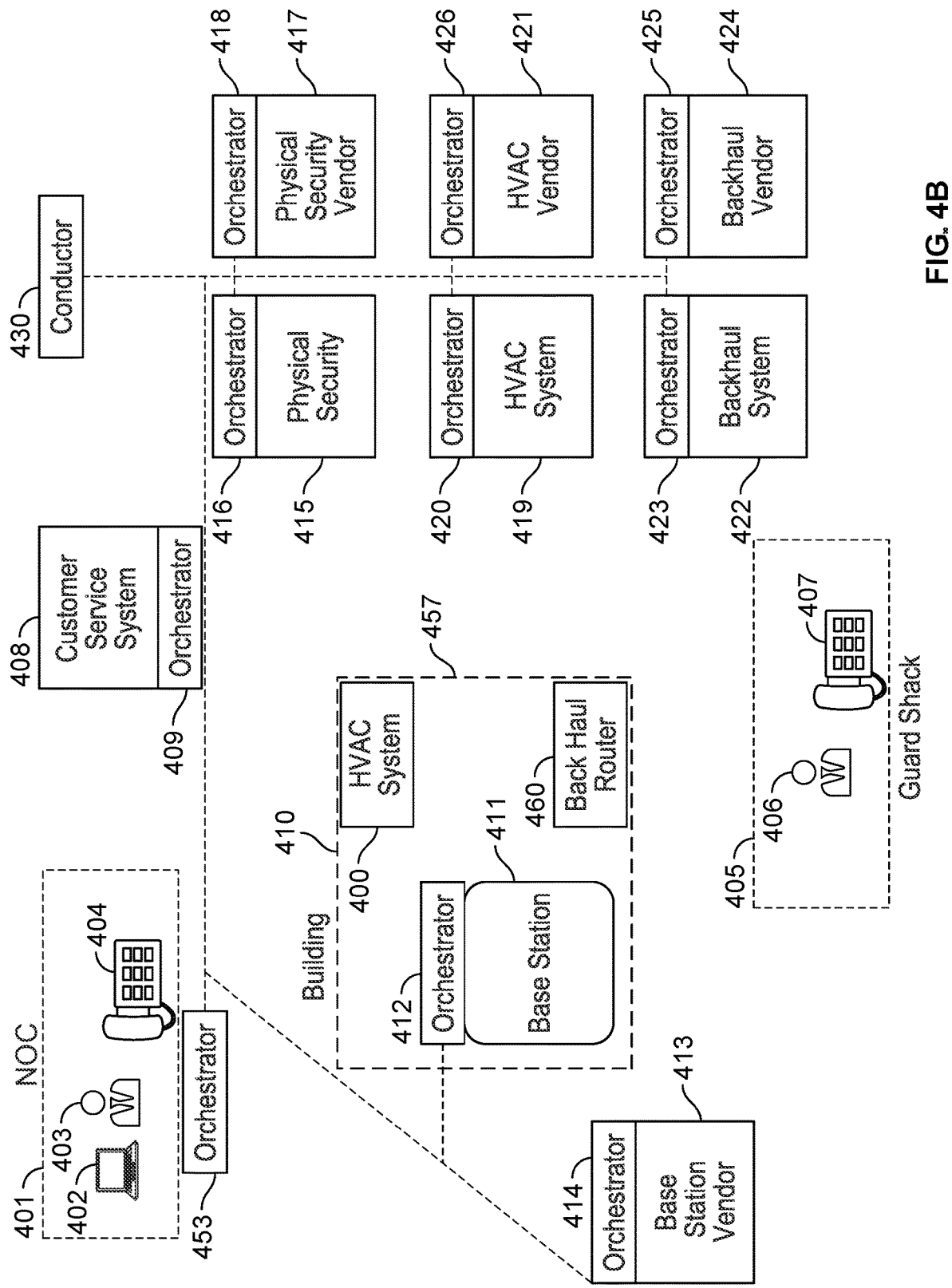
FIG. 4B is a block diagram illustrating a system to provide root cause analysis and remediation in accordance with some embodiments.

FIG. 4B is a block diagram illustrating a system to provide root cause analysis and remediation in accordance with some embodiments. The system depicted in FIG. 4B may be implemented to detect and remediate the problems associated with the system depicted in FIG. 4A. Physical security system 415 may alert when there is an open door in the building 410, HVAC system 400 through its System 419 may alert that it is overheating, backhaul system 422 may alert a high BER (Bit Error Rate), base station 411 may alert that the retransmission rate is high, and customer service system 408 may alert that customers are complaining of poor service in the neighborhood of base station 411.

Similar to the system in FIG. 4A, base station 411 and back haul 422 in FIG. 4B may be configured to send alerts to NOC 401. The door open alert may be sent to physical security system 415 that collects all alerts sent to the Guard Shack 405. HVAC system 419 and customer service systems 408 may be managed by separate administrative units with their own operations centers (not shown). However, orchestrators associated with each of the above (e.g., orchestrators 412, 423, 453, 416) capture the information from the various systems and deliver it to orchestrator 412. Conductor 430 may be responsible for creating, placing the orchestrators, and updating their configuration as required. The root cause analysis function can reside in any of the orchestrators 402, 409, 412, 414, 416, 418, 420, 426, 423, 425 or in conductor 430. In this embodiment, the root cause analysis function resides in the orchestrator 412. Because the different systems generating and capturing alerts have different performance characteristics (different processing latencies) and are different distances from the other orchestrators and conductor (different propagation delays), alerts may arrive at the location of the root cause function at different times. But eventually, the orchestrator with the root cause function has all the data.

There are many possible algorithms that can be used to determine the root cause. Examples include algorithms based on: tree and branch analysis, graph tracing, Boolean algebra, statistical analysis, Bayesian models, etc. Different algorithms may employ different sets of constraints. In this embodiment, a scoring algorithm is used (similar to the one used in the false positive filtering embodiments described above).

The root cause analysis function may be triggered by the arrival of the first alert. The first constraint of the orchestrator may require the root cause analysis function to wait a set amount of time to allow other alerts, if any, to arrive. The wait time (e.g., one second) may be a parameter set by conductor 430. In this example, within this time, all of the alerts arrive.

The root cause analysis function may subsequently check for a pattern match. Patterns can originate in a variety of ways and come from a variety of sources, such as experience, simulation, design, third party vendors, the organization, etc. The patterns may consist of a specific set of symptoms and/or parameter values that have been shown in the past to have a specific root cause. In this example, HVAC vendor system 421 contains such patterns and its associated orchestrator 422 captures these patterns as they become available and deliver them to conductor 430. In this example, conductor 430 delivers base station related patterns to orchestrator 412. The same happens with backhaul vendor system 424 and its associated orchestrator 425, and physical security vendor system 417 and its associated orchestrator 418. Experience inside this organization may be captured and compiled into patterns by any of the orchestrators or conductor(s). In this example, conductor 430 captures the inputs, root cause analysis results, and follow-on experience from all orchestrators and uses them to generate patterns that are then downloaded into the appropriate orchestrator. In this example, the pattern and root cause are downloaded into orchestrator 412 and the remediation action that has proved effective in the past for this root cause is loaded into the orchestrator 403 associated with NOC 401.

It is interesting to note that there are fundamental differences around pattern matching in root cause analysis between naturally occurring faults and the results of cyber attacks. Cyber attackers have an incentive to avoid forms of attack that follow a previously identified pattern. Thus, there can be a high degree of pattern volatility in the patterns resulting from cyber attacks. Naturally occurring problems have no such incentive. However, there are patterns that can be clearly associated with cyber attacks. In these cases, pattern recognition can be used to not only point to the location of the root cause, but also indicate its most efficacious remediation method.

In this example, if there is a pattern match, orchestrator 412 marks the root cause as per the pattern and sends the result to the NOC orchestrator 453. NOC orchestrator 453 may then send a summary of the pattern and the recommended remediation to NOC staff 403 via computing device 402. In response, NOC staff 403 may implement the recommended remediation (either trigger an automated remediation, or manually perform remediation). Alternatively, NOC orchestrator 453 may initiate remediation automatically and send NOC staff 403 a report. Which of these three alternatives is to be selected is set in orchestrator 453 by the conductor 430. The base station orchestrator 412 may then be notified of the remediation action. If the action clears all the alerts and the system returns to normal activity, a message marking the pattern/remediation as "good" may be sent to conductor 430. If the remediation is not effective, then the root cause analysis function may proceed to the next step.

If there is no pattern match, or the matched pattern/remediation has proven to not be effective, then the root cause analysis function may begin to apply the rest of the algorithm to determine the root cause. In this example, the rest of the algorithm is a scoring algorithm similar to that described in the false positive filtering example above and is performed in the base station orchestrator 412 (there are many other possible types of algorithms that can be uses as discussed in above examples). The determination of location of the root cause function may be made by conductor 430. Conductor 430 may use an algorithm based on the cost (therefore implied complexity) of the various subsystem elements. There are many algorithms that can be used to calculate cost and implied complexity. The cost associated with a subsystem element may be based on the purchase price of the type of each subsystem element, the vendor's annual maintenance fee for the subsystem, the number of lines of code in each subsystem, the running code footprint in each subsystem, processor cycles per second consumed by each subsystem, number of virtual machines per subsystem, number of containers per subsystem, number of processors used, amount of on-line storage consumed, number of internal communications interfaces, number of external communications interfaces, bandwidth of interfaces, combinations of these, etc. The choice of type of algorithm and what parameters to base it on can be determined by negotiation between the orchestrators, by the Conductor, and/or by operations staff (including programing staff supporting operations).

The Conductor and/or orchestrators can observe the results obtained using different algorithms (with different parameter sets and parameter weightings if combinations are employed), constraints, and objectives. Based on the resulting observations, using objectives algorithms and constraints, the conductor and/or orchestrators can modify objectives, algorithms, and constraints to produce the optimal results. Thus, over time, performance will improve. The cost of each type of subsystem element is stored in conductor 430. Conductor 430 may assign the root cause analysis function to the orchestrator (e.g., orchestrator 412) of the most expensive subsystem element (e.g., base station 411).

In this example, orchestrator 412 has all the alerts. Orchestrator 412 may assign numerical values to each alert in the following fashion. A value of "1" may be assigned for each other alert that has the potential to be cleared by clearing the examined alert (fixing or replacing the subsystem). In some embodiments, the scoring values are determined by the functional distance of the subsystem from the end function of the installation in question. For example, in this example, the end function is resonance with the electromagnetic spectrum. Thus, tower 456 (not shown in FIG. 4B) has no other function subsystem between it and the end function and would be scored zero. In this example, the cell site base station 411 has a value of "1," backhaul router 460 has a value of "2," HVAC system 400 has a value of "3," and door 457 has a value of "4." After assigning values to the subsystems, orchestrator 412 may apply the constraint:

choose the subsystem component with the highest value and notify NOC staff 403 that it is the most probable location of the root cause. In this example, that is door 457. In response to receiving this information NOC staff 403 may call guard staff 406 and ask them to check door 457 and determine if it is working properly. Guard staff 406 may then check and report back that door 457 is working properly. Then, NOC staff 403 may ask guard staff 406 to check and see if anyone is leaving the door open intermittently. This check exposes the guard behavior that is causing the problem and policy changes fix the problem. The set of alerts, root cause analysis results and remediation effectiveness are captured by the pattern development function. In other embodiments, the door being left open could be part of an organized attack and false positive filtering could come into play leading to different type of remediation. This example illustrates how the root cause analysis described herein can improve Quality of Service/Quality of Experience (QoS/QoE), while dramatically reducing costs. The time to deliver the root cause analysis conclusion to NOC 401 is less than a second after the latency delay. In this embodiment, a one second latency delay plus one second to compute and deliver the result. There is no opportunity for a fat finger problem to occur, etc.

Remediation of Difficult to Remediate Root Causes

Sometimes, once the root cause has been identified, remediation within the capabilities of the existing system is not feasible. This situation can occur for many reasons. One of the most common is conflicting forces at work—primarily amongst people involved in the management of the system. Some, consider that the technical view of systems only includes the machines. But in the overwhelming majority of cases people play an important role. Not considering human actors as part of a system can have catastrophic results. These kinds of problems involving people and conflicting forces can prove to be intractable and lead to dire consequences for the organization that relies on the underlying system.

Figure 5A:
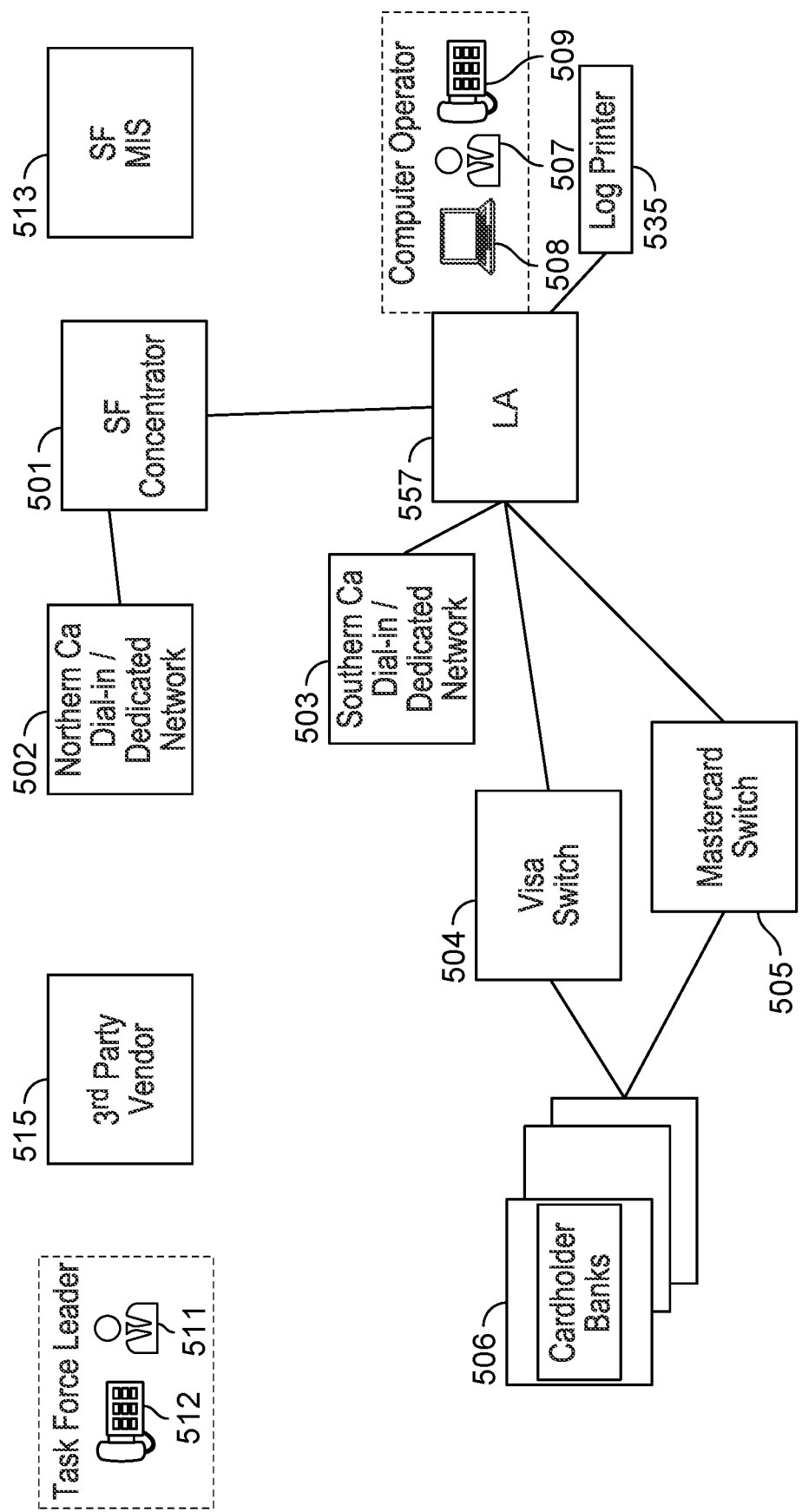
FIG. 5A illustrates an example of root cause analysis and remediation.

FIG. 5A illustrates an example of this problem. The credit card business in a bank is divided into two pieces: the cardholder side of the business and the merchant authorization side of the business. The merchant authorization side of the business is responsible for authorizing transactions at the point of sale. FIG. 5A illustrates an example of the merchant authorization side of the business. The example illustrated in FIG. 5A is based on a real-life example.

FIG. 5A is comprised of two centers: the main processing center 557 in Los Angles and a communications concentrator 501 in SF. The communications concentrator 501 may serve merchants in northern California via dial up and dedicated network access 502 and main processing center 557 may do the same for Southern California via dial up and dedicated network access 503. Main processing center 557 also does the processing and switching for all transactions. When a merchant initiates a credit card transaction, the bank merchant system tells the merchant whether or not the cardholder (includes fraud detection, etc.) for that transaction is a good credit risk (authorizes the transaction) or is not (declines the transaction). The actual decision is made by the one of the cardholder banks 506. The network and relationships associated with cardholder banks are simplified for explanation purposes. When main processing center 557 receives an authorization request, main processing center 557 switches the authorization request to either Visa switch 504 or Mastercard switch 505, who in turn switch the transaction to the appropriate cardholder bank 506. The response (authorized/declined) from the appropriate cardholder bank comes back through the same path. System requirements at the time by contract with Visa and Mastercard was specified that the round trip time from a transaction being entered into the merchant terminal and the response being delivered back was 12 seconds.

Merchant authorization started much earlier with only telephone authorizations called voice authorization. In this example, merchant staff called a call center and staff entered the transaction into a terminal at the call center. In this example, voice authorizations were still used even though the overwhelming number of transactions came through merchant terminals.

The nature of the retail business is such that approximately more than 70% of the annual number of merchant authorization transactions processed by one of the cardholder banks 506 occurred between the first Saturday after Thanksgiving and the last Saturday before Christmas (i.e., holiday shopping season) with peak days being those two Saturdays. For some years the LA processing center computer system 557 had been crashing repeatedly during the holiday shopping season. When the system 557 crashed, merchants associated with system 557 could not get transactions authorized, lost sales, and had long lines at checkout. Each time the system 557 crashed, system 557 would be down for an extended period of time (e.g., 12 hour or more) and when system 557 came back up, it would often crash again—over and over for the rest of the day. As a result, merchants were moving their merchant authorization services to one of the other cardholder banks 506. Unfortunately, when a merchant moved the authorization business, it frequently found it more convenient to move the rest of its business as well.

In this example, senior management stepped in and formed a task force comprised of an outside consultant, several representatives of a third party vendor 515 providing the system 557 (one of which was a senior technical engineer), representatives of the cardholder business, and technical experts from many parts of the bank (including the SF MIS group 513 responsible for the LA system 557). The task force had a core of 20 members and drew on others inside and outside of the bank. It started 6 months before the holiday shopping season. The directive from senior management was not to try to find the root cause, but rather fix everything. A technologist reporting to card holder business management was put in charge of the task force (e.g., task force leader 511).

The total cost was more than $100 million in current dollars. Computer hardware, operating system, data base management system (DBMS), etc. were upgraded. A dedicated team of software developers was assigned to go through the application code to find and fix all bugs. At the time, the Computer operations staff 507 were low level technicians with at most two years of college (AA degrees). They were not directly involved in the task force.

System 557 produced a log file every five minutes. Log files were printed on paper by the log printer 535. When system 557 crashed, it lost all the data it had been collecting for the next printout. Therefore, there was no log information about what happened just before system 557 crashed.

Taskforce leader 511 didn't have easy access to the processing system 557 in LA. On his own initiative, he started communicating with LA operations staff 507 via phones 512, 509. Unlike the log system, computer operator console 508 is configured to receive information on various aspects of the system 557 in sub-second timing. There are a variety of parameters shown. One of those parameters is the percent of the in-process transaction buffer in use. Operator 507 informed task force leader 511 that he had a hunch about what was causing the crashes, but was reluctant to talk about it for fear of losing his job.

In this example, that year, on the first Saturday after Thanksgiving, the system crashed. But it only crashed once. So all the money spent had produced some improvement. But the card holder business management was still very concerned because the volume on the last Saturday before Christmas was going to be much higher than the volume on the first Saturday after Thanksgiving. On the last Saturday before Christmas, Operator 507 and task force leader 511 worked together to prevent the system from crashing. Operator 507 monitored transaction volume and informed task force leader 511 that the utilization of the transaction buffer was reaching 80%. Operator 507 noticed that when the transaction buffer got to 85%, system 557 crashed. Operator 507 requested task force leader 511 to delete the contents of the transaction buffer when the utilization of the transaction buffer approached 85%. With authorization from task force leader 507, operator 507 deleted the contents of the transaction buffer and prevented system 557 from crashing. Operator 507 continued to monitor the transaction buffer and each time the transaction buffer approached 85%, operator 507 deleted the contents of the transaction buffer. Each time, this prevented system 557 from crashing.

After the holidays, task force leader 511 investigated the transaction buffer and discovered that there was a timeout set on broken transactions. The buffer timeout was set to three minutes. For terminal originated transactions, a buffer timeout of three minutes was too much. It turned out that the timeout was set for the convenience of the voice authorization call center. Their transactions typically took more than a minute and a time-out shorter than three minutes would force them to reenter some small percentage of their transactions. Voice authorizations accounted for less than 10% of transactions on normal days and far less than that on busy days. But, because of the long time-out, on busy days the buffer became full of broken terminal transactions to the point where there was no more room to post another in-process transaction, and that caused system 557 to crash. When system 557 came back up, there were so many transactions waiting at merchants that the buffer again became overloaded and system 557 crashed again. When the buffer was deleted, 98% of the transactions deleted were broken terminal originated transactions. Approximately 1.5% of the transactions were in process terminal transactions, which were automatically restarted, resulting in complete transactions within 50 seconds (far better for the merchant to have a small number of 50 second delays than to have all checkout counters stalled for 30 minutes to an hour while the system was restarted). There were also a small number of voice transactions that had to be re-entered (from high single digits to low double digits far less than 0.001% of the daily volume).

Task force leader 511 recommended reducing the buffer timeout time. That would cause some minor inconvenience to the call center operators, but would preserve the business. Unfortunately, the web of personal relationships between the manager of call center operations and the manager of systems development prevented any reduction in the buffer timeout. Operator 507 and task force leader 511 left the bank for different jobs. The following Christmas, system 557 repeatedly crashed again. The bank was bought out by another bank that had a merchant authorization system that did not crash.

This example illustrates that a critical communications/computing system whose machine parts functioned as designed, failed because of the people who were part of that system. And it was the personal relationships between the people that made it impossible to fix the problem with existing technology. Computer operators 507 were never going to be given the authority to delete the buffer contents. Without the task force, there would be no one with the authority to tell the computer operator to delete the buffer contents. There was no one else with either the authority or the understanding to do so.

Figure 5B:
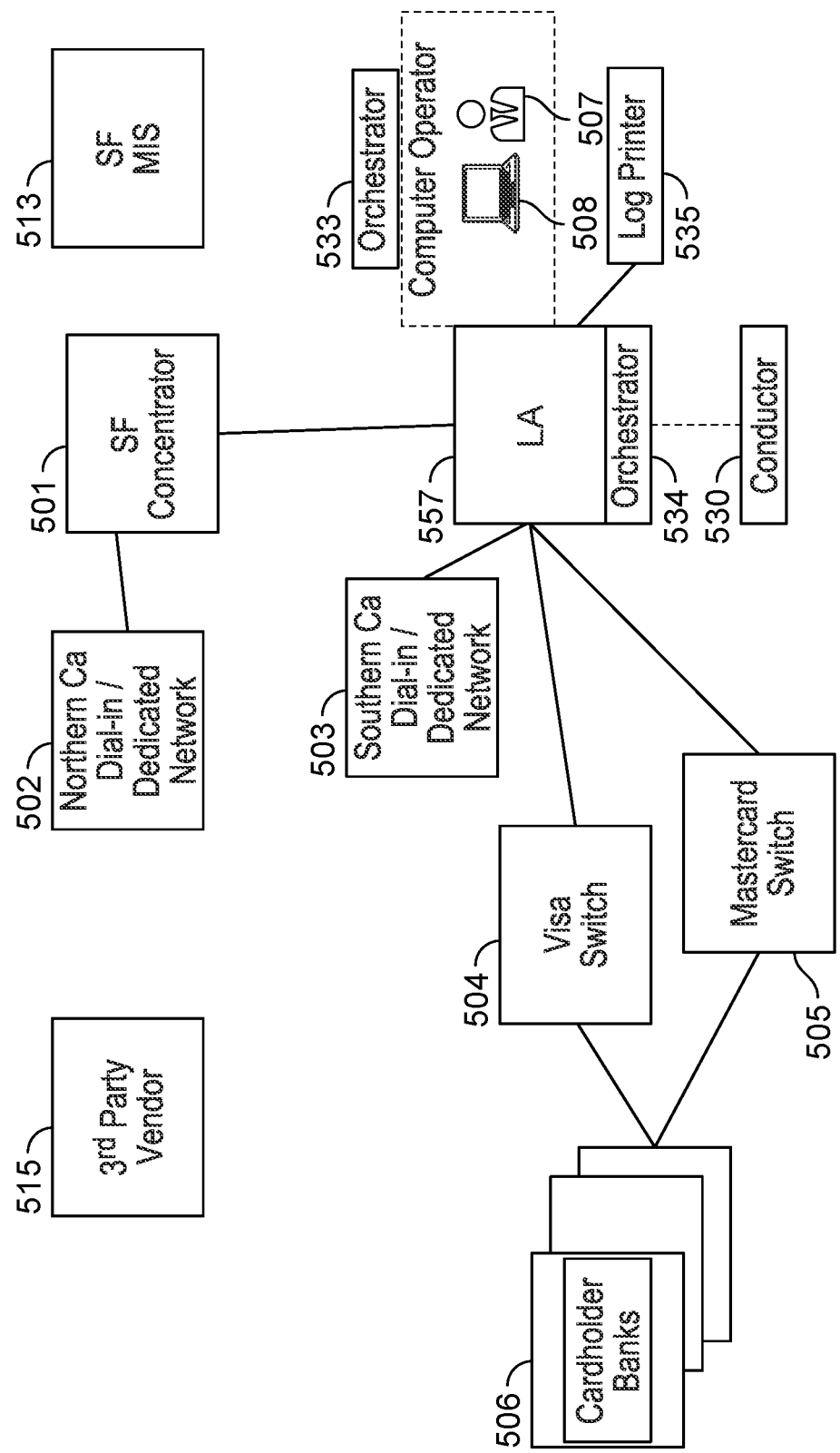
FIG. 5B is a block diagram illustrating a system to provide root cause analysis and remediation in accordance with some embodiments.

FIG. 5B is a block diagram illustrating a system to provide root cause analysis and remediation in accordance with some embodiments. FIG. 5B is similar to FIG. 5A, except that task force leader 511 has been removed and orchestrators 533, 534 have been added. Orchestrator 533 is associated with computer operator console 508 and orchestrator 534 is associated with system 557. Conductor 530 is added to create, deploy, and configure the Orchestrators.

Orchestrator 533 is configured to view the feed to operations terminal 508 and detect the impending problem. With an algorithm and constraint, orchestrator 533 may trigger orchestrator 534 to instruct system 557 to delete the buffer file and notify computer operator 507 of the action. Since this may only happen when a system crash is impending, it would actually reduce the inconvenience of the voice operators. This is because the voice operators still have to answer incoming authorization calls when the computer has crashed and explain to callers why they can't provide an authorization. Having to restart a few transactions is much less stressful than that. This embodiment is relatively inexpensive to implement and would have resolved the conflicting demands, as described with respect to FIG. 5A, in such a way as to solve the problem and preserve the business.

Root Cause Application in Other Fields

In U.S. patent application Ser. No. 15/492,541 entitled "Mobile Base Station Network," filed Apr. 20, 2017, the entire contents of which are incorporated herein by reference, symptoms associated with the base station were discussed. Medical systems experience similar symptoms and problems. Because, medicine is broken up into separate specialties, each with its own non-compatible specialized tools and sometimes in different economic units (companies, divisions, government agencies, countries, etc.) each with its own reporting mechanisms, and non-compatible Electronic Health Records (EHR) the health care practitioners may get the equivalent of many different alarms and have the same problem finding the root cause to treat. For example, a patient complains to the eye doctor about headaches. A hematologist notes that there is a low clotting factor. An internist notes that there is a low level of B12. Should the patient receive new glasses? Coagulation drugs? Vitamin B12 supplement? Orchestrators associated with the different EHR systems used by the different doctors and their supporting staffs (as described in U.S. patent application Ser. No. 13/290,767 entitled "Collaborative Computing And Electronic Records," filed Nov. 7, 2011 which is incorporated herein by reference for all purposes) can, using the negotiation process and/or conductors, identify the root cause and point to the best treatment options for addressing it.

There are also similarities with problems involving moving Cloud apps. Cloud systems typically have a system to manage the location of apps within their own Cloud. But these systems typically do not extend to managing the movement of apps between Private and Public Clouds, nor between non-compatible Clouds (public to public, private to public, and private to private). In these cases, organizations (enterprises, government entities, etc.) manually develop policies, manually seek to implement these policies, and manually change the apps. These policies typically are driven by cost and security concerns. There can also be root cause analysis and true positive determinations that indicate that all (for example system overload) or part of a superior remediation action is moving the app to another Cloud and sometimes an incompatible Cloud. By using the corresponding objectives, corresponding algorithms, and corresponding constraints in the orchestrators/conductor(s) and the negotiation process, it is possible to automate the development and execution of these. That can greatly reduce costs and improve performance.

Similar situations exist in automobile repair. Most people can remember an instance when a mechanic has said, "Let's try this and see if it works. If the problem doesn't go away, we will try something else." And then watch as the number of things to try, and the bill goes up. There are many domains where root cause analysis using Orchestrators and Conductor(s) can play a very valuable role.

Simulation in False Positive Filtering and Root Cause Analysis

In some situations it is not obvious, even with all the information, what the true situation is (easy to understand in the root cause case, harder to visualize in the false positive case). In such situations, simulation may provide the path to a solution. The simulation process can be distributed or centralized. In a centralized simulation process, a single central site system may collect all necessary information and perform the simulation. A special purpose dedicated system or a conductor is configured to perform a centralized simulation process. In a distributed simulation process, there may be a number of subsystems in a number of locations in the network that cooperatively do the simulation. In one distributed simulation process embodiment, a plurality of orchestrators share the overall task of performing the simulation. Each orchestrator of the plurality of orchestrators, based on its corresponding objectives, corresponding algorithm, and corresponding constraints, negotiates with the other orchestrators to define how each orchestrator of the plurality of orchestrators, and possibly the conductor(s) will contribute to the group simulation process. The plurality of orchestrators, and possibly the conductor(s) may reach an agreement and, according to that agreement, each is configured to perform its assigned portion of the simulation.

In either centralized or distributed embodiments, the simulation involves using the data from the orchestrators and conductor(s) to create a model of the system. The model can be imported from outside through an appropriate orchestrator. Examples of outside sources include behavioral analysis systems, such as behavioral analysis system 203 that is associated with orchestrator 332 in FIG. 3A, threat intelligence system 319 that is associated with orchestrator 340, external Big Data Systems, etc. Outside sources may also be created entirely manually and entered into the system. In some embodiments, the outside sources can be created by a combination of the above and what is described below.

The model is a functional representation of the system. That is, it is a functional representation of each sub-system at the control plane level. For example, if the real subsystem X does A and it causes subsystem Y to do B, then in the simulated model, when the virtual subsystem X does A it causes the virtual subsystem Y to do B.

This model can be created entirely by the system without human involvement. In some embodiments, a conductor starts with an umbrella data model, which may provide a map of all the data elements in the system. The conductor in its normal operation may develop a map of the network and have a record of all the data types collected by each orchestrator of the system. Based on this information, the conductor may have everything needed to construct a model of the system except causality. Some of the causality is documented in the triggers in each orchestrator. The conductor may receive and store this information in the normal course of its operation. But to complete the causality portion of the model, the conductor may need to fill in the causality relationships. This may be done by observation. There is a formal source of error called "after therefore because of." However, this error may be reduced by a combination of the map/partial causality information described above and the use of statistical techniques. The conductor may access portions of the underlying network through the orchestrators associated with that portion of the network and collect otherwise transient data (portions of the network are examined one at a time to reduce the chance that this activity could overload the network and reduce performance). The conductor may collect samples and use statistical algorithms to fill in the map of causality in that region. The result is a workable simulation of the network. This process can be called a "discovered simulation." There are other discovery methods possible including having all the orchestrators report who they are communicating with, using the negotiation process, a combination of these, etc.

This simulation model can be used to test hypotheses about false positives, root causes, effects of other potential forces (including outside information sources) working on the network, addition of new components/functions to the network, etc.

In some centralized root cause analysis embodiments, the conductor is configured to simulate the interaction of the subsystems creating alarms and performs tests on different simulated combinations and permutations. In some centralized false positive filtering embodiments, the conductor tests the hypothesis that the alert was a true positive by applying remediation to the simulation model and subsequently testing the result.

Identifying the Solution Space

In extremely complex systems with many subsystems interacting in different ways, it may not be possible to arrive at a final answer (root cause; true/false positive). However, it may be possible to reduce the area of uncertainty (i.e., the possible alternatives and identify a smaller subset of alternatives where the likely solution lies). This is sometimes called identifying the solution space. Doing so, can greatly help the human technicians who then have to perform additional investigations to make a final determination. By identifying the solution space the amount of time, money, and other resources that have to be expended to achieve a determination can be greatly reduced.

This can be done in a similar fashion to that described in U.S. patent application Ser. No. 13/290,760 entitled "Integrated Circuit Design and Operation," filed on Nov. 7, 2011, the negotiation process described in U.S. patent application Ser. No. 15/411,546 entitled "Self Organizing System to Implement Emerging Technologies," filed on Jan. 20, 2017, which is incorporated herein by reference for all purposes, using a scoring or other type of algorithm as described above, and/or using the simulation process described above.

Root Cause Analysis in Cyber Security

To understand the complex security problems and to explain how embodiments involving a combination of false positive identification and root cause analysis can be used to overcome them, two use cases will be described and then analyzed. The first use case involves the attack by Country 1 and Country 2 governments on a uranium enrichment facility located in Country 3. The second case involves the potential to exfiltrate otherwise protected data to unauthorized users from any public Cloud by exploitation of in-chip vulnerabilities such as 'Specter', 'Meltdown', etc.

Uranium Centrifuge Attack

Figure 6A:
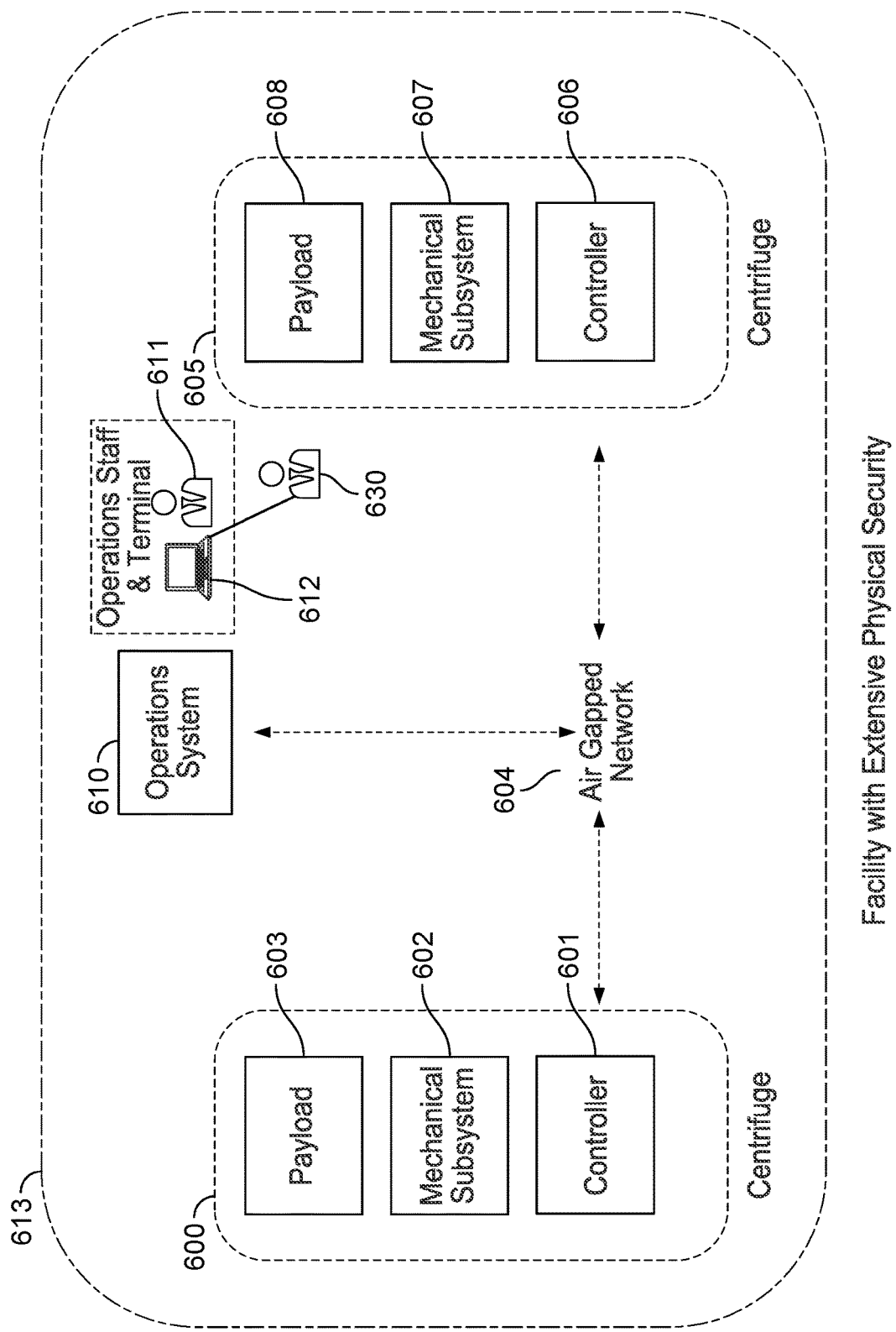
FIG. 6A illustrates an example of root cause analysis and remediation.

Publicly available reporting provides the basic information for this description of the cyber attack on County 3's centrifuge complex. As shown in FIG. 6A, country 3 set up a number of centrifuges from 600, 605 in a facility 613 (e.g., an underground bunker) with extensive physical security to separate higher weight isotopes of Uranium for potential nuclear power and weapons use. Although only two centrifuges are depicted, country 3 may have set up more than two centrifuges. Each centrifuge may be comprised of a corresponding controller (e.g., controllers 601, 606), a corresponding mechanical subsystem (e.g., mechanical subsystems 602, 607), and a corresponding payload (e.g., payloads 603, 608). Each centrifuge may be connected through a local network 604 to operations system 610, which is used by operations staff 611 via terminal(s) 612 connected to operations system 610. Country 3 is very concerned about cyber security and based on this concern, air-gapped local network 604. That is, they made sure that there was no electronic communication connection between network 604 and any external network.

Countries 1 and 2 were concerned about a potential nuclear threat and wanted to stop the development of enriched Uranium. They considered a bombing attack, but were discouraged by the buried bunker. Instead they developed a software virus that would cause a controller (e.g., controller 601, 606) of a centrifuge (e.g., centrifuge 600, 605) to spin the centrifuge at a speed where it would self-destruct. To get around air-gapped network 604, countries 1 and 2 were able to get a representative 630 of a vendor who was authorized to enter and access an operations terminal 612 to carry the virus into the facility and introduce the virus to operations system 610. From the operations system, the virus proliferated through Air Gap Network 604 to all of the controllers of the centrifuges (e.g., controller 601, 606).

Centrifuges are very delicate. They frequently break. The forces at work when a centrifuge is spinning at high speed are quite large. Just normal wear and tear can cause bearings to fail in such a way that the apparatus self-destructs. The placement and amount of the payload is also critical. If the payload is not balanced correctly, it can create a harmonic vibration that will tear the machine apart.

When the centrifuges started to fail, operations staff 611 thought it was just normal breakage. But, when the number of failures grew larger, they became concerned. Struggling to find the root cause, operations staff 611 first turned their attention to staff and procedures. Were the Payloads being correctly balanced? Were the staff maintaining them correctly, etc.? However, with every improvement in staff and procedures, the centrifuges kept failing. So, next operations staff 611 started looking for a mechanical problem in the corresponding mechanical sub system of a centrifuge (602/607).

No matter how hard they worked, centrifuges kept failing. Operations staff 611 was so confident that the physical security of facility 613 and air-gapped network 604 were impenetrable, that they never looked at the possibility that code in a centrifuge controller had been compromised. Furthermore, the centrifuge controller code was largely written in machine language and finding the changes that the virus had inserted would have been difficult.

Finally, senior government officials lost patience. In a manner similar to what senior management at the Bank in the credit authorization case described above did, they ordered the removal of all centrifuges, air gapped network 604, and operations system 610. Then, they arranged to start from scratch building a new cohort of centrifuges, etc.

The rebuild triggered a new effort by countries 1 and 2 that resulted in a variant of the attacking code being introduced through a networking attack vector. This new variant and attack vector was successful, and centrifuges started self-destructing again. However, the virus got out into the internet and the chips and platform software in the centrifuge controllers were used in many other types of systems. These systems around the world started to fail and a commercial virus checker company managed to capture a copy of the attacking code that had been inserted. The commercial virus checker company traced the code back to a particular country 1 organization and named the virus Xnet. All of this was publicized, which enabled country 3 to discover that their systems had been breached. This led to a third tear down and rebuild from scratch.

The objective of the countries 1 and 2's effort was to slow down the country 3's development of nuclear technology. It is estimated that these two attacks resulted in a two to three year delay. So, from that perspective, the attack was successful and the defense failed. The primary failure was in root cause analysis. The danger is that this kind of attack can be used against the many other types of infrastructure that have similar components/subsystems.

Country 3 used manual root cause analysis, which is subject to human prejudice. It was human prejudice that was the major cause of the failure of country 3's root cause analysis. Their prejudice told them that their air-gapped network was invulnerable and that the controller code in the controllers 601, 605 was well tested, reliable, hard to read, and not worth looking at. If their root cause analysis had been effective, and they isolated the problem to the controller code, they could have looked for a naturally occurring bug or an attack vector. So, here again it is the human actors in the system who are preventing the solution of a critical problem.

Figure 6B:
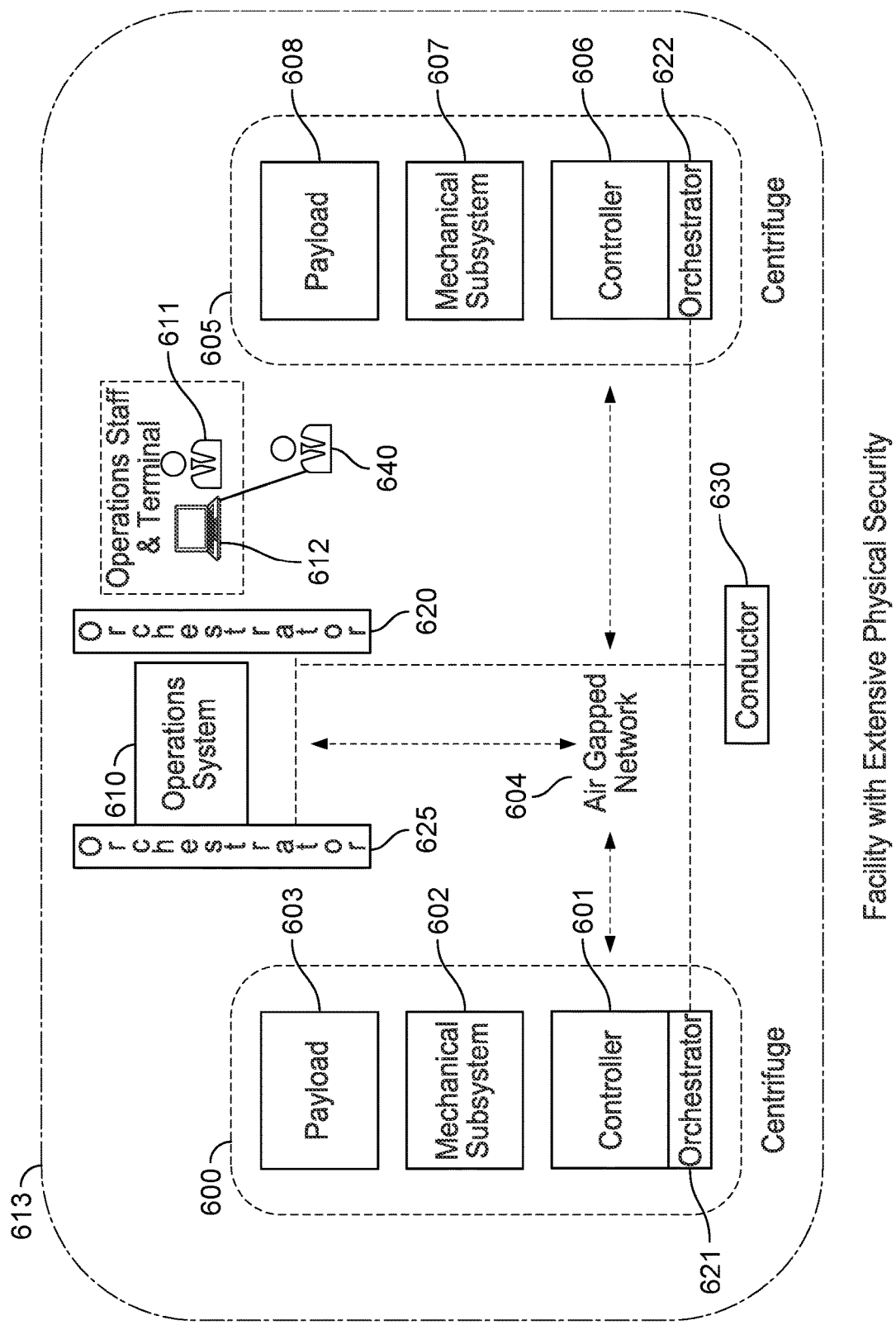
FIG. 6B is a block diagram illustrating a system to provide root cause analysis and remediation in accordance with some embodiments.

FIG. 6B is a block diagram illustrating a system to provide root cause analysis and remediation in accordance with some embodiments. One of the advantages with the system depicted in FIG. 6B is that it can avoid the human prejudice problem. As long as the corresponding objectives, corresponding algorithms, and corresponding constraints associated with one or more orchestrators are correctly structured, the automated solution will operate without prejudice. The root cause analysis function may be automated by deploying orchestrators 620, 621, 622 and conductor 630, and thereby avoid the prejudice problems discussed above.

There are two characteristics of this example that influence the set-up of this embodiment. First, the centrifuge controllers (e.g., controllers 601, 606) are so tightly bound to their corresponding Mechanical Centrifuge subsystems, (e.g., mechanical subsystems 602,607) with only power going to the centrifuge electric motor and an analog signal coming back indicating RPM (both buried in internal wiring) that it is not possible to instrument this interface. And, therefore it is not possible to insert an orchestrator between a centrifuge controller and the centrifuge mechanical subsystem. Second, software updates were routinely inserted by third party vendors into operations system 610 via operations terminal 612. Thus, the behavioral analysis performed by orchestrator 620 (or any other Orchestrator or behavioral analysis engine inserted any place in the network) would not alarm the third party vendor staff member 630 when he was inserting software that carried a virus, such as Xnet. Rather it would be seen as a normal function of a person who normally did those kinds of things.

Orchestrator 621 is associated with centrifuge 600 and in particular, the interface between its controller 601 and operations system 610. It may be located close to centrifuge 600, but in a separate housing such that if and when centrifuge 600 has a catastrophic failure, controller 601 will not be damaged. In a similar fashion, orchestrator 622 is associated with and housed by centrifuge 605 and is the interface between controller 606 and operations system 610. Orchestrator 625 is associated with operations system 610. Orchestrator 620 is associated with the operations staff terminal 612.

In some embodiments, the objective of orchestrators 621, 622 is to maximize the parameter "hours.spinning." In some embodiments, the objective of orchestrator 620 is to provide operations staff 611 through terminal 612 with access control, privilege control, and data visualization to reduce rat finger problems and improve operations efficiency.

In some embodiments, the objective of orchestrator 625 is to maximize the parameter "hours.centrifugecohort.spinning." To do this, orchestrator 625 may employ its corresponding one or more algorithms associated with maintenance schedules, operations procedures, hours.spinning for each centrifuge, etc.

In some embodiments, the determination of location of the root cause function is made by conductor 630. Conductor 630 may use an algorithm based on the cost (therefore implied complexity) of the various subsystem elements. There are many algorithms that can be used to calculate cost and implied complexity. The cost associated with a subsystem element may be based on the purchase price of the type of each subsystem element, the vendor's annual maintenance fee for the subsystem, the number of lines of code in each subsystem, the running code footprint in each subsystem, processor cycles per second consumed by each subsystem, number of virtual machines per subsystem, number of containers per subsystem, number of processors used, amount of on-line storage consumed, number of internal communications interfaces, number of external communications interfaces, bandwidth of interfaces, combinations of these, etc. The choice of type of algorithm and what parameters to base it on can be determined by negotiation between the orchestrators, by the Conductor, and/or by operations staff (including programmers who support operations). In some cases equipment vendors may also influence these decisions—either through direct recommendation, and/or types of information/interfaces they provide. The Conductor and/or orchestrators can observe the results obtained using different algorithms and different parameter sets (and parameter weighting if combinations are employed). Based on the results observations, using objective, algorithms, and constraints, the conductor and/or orchestrators can determine which algorithms, parameters, etc. produce the best results. Thus, over time, performance will improve. The cost of each type of subsystem element may be stored in a storage device associated with conductor 630. Conductor 630 may assign (as shown below) the root cause analysis function to the orchestrator of the most expensive subsystem element (e.g., orchestrator 625).

As the normal course of operation of the cohort of centrifuges proceeds orchestrator 625 (configured by conductor 630) following its objective of maximizing "hours.centrifugecohort.spinning" may develop, using a statistical analysis algorithm, a pattern for "hours.spinning" for each centrifuge and "hours.centrifugecohort.spinning" for the cohort. Based on a corresponding constraint of exceeding allowable deviations from these patterns, after the first version of a virus (e.g., Xnet) was inserted, orchestrator 625 may output an alert that indicates a significant deviation. Orchestrator 625 may provide this alert to orchestrator 620, which provides this alert to operations staff 611 via terminal 612.

The alert may also trigger (again driven by the orchestrator 625's objective of maximizing "hours.centrifugecohort.spinning") a root cause analysis function to begin. The arrival of the first alert may trigger the first constraint associated with orchestrator 625. It requires the function to wait a set amount of time to allow other alerts, if any, to arrive. The wait time may be a parameter set by conductor 630. In this example, the wait time is set to two hours to allow for required manual inputs. Within this time, a plurality of alerts arrive (e.g. most or all potential alerts).

The next step in the root cause analysis function may be to check for a pattern match. If there is a pattern match, orchestrator 625 marks the root cause as per the pattern and sends the result to operations staff 611 via orchestrator 620 and terminal 612. In response, operations staff 611 may implement the recommended remediation (either trigger an automated remediation, or manually perform remediation) or it may be performed automatically. If the action (e.g., the implemented remediation) clears the alert (return to previous pattern for the parameter hours.centrifugecohort.spinning), a message marking the pattern/remediation as "good" may be sent to orchestrator 625.

If there is no pattern match, or the matched pattern/remediation has proven to not be effective, then the function may begin to apply the rest of the root cause analysis to determine the root cause. In this example, although a pattern deviation triggered the alert, there is no root cause pattern match.

There are many possible algorithms that can be used (after a pattern match algorithm) to determine the root cause. Examples include algorithms based on: tree and branch analysis, statistical analysis, graph tracing, Boolean algebra, Bayesian analysis, etc. Different algorithms may employ different sets of constraints. The choice of type of algorithm and what parameters to base it on can be determined by negotiation between the orchestrators, by the Conductor, and/or by operations staff (including programmers who support operations). In some cases equipment vendors may also influence these decisions—either through direct recommendation, and/or types of information/interfaces they provide. The Conductor and/or orchestrators can observe the results obtained using different algorithms and different parameter sets (and parameter weighting if combinations are employed). Based on the results observations, using objective algorithms and constraints, the conductor and/or orchestrators can determine which algorithms, parameters, etc. produce the best results. Thus, over time, performance will improve. In some embodiments, a scoring algorithm is used (similar to the one used in the example false positive filtering embodiments described above). The root cause analysis function continues to proceed in orchestrator 625. Orchestrator 625 may have the machine-generated information (changes initiated by machine such as the operations system sending a software download to the controller, etc.) and may send one or more requests for the manually generated information (change in manual procedure for loading the payload, etc.) to operations staff 611 via orchestrator 620. Then, orchestrator 625 may combine the returned information (i.e., the information provided by orchestrator 620) with the machine-generated information for scoring as shown below.

The scoring algorithm used in this example identifies the component with the highest probability of being the source of the root cause. The scoring algorithm may first assign a value of "1" to each subsystem that might be affected if it was the source of the root cause. For example, mechanical centrifuge subsystems 602, 607 may each be assigned a value of "1." Payloads 603, 608 may each be assigned a value of "2" (one for itself and the mechanical centrifuge subsystem that can be affected by the Payload). This is because a problem with the way the weight of the payload is distributed can not only affect the effectiveness of the centrifuge on the payload, but also because it can cause harmonic vibrations resulting in the failure of the mechanical centrifuge. Operations system 610 may be assigned a value of "4" one for itself and one each for controller, mechanical centrifuge, and payload). After each component is assigned a value, the assigned value may be multiplied by the number of changes to that component that have occurred within a certain time period (e.g., in the past two weeks) and added to the assigned number. Some components can only have machine-generated changes, others can only have manually generated changes, and some can have both manually and machine generated changes. In this example, the scoring algorithm for the system depicted in FIG. 6B is as follows:

Payload: 2 (for itself)
Payload Change: 1 for each manually generated change multiplied times the above value. In this example, 0 changes so final value equal to 2
Mechanical Centrifuge: 2 (1 for itself and 1 for Payload)
Mechanical Change: 1 for each manually generated change multiplied times the above value. In this example, 0 changes so final value equal to 2
Controller: 3
Controller Machine Change: 1 for each manually generated change multiplied times the above value. In this example, 1 change so final value equal to 6
Controller Manual Change: 1 for each manually generated change multiplied times the above value. In this example, 0 changes so final value still equal to 6
Operations System: 4
Operations System: 1 for each manually generated change multiplied times the above value. In this example, 1 changes so final value equal to 8

Using the root cause analysis function, orchestrator 625 may then add up the total score for each component and identify the component with the highest score as being the most probable source of the root cause. This result may then passed to operations staff 611 via orchestrator 620.

In this example, in no particular order, orchestrator 625 using this scoring algorithm may assign numerical values in the following fashion:

Payload: 2
Payload Change: 0
Total Score For The Payload: 2
Mechanical Centrifuge: 2
Mechanical Change: 0
Total Score For The Mechanical Centrifuge: 2
Controller: 3
Controller Machine Change: 3
Controller Manual Change: 0
Total Score For The Controller: 6
Operations System: 4
Operations System Change: 1

Total Score For The Operations System: 8

In this example, operations system 610 scores as the highest and therefore orchestrator 625 is configured to identify it as the most probable source of the root cause. Orchestrator 625 may provide this identification and the resulting score components to operations staff 611 via orchestrator 620. The data visualization algorithm in orchestrator 620 may display the conclusion and a graphical representation of the scoring results. It also provides a brief description of all the changes scored. In this example, that graphic display may indicate that the operations system score is higher than all the others and significant contribution to that score is the software download change.

Based on the information included in the graphic display, operations staff 611 may look at the software download. They don't know if there is a bug in the downloaded software or an unauthorized added virus. In this example, only a detailed examination of the code can make that determination. But operations staff 611 is now looking in the right place. As the examination of the code reveals the virus, and the code is cleaned up, the results are loaded back into orchestrator 620 and hence to 625 as confirmation of the root cause finding. The pattern in this example may be used by orchestrator 625 for pattern matching in one or more subsequent root cause analyses.

This example demonstrates how orchestrators can use root cause analysis as a tool in cyber security. In this example the root cause analysis is near the beginning of the security related process. There are many other ways that root cause analysis can be used in cyber security.

Combining False Positive Analysis and Root Cause Analysis in Cyber Security

There are many ways to exploit in-chip security vulnerabilities. One example of the more general problem may be illustrated with in-chip security vulnerabilities combined with public Cloud computing. In such a combination, there is a way to exfiltrate data that is between difficult and impossible to detect by existing off-chip behavioral analysis tools. A combination of false positive analysis and root cause analysis may detect and remediate the full range of these exploits.

In-chip vulnerabilities have affected at least processors designed after 1997. Vendors have sought to limit the vulnerabilities with software patches, but have not succeeded in removing all the publicly revealed vulnerabilities, and the patches have significantly reduced performance.

The Specter and Meltdown in-chip vulnerabilities started to become public in 2017. John Hennessy (Chairman of the Board of Alphabet, retired President of Stanford University, and Emeritus Professor of Electrical Engineering, and Computer Science at Stanford University) stated that there is a new in-chip security vulnerability published every month since the initial information about Specter and Meltdown started to come out; a trap door could be designed into any chip that no one would be able to find and if he could do it, so could many others; and as a result, there are security vulnerabilities in today's processors and SoC's (Systems on a Chip).

These vulnerabilities allow data that is in the clear in a portion of the chip (has to be for processing) but otherwise protected in the rest of the entire system to be read and exported. For example, personal identification information, such as SSNs and related information, might be kept in encrypted form everywhere in the system. But when that information is being processed it has to be decrypted inside the processor. These vulnerabilities allow spying on processes deep inside the processor chip where the information has to be "in the clear" (i.e., unencrypted). Public Cloud service providers may run on these kinds of chips. There are many sources of sophisticated attackers capable of taking advantage of these in-chip vulnerabilities.

To understand how these attacks can go undiscovered and unprotected, a brief description of cyber security basics is provided. There are, in general terms, two basic ways that cyber systems are protected. The first are systems akin to skin. That is, they seek to keep bad stuff out. Examples include, but are not limited to, access control systems, firewalls, etc. The second is akin to an immune system. That is systems seek to catch and remove the bad stuff that slips through the 'skin'. Examples include, but are not limited to, behavior analysis systems, human observers, etc.

Suppose an attacker wants to exfiltrate (capture in an unauthorized way) personal information surrounding SSN's. Previously, these kinds of attacks have captured information or disrupted: financial systems, health care systems, national security information such as security clearance information, criminal investigation systems, control systems for critical infrastructure such as electrical grids, water/waste systems, telecommunication systems, etc. To do this successfully, the attacker has to get through the 'skin' and be undetected by the 'immune' system.

In this example, one way to get through the 'skin' is to create an application that appears to handle, in an authorized fashion, SSNs and burry in that app the code to take advantage of an in-chip vulnerability. Then, call up a public cloud provider, open an account, give the app to the cloud operator and sit back. The app may be configured to send what appear to be valid SSNs and associated information to a destination outside the cloud where the attacker has a system that can accept the exfiltrated information. The attacker may run the app with made-up information to establish what appears to be a normal behavior pattern. This normal behavior pattern is recognized and recorded by the behavioral analysis system operating with the cloud.

Once the normal behavioral pattern has been established, the buried portion of the app may begin to scan all the data passing through the processor that it is running on. It may have a filter that looks for data formatted in the fashion used by SSNs. When it sees an SSN, it captures all the information surrounding that SSN. The captured data is then formatted to appear just like the made-up data that is flowing out of the app. Thus, the behavioral analysis system running in the cloud does not generate an alert. There are ways of moving around to different processors in a public cloud to find fruitful sources of information.

This kind of disguised exporting of exfiltrated data has been detected in use. The description above focuses on public clouds for explanation purposes, but similar attacks can be mounted on a wide range of systems. One reason for the wide range is the overwhelming prevailing use of virtualization. Examples of widely deployed virtualization platforms include the Java Virtual Machine, VM Ware ESXi, KVM, Docker Containers, NFV (Network Function Virtualization), etc. Although harder to execute because of the need to get through 'skin' protection, these kinds of attacks can be used on any system using a modern processor including servers, PC's, phones, pads, switches/routers, set top boxes, displays customized devices/systems, application specific systems, robots, vehicles, autonomous vehicles, etc. The false positive filtering and root cause analysis described above may be applied to the full range of modern processor deployments.

U.S. patent application Ser. No. 16/008,673 entitled "Security Orchestration and Network Immune System Deployment Framework," described the possibility of outputting an alarm when an in-chip vulnerability is being exploited. But, false positives must still be filtered out and without using the false positive filtering technique disclosed herein, that can add another level of very serious difficulty. Once the true positive has been identified, a root cause problem emerges. This may be because there can be many applications running on many virtual machines, containers, etc. on the particular processor housing the alarm. Root cause analysis must come into effect, then, to identify the particular application that houses the attack.

Figure 7A:
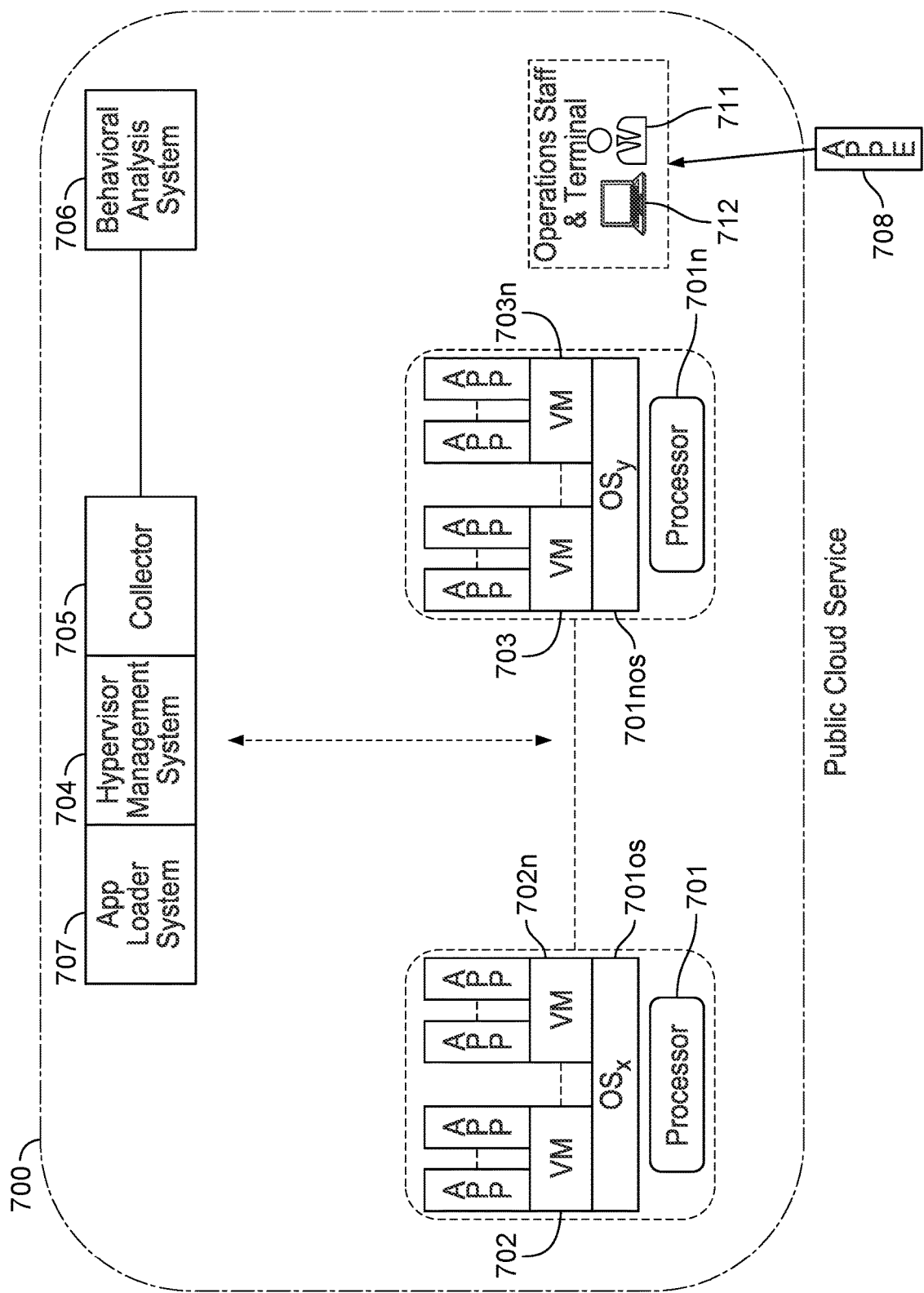
FIG. 7A illustrates an example of a public cloud service.

FIG. 7A illustrates an example of a public cloud service. In the example shown, a new app 708 designed to exfiltrate unauthorized information arrives as described above. Operations staff 713 may examine app 708 to see if it is "well behaved." Cloud service 700 has a specification for a well-behaved app and some standard tests to see if app 708 confirms to those specifications. Cloud service 700 may also attempt to check to see if app 708 poses a security threat. However, a sophisticated attacker can make it extremely difficult to detect the in-chip exploitation code. Operations staff 713 may provide app 708 to app loader system 707. Hypervisor management system 704 may take app 708 into its normal workflow of managing apps and processing resources. Those processing resources include a plurality of virtual machines (VMs), a plurality of operating systems (OSs), and a plurality of processors. At the time that hypervisor management system 704 takes app 708 there may be a number of processors running (e.g., 701 to 701$n$, where n may be a large number). The processors may be of different types/versions and there can be a large number of different types/versions. Each processor is configured to run a corresponding operating system (e.g. 701$os$ to 701$nos$). There may be different OSs running. In some embodiments, the number of different Oss is relatively small (e.g., $OS_x$ and $OS_y$).

Each processor may be either in standby mode or a non-standby mode hosting one or more Virtual Machines (e.g., 702 to 702$n$, . . . 703 to 703$n$). The Hypervisor may start by searching for a VM with available capacity to run app 708. In some embodiment, app 708 will run on a number of VM's.

Figure 7B:
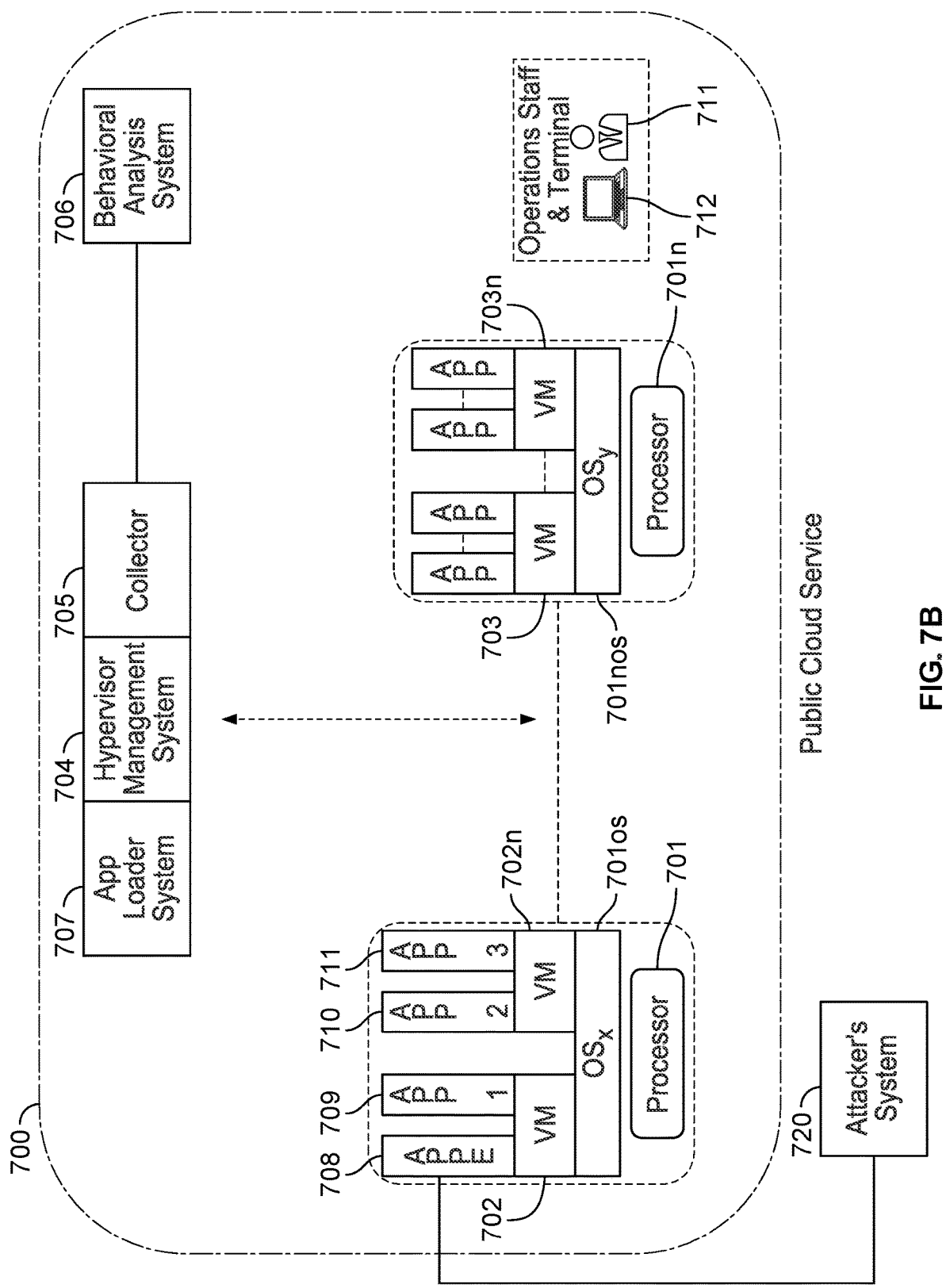
FIG. 7B illustrates an example of a public cloud service.

FIG. 7B illustrates an example of a public cloud service. In the example shown, hypervisor management system 704 has determined that there is available capacity on VM 702 currently running app$_1$ 709 and has installed appE 708 there. There is a second VM 7022 running app$_2$ 710 and app$_3$ 711. Both of these VMs are supported by $OS_x$ 701$os$ running on Processor 701.

App 708 may proceed to establish its "normal behavior pattern" communicating with the attacker's system 720 as described above. Then, app 708 may start to examine all the data flowing through processor 701 looking for SSN and SSN associated data. Because that data has to be in the clear to be processed, what would otherwise have been protected by encryption is now in the clear and available to the attacker. App 708 may capture that data and send it out of the public cloud service 700 to the attacker's system 720 without generating an alert.

Figure 7C:
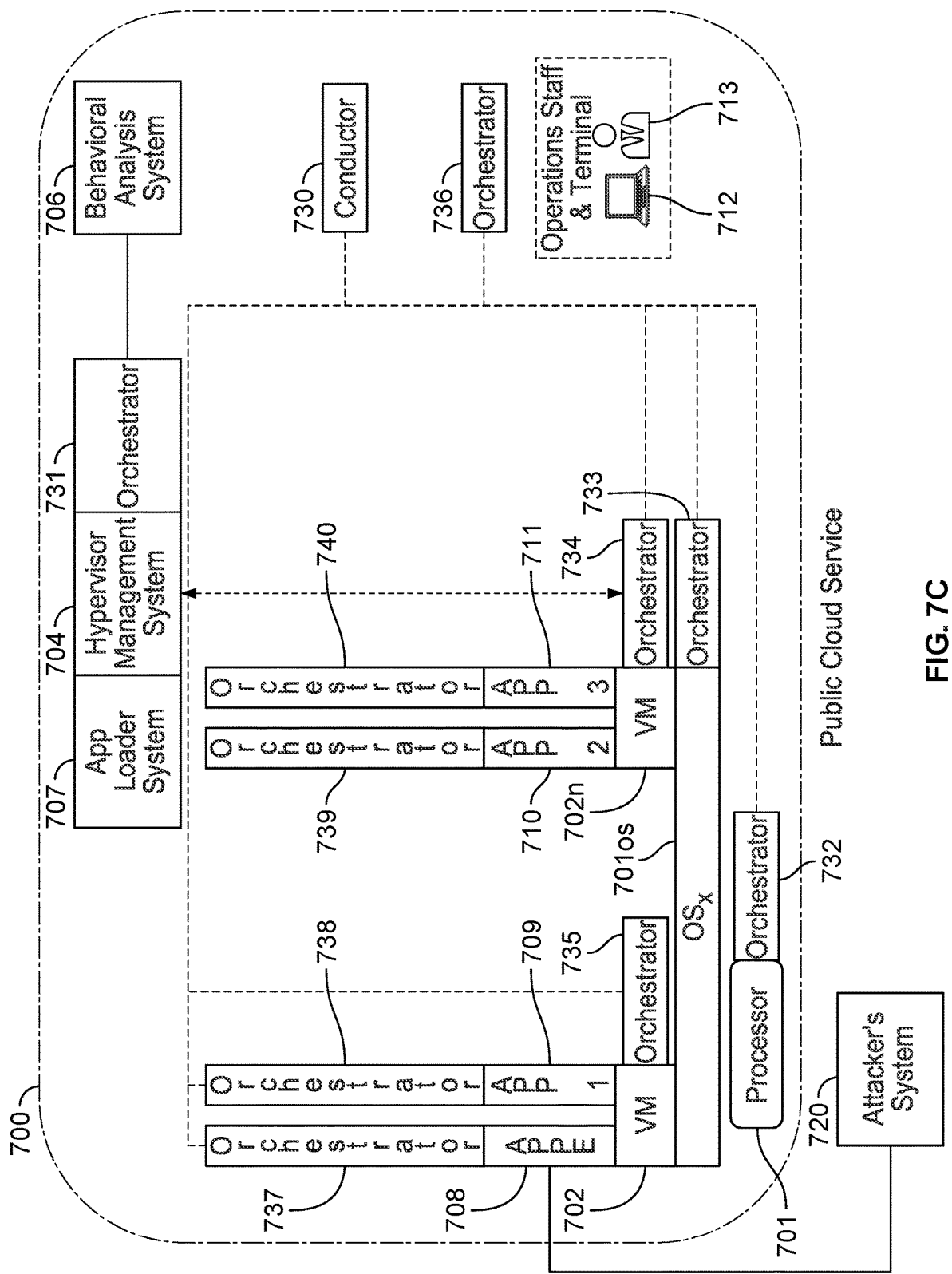
FIG. 7C is a block diagram illustrating a system to provide root cause analysis and remediation in accordance with some embodiments.
Figure 8:
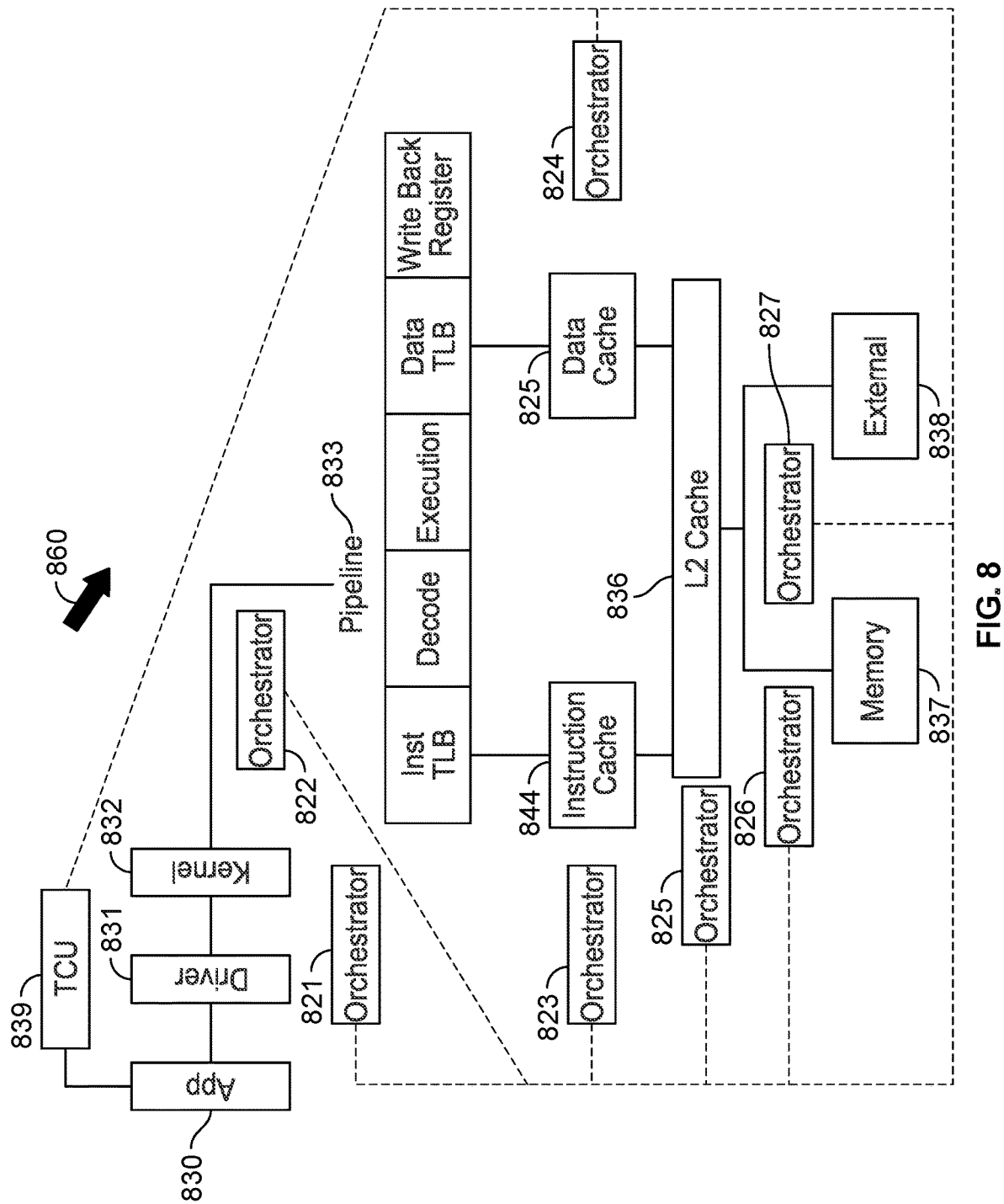
FIG. 8 is a block diagram illustrating a processor in accordance with some embodiments.

FIG. 7C is a block diagram illustrating a system to provide root cause analysis and remediation in accordance with some embodiments. In the example shown, FIG. 7C is similar to FIG. 7B, except for adding orchestrators and a conductor. FIG. 8 is a block diagram illustrating a processor in accordance with some embodiments. The processor illustrated in FIG. 8 may be implemented as processor 701 of FIG. 7C.

In this example shown, orchestrator 825 may use a histogram behavior analysis algorithm, as described above, to detect a behavior change in the behavior in and around L2 cache 844. This behavior change may be the result of an attacker using an in-chip vulnerability to gain access to abandoned speculative processing buffers that contain the protected information—there in the clear. That is, a series of speculative processing processes have explored potential code forks in a look-ahead process and those speculatively followed forks have turned out not to be useful. But, while the rest of the system moves on, un-encrypted data remains in those buffers till another speculative process over-writes them. Accessing these buffers in this way may change the frequency of certain types of memory access and it is this change in frequency that indicates a behavior change. The objective associated with orchestrator 825 may be to alarm behavior change. The histogram behavior analysis algorithm may use statistical methods to capture statistically significant samples of all the parameters available at that point in the chip. The orchestrator may create a moving sum average of the samples of these parameters. The orchestrator may compare the moving sum average against each incoming parameter histogram and alarm when the incoming histogram deviates by more than a constraint specified by a conductor. In some embodiments, a constraint may be that when a statistically significant deviation from the moving sum average occurs, the orchestrator is to issue an alert. In response to a statistically significant deviation occurring, orchestrator 825 is configured to issue an alert. There may be other ways an alert is generated using the same or similar systems to that described above with different algorithms, and/or parameters. In such cases, the same or a similar approach to that described herein may be used.

The question now is whether the deviation is a false positive or a true positive. An undetected unremediated true positive may lead to exfiltration of sensitive data. However, attempting to remediate a false positive can have expensive repercussions for public cloud service 700. In some situations, the stakes can be much higher. For example, in time sensitive situations, the failure to act on a true positive can have life threatening consequences. But, attempting to remediate a false positive can impact the fundamental capability of a system.

In response to orchestrator 825 issuing an alert, orchestrators 737, 738, 739, 740 may mark their associated apps as having been running on a processor (i.e., processor 701) that issued an in-chip alert. False positive filtering may be performed by a variety of orchestrators or conductors. In the example shown, false positive filtering is performed by an orchestrator outside processor 731, such as, orchestrator 732. The alarm from orchestrator 825 may be provided to orchestrator 732. The objective associated with orchestrator 732 may be to maintain maximum processing capability while assuring that data is not exfiltrated in an unauthorized fashion.

Orchestrator 732's objective of operating in a secure fashion while maintaining maximum possible availability of services may cause it to take false positive filtering action before implementing remediation that could cause a decrease in system availability. In this case, an "if, then, else" algorithm may be employed. Other types of algorithms, as described above, also can be used.

The constraints associated with orchestrator 732 may specify that before executing any other false positive filtering algorithm, orchestrator 732 may first employ a pattern recognition algorithm, which may compare the histogram values collected by orchestrator 825 with previously identified patterns of known attacks. In the example shown, the pattern match algorithm returns a negative result and the objective associated with orchestrator 732 may trigger the following next steps in the false positive filtering algorithm.

A scoring algorithm may be used and all the data sources are off-chip except for one. A "0" or "1" score may be given based on parameters described below. In some embodiments, fractional values can be used. For example, the presence of a software upgrade may be given a preliminary value of "1," then modified by a fractional amount that represents the amount of time that occurred between the software upgrade and the arrival of the anomaly. In some embodiments, the default is that the closer in time the two events are the higher the score. However, some attackers are including a sleep function in their attack code such that it lies dormant for a period of time. In some embodiments, information from threat intelligence systems about current types of attacks targeting the system's industry, etc. is delivered to the conductor by a special orchestrator configured to do so (not shown in FIG. 7C, but shown, for example, in previous figures as orchestrator 340). Similarly, there may be orchestrators associated with other information sources outside of the system such as weather systems, stock market reporting systems, twitter, news feeds, geologic information systems, disaster monitoring systems, government reporting systems, specialized event systems, etc. Based on such information, the conductor may modify the scoring algorithms in one or more orchestrators or the orchestrators may negotiate such a change.

Based on the above, orchestrator 732 may perform the following scoring as described below. In this example, orchestrator 732 has all the data required to do the scoring because the events of interest in other parts of the system have automatically triggered the sending of the data concerning them to orchestrator 732. To perform the scoring, orchestrator 732 may perform the following:

1.) Call data element "processor701.driver.update" (This is the update of internal chip driver 831 and orchestrator 821 delivered the data to orchestrator 732 on the event of the last update) and score the data element a "0" if there has been no recent software update. If there has been an update, orchestrator 732 scores the data element "1" and marks that data element's read parameter as read.

2.) Call data element "701os.swupdate" (software update of the operating system 701os and the data came to orchestrator 732 on the event of the last update from orchestrator 733) and score the data element a "0" if there has been no recent update. If there has been an update, orchestrator 732 scores the data element a "1" and marks that data element's read parameter as read.

3.) Call data element "vm702.swupdate" and score the data element a "0" if there has been no recent update. If there has been an update, orchestrator 732 scores the data element a "1" and marks that data element's read parameter as read.

4.) Call data element "vm7022.swupdate" and score the data element a "0" if there has been no recent update. If there has been an update, orchestrator 732 scores the data element a "1" and marks that data element's read parameter as read.

5.) Call data element "hypervisor704.swupdate" and score the data element a "0" if there has been no recent update. If there has been an update, orchestrator 732 scores the data element a "1" and marks that data element's read parameter as read.

6.) Call data element "701os.parameterupdate" and score the data element a "0" if there has been no recent update. If there has been an update, orchestrator 732 scores the data element a "1" and marks that data element's read parameter as read. Parameters are adjustable variables as differentiated from SW versions. Operating parameters may be updated by operations staff 713 using terminal 712 and/or from other subsystems. The appropriate orchestrator may record that the change has been made and deliver that data to orchestrator 732.

7.) Call data element "vm702.paramterupdate" and score the data element a "0" if there has been no recent update. If there has been an update, orchestrator 732 scores the data element a "1" and marks that data element's read parameter as read. Operating parameters for the VM may be updated by the hypervisor management system 704 but can come from other subsystems. Whichever entity initiates the update, orchestrator 735 will record that the change has been made and deliver that data to orchestrator 732.

8.) Call data element "vm7022.parameterupdate" and score the data element a "0" if there has been no recent update. If there has been an update, orchestrator 732 scores the data element "1" and marks that data element's read parameter as read. Operating parameters for the VM may be updated by the hypervisor management system 704 but can come from other subsystems. Whichever entity initiates the update, orchestrator 734 will record that the change has been made and deliver that data to orchestrator 732.

9.) Call data element "hypervisor704.parameterupdate" and scores the data element a "0" if there has been no recent update. If there has been an update, orchestrator 732 scores the data element a "1" and marks that data element's read parameter as read. Operating parameters may be updated by operations staff 611 using terminal 612 but may come from elsewhere. Whichever entity initiates the update, orchestrator 731 will record that the change has been made and deliver that data to orchestrator 732.

10.) Call data element "APPa1.mark.date." If the data element returns a "mark" with a date before the date of the alert, orchestrator 732 scores the data element "1." If the data element returns no "mark" with a date before the date of the alert, then orchestrator 732 scores the data element a "0." A "mark" with a date before the date of the alert may indicate that the app was running on a processor in the past that had an alert.

11.) Call data element "AppE.mark.date." If the data element returns a "mark" with a date before the date of the alert, orchestrator 732 scores the data element a "1." If the data element returns no "mark" with a date before the date of the alert, then orchestrator 732 scores a "0." A "mark" with a date before the date of the alert may indicate that the app was running on a processor in the past that had an alert.

12.) Call data element "APPa2.mark.date." If the data element returns a "mark" with a date before the date of the alert, orchestrator 732 scores the data element a "1." If the data element returns no "mark" with a date before the date of the alert, then orchestrator 732 scores the data element a "0." A "mark" with a date before the date of the alert may indicate that the app was running on a processor in the past that had an alert.

13.) Call data element "APPa3.mark.date." If the data element returns a "mark" with a date before the date of the alert, orchestrator 732 scores the data element a "1." If the data element returns no "mark" with a date before the date of the alert, then orchestrator 732 scores the data element a "0." A "mark" with a date before the date of the alert may indicate that the app was running on a processor in the past that had an alert.

14.) Sum the scores for each step above. The highest possible score is 13.

In this example, the sum of the scores is 0. In some embodiments, the constraint for action associated with orchestrator 732 based on false positive scoring is:
- if the total score is 3 or lower, immediately proceed to remediation as described below and inform the operations staff,
- if the total score is higher than 3 but less than 7, notify operations staff and recommend that they watch carefully.
- if the total score is greater than 7 log as a probable false positive;

When the constraint associated with an orchestrator triggers notification of operations staff 713, the orchestrator triggering notification may be configured to send a message to the orchestrator associated with operations staff 713 (e.g., orchestrator 736) which uses its corresponding one or more algorithms and one or more constraints to determine how to present the data to the operations staff 713. In some embodiments, orchestrator 732 may also send information to behavioral analysis system 706.

In this example, the total score is "0." As a result, orchestrator 732 proceeds to remediation. In some embodiments, the first step in remediation is root cause analysis. At this point it may have been determined that it is highly probable that the alert indicates a true positive attack on processor 701. But it is not clear which of the four apps (i.e., apps 708, 709, 710, 711) is generating the attack. In many cloud implementations there can be far more than four APPs running on a processor. There can be more than one processor in a chip. There can be more than one chip on a processor board. And so forth.

In some embodiments, orchestrator 732's alert triggers a root cause analysis function in orchestrator 731. In some embodiments, the algorithm that orchestrator 731 uses for root cause analysis is an isolation algorithm. The isolation algorithm may instruct the hypervisor management system 704 to move apps 708, 709, 710, 711 to different processors and watch for alerts on those processors. Because the attacking APP is triggered by the presence of certain data, it may require several moves to get the attacking App to a processor where there is data it is interested in.

In other embodiments, when orchestrator 825 issues an alert, it also captures samples of data being exfiltrated. In some embodiments, the suspected apps are placed on isolated systems. For example, a processor that only has one VM and where that VM only supports one of the suspected Apps and a second test App that feeds data in the form of the data captured by orchestrator 825 through the processor. If the app on that test system responds to the test data, it may be identified as the root cause.

Once the attacking app has been identified, then actual remediation can begin. The remediation for public cloud service 700 may be to place the attacking app on an isolated processor that is not running any other APPs and keep it there. In time, the attacker will give up and cancel the account. It is prudent to keep track of the source of the attacking app. But it is likely that the apparent source is a front organization and that another attack from the same source will use a different front organization. Once the attacking app, e.g., app 708 has been identified, a pattern of the attacking APP can be developed to quickly identify another APP coming from the same attacker using a different front organization.

Protecting Communications Between On-Chip and Off-Chip Orchestrators

In the above embodiments, it is assumed that there is unimpeded communication between the on-chip and off-chip orchestrators. However, in some embodiments, there can be a form of attack that seeks to interrupt this communication for the purpose of preventing an on-chip alert getting off-chip. For example, in some chip architectures there is a telecommunications unit (TCU) 839 that handles off-chip communications. For an attack like this to work, the TCU (or other on-chip subsystems performing similar functions) has to be compromised in a particular fashion—all types of data flowing off chip must be unimpeded, except for information concerning on-chip alerts. That info concerning on-chip alerts must be selectively blocked. It is also possible to attack the off-chip orchestrator (e.g., orchestrator 732) to not recognize and/or not act on the alert coming from on-chip.

U.S. patent application Ser. No. 16/008,673 entitled "Security Orchestration and Network Immune System Deployment Framework" describes how to detect (independently of what follows) that an orchestrator, such as orchestrator 732, has been compromised. A conductor, such as conductor 730, performing behavioral analysis on orchestrators, such as orchestrators 732 and 821, may detect any change in behavior that results from an attack. To protect against such an in-chip attack, there must be a way for an off-chip orchestrator to detect that such in-chip blocking is occurring. One way to detect disruption of in-chip TCU communications may be to have a consistent stream of communication between off-chip orchestrator(s) and an in-chip orchestrator(s) such that when that stream is impeded it generates an alert.

In some embodiments, orchestrator 821 and orchestrator 732 are configured by conductor 730 in the following fashion. Both are given an objective of maintaining an assured communications link between them, a constraint of issuing an alert if that link is impeded, and an algorithm for assessing the status of the link and securely communicating in-chip alerts.

In some embodiments, the algorithm is as follows: first, the conductor may synchronize a local clock between the two orchestrators, provide each with an initial encryption key, and an initial convolution sequence (a method of reordering bits so that they are in an apparently random order and must be reordered correctly to derive the actual data). Then, the conductor may provide orchestrator 821 with an initial token. Orchestrator 821 may combine the following information using the initial convolution sequence with the initial token to make an updated token: current time when token is transmitted, sequence number (incremented from previous sequence number—initially 1), time previous token was received, and/or an alert flag The alert flag may be two bits of data. For example, if the two bits are "01" then the flag is set to no alert in progress. If the flag is set to "10" then the flag indicates that there is an alert in process.

Conductor 730 may also set a frequency for exchanging the token. Based on this frequency, orchestrator 821 may send the encrypted updated token to orchestrator 732. When orchestrator 732 receives the token, it records the time of receipt, unencrypts, and unconvolutes the data. If the alert flag is recognized as having been set, orchestrator 732 may then proceed as described above in response to an in-chip alert. In either case, it copies the alert flag as received into a new token, increments the sequence number, waits the prescribed interval, adds the transmit time, increments the convolution sequence, convolutes the data, encrypts it, and sends the token to orchestrator 821.

If the exchange of tokens is interrupted, the time of transmit/receive is not correct, the sequence number is not correct, the unconvolution does not produce a correctly structured string of data, or the unencryption does not produce a correctly structured string of data, the orchestrators' corresponding constraint causes the orchestrator to trigger an alert. Depending on how the conductor has configured those orchestrators and other orchestrators in the system, actions as described above in response to an alert are initiated.

How tightly this link is monitored is a tradeoff between security and performance. If the frequency of token passing is set very high, there will not be enough compute cycles available for attacking code to intrude and masquerade in such a way as to prevent an alert from getting off-chip. But, there will be a reduction in available bandwidth for working data to get off-chip as well as potential impacts on other in-chip resources. In setting the frequency, the conductor may use an algorithm that takes into account this trade off. The conductor may also vary the frequency to make it harder for an attacker to anticipate and try to create a work around. This makes it extremely difficult (to impossible in a timely fashion) for even a very sophisticated attacker to prevent an alert from getting off-chip.

The above embodiments have focused on a processor in a chip. It may also apply to a processor as a subsystem in an SoC (System on Chip) where the processor core is surrounded by other types of cores. It also applies to those other types of cores as well, whether they are accompanied by a processor or not.

Working with Encrypted Information

When two pieces of data are encrypted using the same process and the same key, the underlying relationship between the two pieces of data still exists. Using the histogram behavior analysis algorithm described above to determine a change in behavior of an encrypted variable of a parameter will still show a change. That is, the moving sum average of the encrypted values will still make it possible to identify the outlier, and thus the change in behavior. Thus, an alert can still be generated. For example, suppose an unencrypted data element is represented as a 7-bit number. When encrypted, the same data element is represented as a 32-bit number. The unencrypted data element may change such that it is represented as an 8-bit number. When encrypted, the same date parameter is represented as a 36-bit number. The histogram behavior analysis algorithm may use a moving sum average for the data element to determine whether to generate an alert. In the event an encrypted number changes more than a threshold amount (e.g., percentage), then the system may generate an alert. In this example, the system would generate an alert when the encrypted data element changes from a 32-bit number to a 36-bit number. False positive detection and/or root cause analysis may subsequently be performed.

False positive filtering is still possible using the portion of the communication described above. Negotiation between neighbors can still reveal if there is any change in behavior amongst logical and virtual neighbors that could account for the observed change. To the extent that encryption obscures the nature of the changing parameter generating the alarm, and that information from neighbors is still in the clear, it is possible that the focus of the negotiation may be affected. Reducing the focus could have an effect on the ultimate probability of false positive determination, but the result will still be within the range needed for reasonable decision-making. If all information (from the node generating the alarm and neighbors) is encrypted, causality may be further blurred. But, here again, there will still be valuable decision making information revealed in the negotiation process.

The same two cases exist in root cause analysis: 1) one node generating an alarm based on encrypted information while neighbor nodes generate alarms based on information in the clear and 2) all nodes generating alarms are using information that is encrypted. In both cases, once the alarms have been generated, the system described herein will still operate in the same fashion. And thus the system can produce results similar to those that are produced in an environment of totally clear data.

Figure 9:
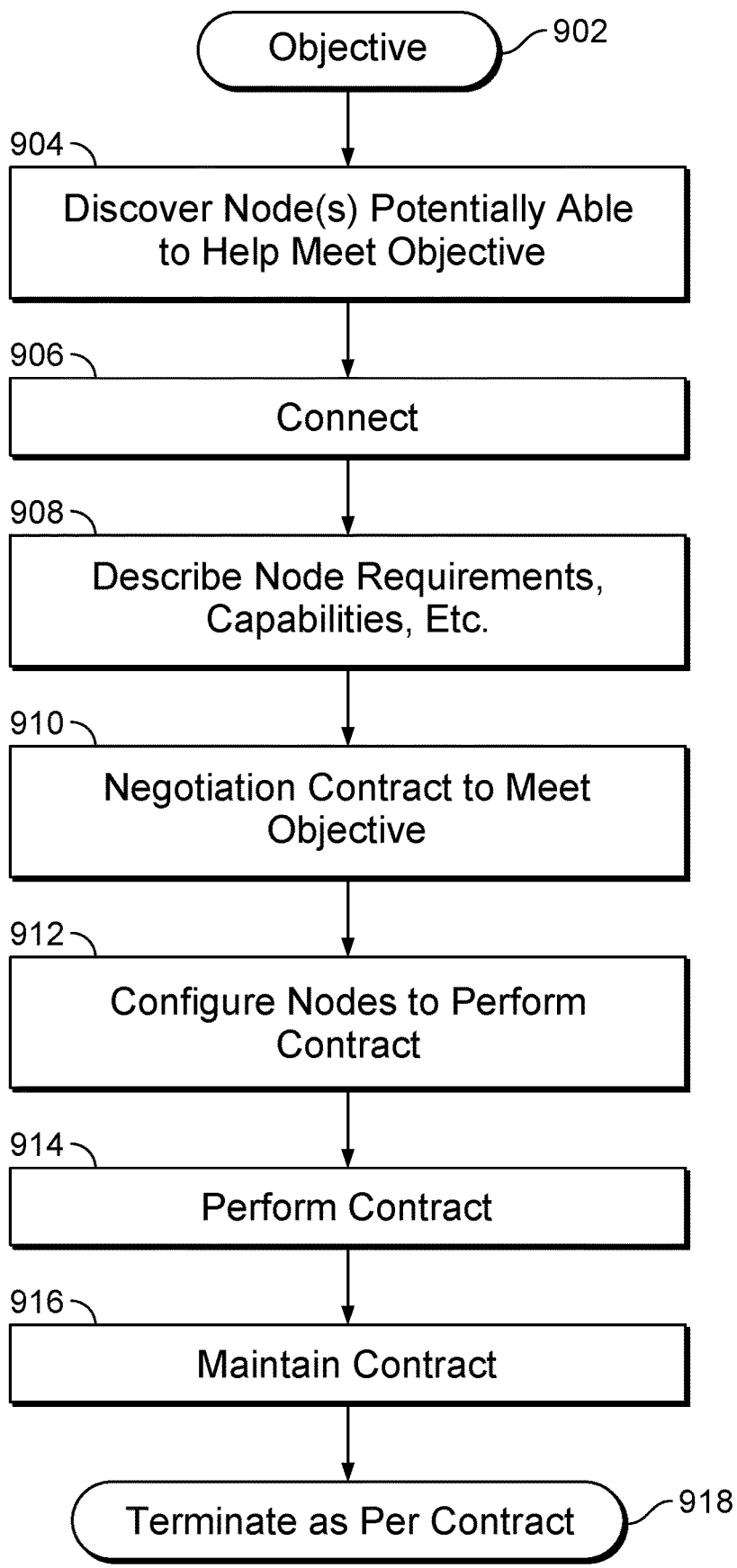
FIG. 9 is a flow diagram illustrating an embodiment of a process to orchestrate network elements.

FIG. 9 is a flow diagram illustrating an embodiment of a process to orchestrate network elements. A network element may refer to a subsystem, a device, or a component of a system. A network element may be referred to as a "node." In the example shown, when an unmet or not fully achieved objective exists (902), processing to discover one or more nodes to help achieve the objective is performed (904). For example, in some embodiments a central coordinator, such as conductors 330, 430, 530, 630, 730, searches node images in a data store (e.g., the Umbrella model), to find nodes whose metadata indicates their suitability and/or availability to fulfill the requirement. In the example shown, a connection is established (906) to one or more discovered nodes, for example to obtain information needed to evaluate the node as a candidate to achieve the objective. In some embodiments, if a central conductor is implementing the process of FIG. 9 a connection may not be made at 906 to the discovered node(s). The requirements, capabilities, etc. of a discovered node are described (908), for example by the node itself or, in an embodiment in which a central conductor implements the process of FIG. 9, by reading relevant node metadata from a node image stored in a data store. A contract to help achieve the objective is negotiated (910), for example via communications between the node having the requirement and a discovered node determined to be capable of helping to achieve the objective, or in an embodiment that includes a central conductor by applying at the conductor an algorithm that results in selection and assignment of a node to help achieve the objective. The node having the objective and the node selected to help achieve the objective are configured to operate together to achieve the objective (912) and the contract is performed (914). The nodes cooperate to maintain the operation (916), e.g., until the contract has been performed as agreed between the nodes and/or as determined by the conductor, after which the operation is discontinued per the contract (918).

Figure 10:
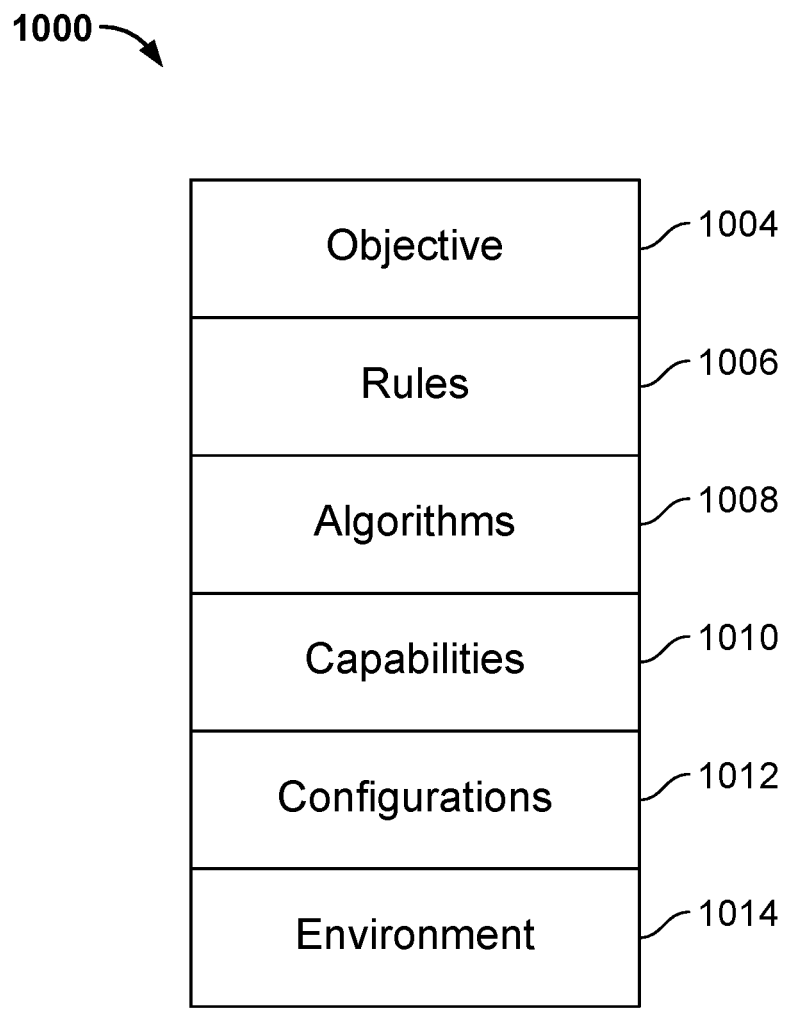
FIG. 10 is a block diagram illustrating an embodiment of a data structure for a node image.

FIG. 10 is a block diagram illustrating an embodiment of a data structure for a node image. In the example shown, node image 1000 includes metadata, expressed in a meta-language, that stores various attributes of the node, including in the example shown one or more objectives 1004 of the node, one or more rules 1006 applicable to the node, one or more algorithms 1008 associated with the node, one or more capabilities 1010 of the node, one or more current and/or possible configurations 1012 of the node, and an environment 1014 in which the node is operating. In various embodiments, the respective nodes and/or the conductor create the node image 1000, for example by storing metadata in a node image record in an IF-MAP or other data store, as described above.

Figure 11:
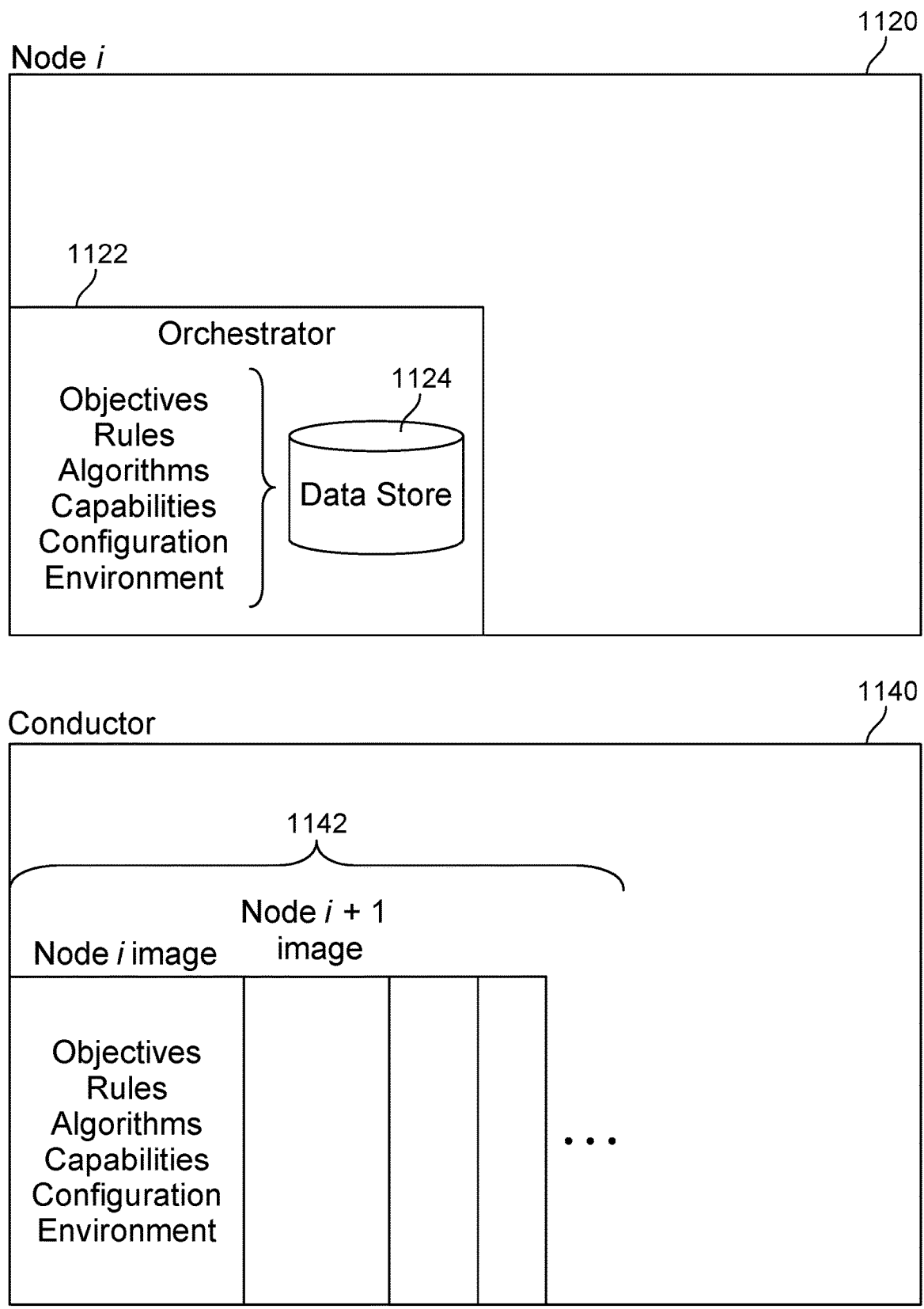
FIG. 11 is a block diagram illustrating an embodiment of a node and a conductor configured to store a node image.

FIG. 11 is a block diagram illustrating an embodiment of a node and a conductor configured to store a node image. In the example shown, node i 1120 includes an Orchestrator 1122 that stores in a local data store 1124 node image data 1122 such as that shown in FIG. 11A. The local data store 1124 may also store a local data model for orchestrator 1122. Conductor 1140 stores node images 1142 for a plurality of nodes, each image in some embodiments corresponding to node image 1100 of FIG. 11A. The plurality of node images 1142 may be referred to as the Umbrella model.

Figure 12:
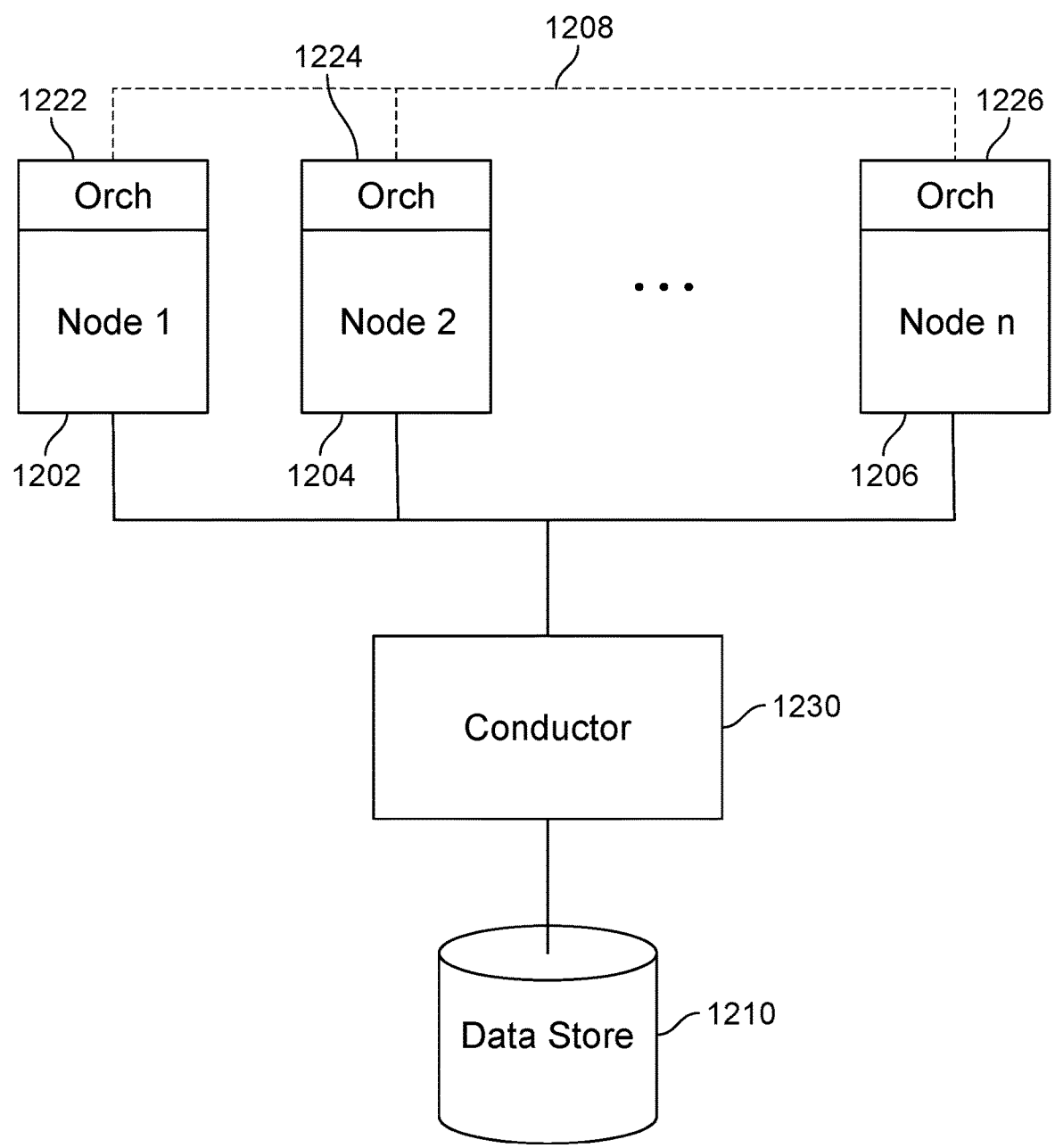
FIG. 12 is a block diagram illustrating an embodiment of a communication system.

FIG. 12 is a block diagram illustrating an embodiment of a communication system. In the example shown, each of the network elements, represented by nodes 1202, 1204, and 1206, has an associated orchestrator installed, represented in FIG. 12 by orchestrators 1222, 1224, and 1226. In some embodiments, an orchestrator comprises software running on a processor comprising the node with which the orchestrator is associated. The orchestrators 1222, 1224, and 1226 communicate via communication path 1208 to express and/or fulfill requirements. In some embodiments, each of the orchestrators is configured to perform one or more of the steps of the process of FIG. 9, such as by discovering adjacent or otherwise available nodes, establishing a connection or otherwise establishing communication with them, describing and/or discovering capabilities, negotiating a contract to fulfill a requirement, configuring the node with which it is associated to fulfill a contract, and actually performing operations to fulfill the requirement as agreed in the contract. The conductor 1230 monitors the behavior of the orchestrators and intervenes when necessary to create global optimization.

Figure 13:
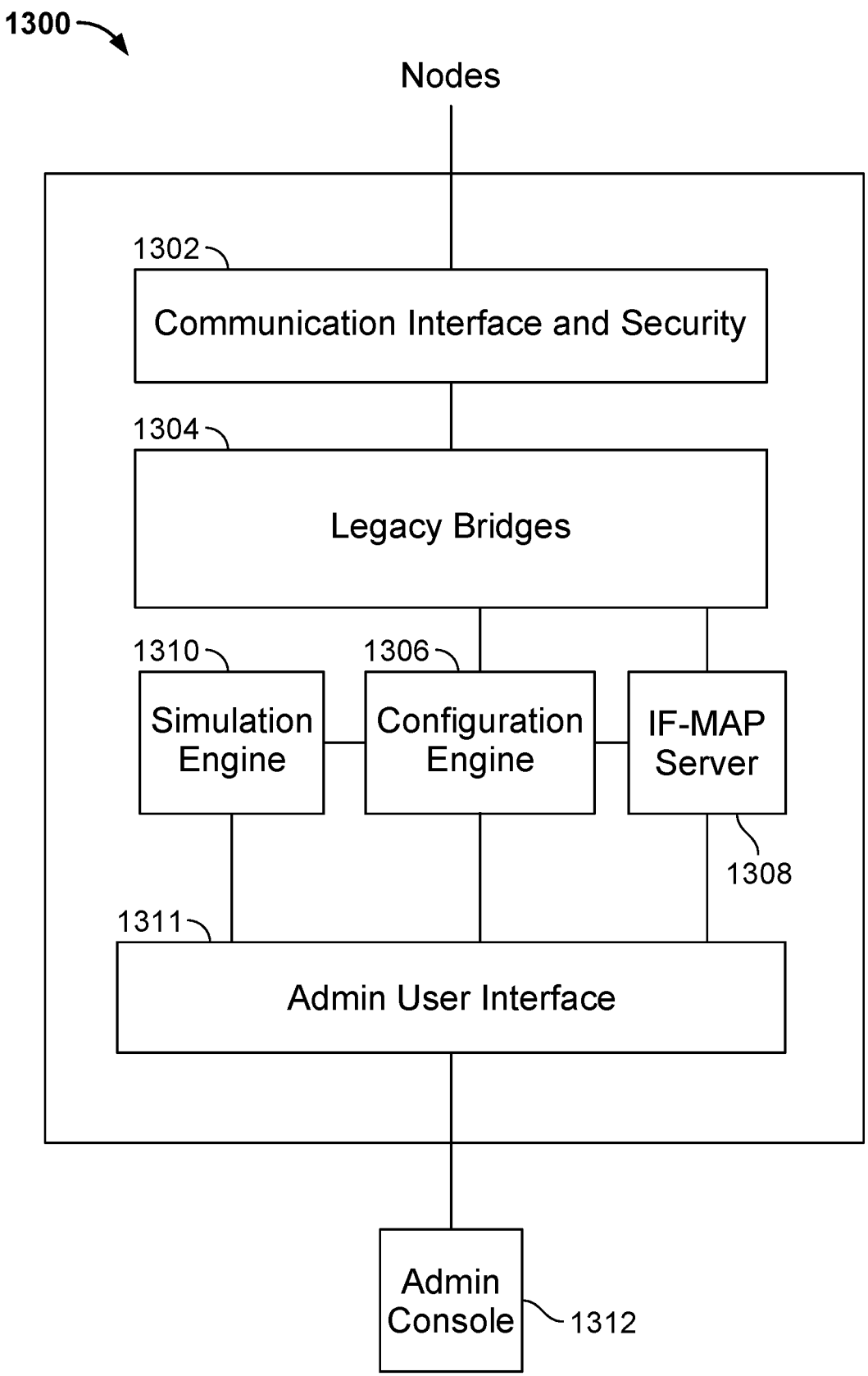
FIG. 13 is a block diagram illustrating an embodiment of a conductor system.

FIG. 13 is a block diagram illustrating an embodiment of a conductor system. In some embodiments, conductor 1300 is used to implement a conductor, such as conductors 330, 430, 530, 630, 730. In the example shown, conductor 1300 includes a communication interface 1302 that provides communication with a plurality of nodes, e.g., network elements.

Conductor 1300 may be associated with an umbrella model. A data model is a way of describing the meaning of data. It generally applies to a specific context such as a specific D/B or environment. For example, NASA had two groups working on a design for a docking system for a space station. One group was in Europe and the other groups was in the US. They exchanged design documents and built the two pieces based on each other's design documents. When the module tried to dock in space, it didn't work. One group was using English measurements and the other was using Metric. A data model associated with each group's materials would have made it explicit which measurement system was being used and therefore what the numbers actually meant. In order to overcome the use of different Metric systems, both groups could have translated the other group's numbers into their own Metric system. Or they could have created an umbrella model that allowed for the use of both Metric systems, but labeled them as to which they were. The information could have been exchanged between the two groups in the umbrella model. Each side could have had a bridge that would translate the Umbrella Model into the local data model.

Various subsystems/components from different vendors (and different groups inside the same vendor), different generations of technology, different administrative units, etc., may be deployed into different environments. Each subsystem/component has their own corresponding local data model. The umbrella model is the super set of these local data models, e.g., a concatenation of the different local data models. The metalanguage is the way of using the umbrella model so that the meaning of the data exchanged is clear. Software updates may be done to individual subsystems/components that change their local data model, new products are added, etc. As these local data models change, in response, the umbrella model changes so that it is still the superset of the local data models.

A set of one or more bridges 1304 are configured to translate between node specific communications and a meta-language used by conductor 1300 to understand and store the attributes of the respective nodes, receive and process requests from nodes to fulfill requirements, and configure and/or otherwise control and direct nodes to fulfill requirements. Bridges 1304 translate communications received from nodes in a node-specific format to a representation in the meta-language, and translate commands, queries, etc. expressed in the meta-language to a node-specific language, as applicable. A configuration engine 1306, for example one or more software processes executing on a processor, receives and responds to resource requirements, including by identifying and assigning one or more nodes to fulfill a requirement. An IF-MAP server 1308 enables nodes to store and update their image data and/or enables nodes and/or the conductor 1300 to subscribe to receive updates to node image data.

A simulation engine 1310 is used to simulate one or more potential solutions to fulfill one or more requirements, for example to validate that a proposed assignment of a node to fulfill a requirement would work and would not result in other requirements being generated, etc. In various embodiments, the simulation engine is used to perform simulations to answer what if questions such as what will happen to the Network if this particular new type of wireless end user device is adopted by a given percentage of users, or a new type of software is introduced into the Network, or a particular large scale event were to impact the overall Network environment, etc. The simulator function in the conductor combines the image data it contains with the new capability, configuration, rules, algorithms and environment data projected for the new device, event condition, etc. and simulates how the network would appear from a functional and/or other viewpoint.

The conductor using the simulation function can perform verification in various embodiments. To verify that a device or software will function as desired in the network, the conductor combines metadata provided by the vendor of the device or software with image data on the network and simulates the result. If the outcome falls within desired parameters, then the device can be declared partially or fully verified. The extent of verification is limited by the completeness and accuracy of the metadata provided by the vendor. Verification functions are performed by network operator internal facilities to test new devices or software before introduced into the Network and by certification labs on behalf of regulators and network operators to certify that devices or software meet standards.

An administrative user interface 1310 and administrative console 1312 provide the ability to monitor and/or control operation of the conductor 1300, for example to execute a system suggested resource allocation and/or configuration, override an automatic resource allocation and/or configuration, and/or otherwise manually provision resources to fulfill requirements and deliver results of simulation and verification testing. In some embodiments, in an initial implementation phase recommendations are delivered to the administrative console and an administrative user can accept or reject the recommendation. Subsequently, in stages greater degrees of automated responsive action are introduced.

Figure 14:
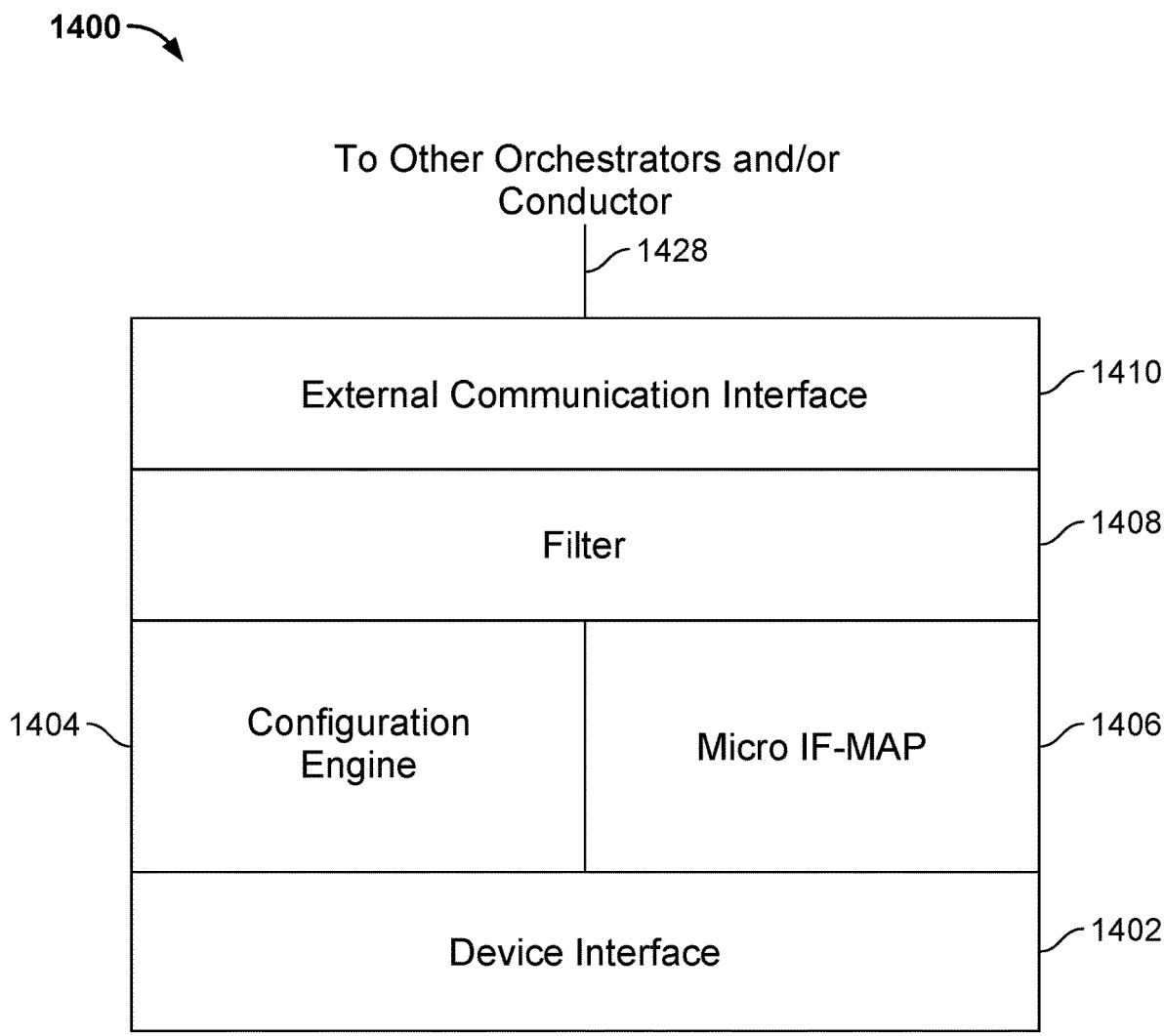
FIG. 14 is a block diagram illustrating an embodiment of an orchestrator.

FIG. 14 is a block diagram illustrating an embodiment of an orchestrator. In some embodiments, orchestrator 1400 is used to implement an orchestrator, such as orchestrators 121-125, 331-342, 453, 409, 412, 414, 416, 418, 420, 423, 425, 426, 533, 534, 620, 622, 625, 621, 732-740, 821-827.

In some embodiments, an orchestrator comprises software running on a processor comprising the node with which the orchestrator is associated. In some embodiments, the orchestrator is part of a virtual machine or container running on a processor comprising the node with which the orchestrator is associated. In other embodiments, an orchestrator is part of a computer or server connected to a node. For example, an orchestrator can be contained in a 'back pack computer' attached to a node housed in a server someplace else in the network.

In the example shown, orchestrator 1400 includes a device interface 1402 used to interface with the node the orchestration agent is configured to orchestrate. A local configuration engine 1404 interacts with orchestrators at other nodes and/or a central conductor to obtain help from one or more other nodes to accomplish an objective of the node the orchestrator is configured to orchestrate. A micro IF-MAP 1406 is used to store locally image data for the node on which the orchestrator is stored and in some embodiments, some or all of the image of one or more nodes in the physical or virtual vicinity (physically and/or logically) of the node on which the orchestration agent is installed (part of the node's environment).

A filter layer 1408 determines, in some embodiments, which status information to communicate externally and how frequently, to manage how much capacity is consumed by the overhead of configuration control, etc. An external communication interface 1410 provides connectivity to other nodes via out of band path 1428.

Figure 15:
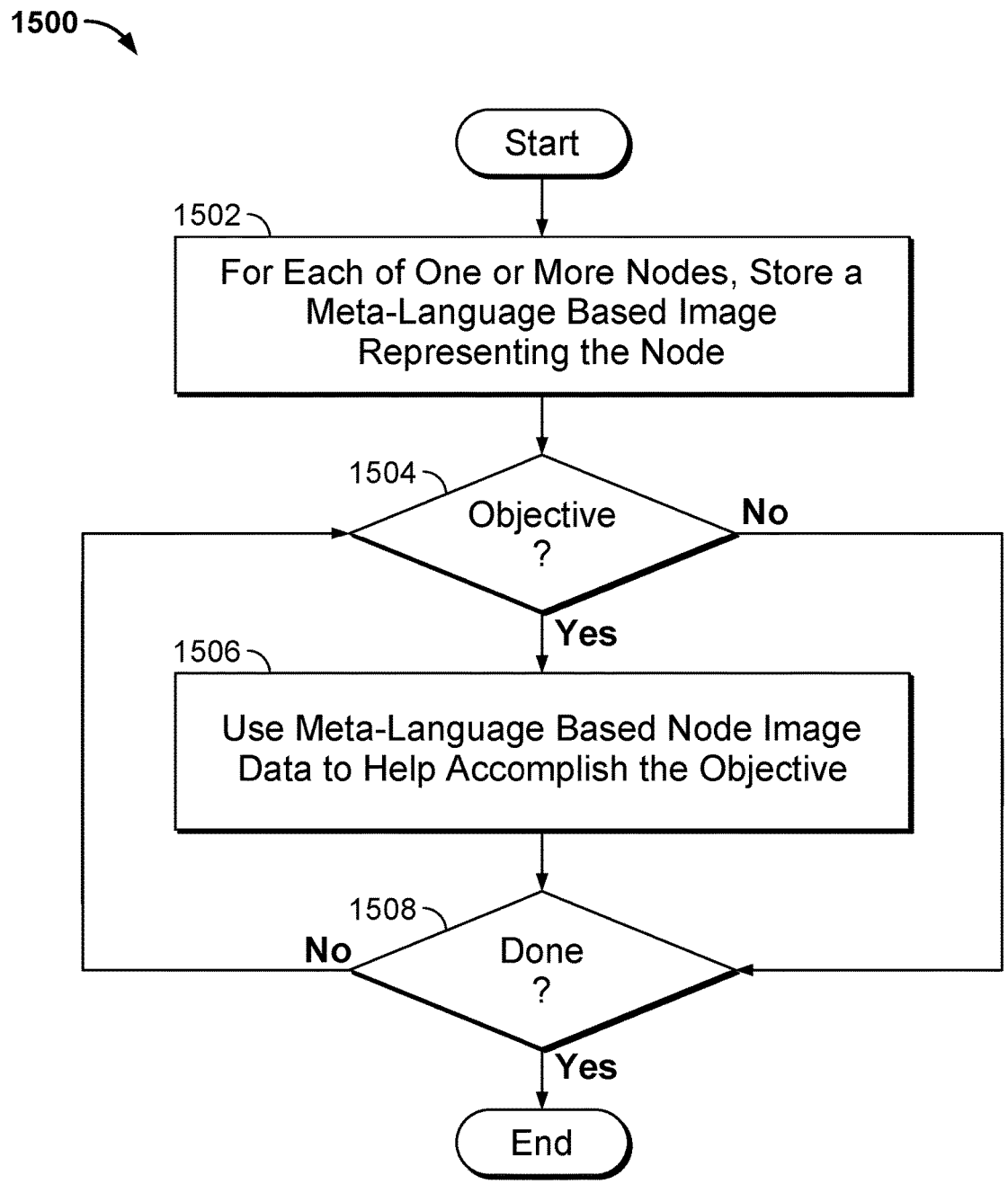
FIG. 15 is a flow diagram illustrating an embodiment of a process to accomplish node objectives through interaction with other nodes.

FIG. 15 is a flow diagram illustrating an embodiment of a process to accomplish node objectives through interaction with other nodes. In some embodiments, the process of FIG. 15 is implemented by an orchestrator, such as orchestrators 121-125, 331-342, 453, 409, 412, 414, 416, 418, 420, 423, 425, 426, 533, 534, 620, 622, 625, 621, 732-740, 821-827. In the example shown, at 1502, for each of one or more nodes a meta-language based image data that describes and represents the node and its current state and environment is stored (e.g., the local data model of the node). The node image(s) may be stored locally in a micro IF-MAP or other store with similar properties. When an unmet objective exists (1504), the meta-language based node image data is used to achieve the objective (1506). In some embodiments, node image data stored locally, for example by an orchestrator running on a node, is used to discover adjacent nodes, obtain a description of each, connect as appropriate, negotiate a contract to help accomplish the objective, for example as described in connection with FIG. 10.

Figure 16:
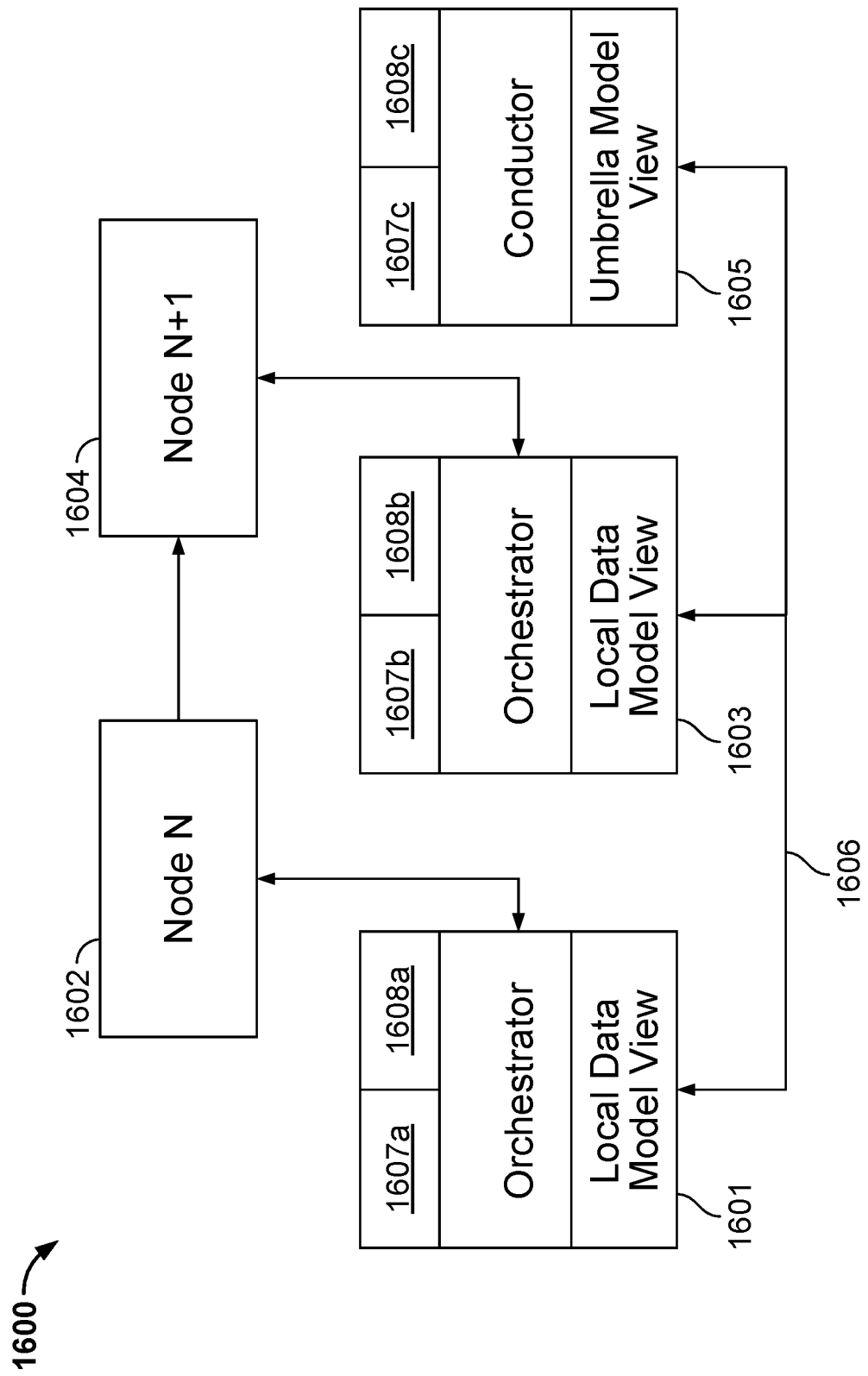
FIG. 16 is a diagram illustrating a communication system in accordance with some embodiments.

FIG. 16 is a diagram illustrating a communication system in accordance with some embodiments. Initial objectives, algorithms, and constraints for an orchestrator can be set using the interfaces shown in FIG. 16. In the example shown, orchestrators 1601 and 1603 are associated with Nodes N and N+1, respectively. A node may correspond to a component, device, or subsystem. Conductor 1605 and orchestrators 1601, 1603 communicate via communications link 1606.

Initial sets of objectives, algorithms, and constraints may be set via an Application Program Interface (API) 1607*a*, 1607*b*, 1607*c* (e.g., Partner API) using machine readable language. Initial sets of objectives, algorithms, and constraints may also be set via API 1608a, 1608b, 1608c (e.g., Natural Language API) using human readable language.

In some embodiments, the machine readable language corresponding to the initial sets of objectives, algorithms, and constraints is inserted into the umbrella model of conductor 1605 via API 1607c. In some embodiments, the human readable language corresponding to the initial sets of objectives, algorithms, and constraints is inserted into the umbrella model of conductor 1605 via API 1608c. The umbrella model is configured to store a plurality of objectives, algorithms, and constraints for a plurality of orchestrators. In response to receiving the initial sets of objectives, algorithms, and constraints, conductor 1605 is configured to provide each orchestrator with the corresponding set of objectives, algorithms, and constraints. In some embodiments, an orchestrator is configured to subscribe to umbrella model view updates and updates its local data model view when the local data model view of the orchestrator is updated in the umbrella model view in the conductor.

In some embodiments, the machine readable language corresponding to an initial set of objectives, algorithms, and constraints is inserted into corresponding local data models of orchestrators. For example, the machine readable language corresponding to an initial set of objectives, algorithms, and constraints for the particular orchestrator is inserted into the local umbrella model views of orchestrators 1601, 1603 via API 1607a, 1607b, respectively. In some embodiments, the human readable language corresponding to an initial set of objectives, algorithms, and constraints is inserted into corresponding local data models of orchestrators. For example, the human readable language corresponding to an initial set of objectives, algorithms, and constraints for the particular orchestrator is inserted into the local data model views of orchestrators 1601, 1603 via API 1608a, 1608b, respectively. In response to receiving a corresponding set of objectives, algorithms, and constraints, an orchestrator is configured to provide the corresponding set to conductor 1605 via communications link 1606. Conductor 1605 may update its umbrella model view based on the received corresponding set. In some embodiments, conductor 1605 is configured to automatically receive local data model view updates and in turn, updates its umbrella model view when a local data model view is updated.

The umbrella model may undergo one or more changes for one or more reasons. For example, objectives associated with one or more orchestrators, algorithms associated with one or more orchestrators, and/or constraints associated with one or more orchestrators may change. Other reasons may include adding new subsystems or changes to existing subsystems. When such additions or changes are made, new or changed local data models result. Since the umbrella model is a superset of the underlying local data models, such changes in local data models generate changes in the umbrella model. Changes in the local data models also necessitate changes in the bridges (such as 1304 in FIG. 13) that interface to them. A bridge may be configured to translate from a meta-language associated with the local data model into a meta-language associated with the umbrella model. The bridges are updated to reflect the added and/or removed translations that correspond to the updates.

The vendors of a component, device, or subsystem (e.g., nodes 1602, 1604) may provide descriptions of these new or changed data models. These descriptions may be provided in machine-readable form via a network accessible system. Such network accessible systems may provide the product, and/or documentation on the product, and/or software updates with information on data model changes inherent in the update, etc. In some embodiments, an orchestrator associated with that vendor's system, based on its objectives, algorithms, and constraints will automatically update both the local data model and the umbrella model. In some embodiments, the updates are provided from the orchestrator associated with that vendor's system to the conductor and the local data models of the orchestrators are updated in a manner similar to initializing the local data models of the orchestrators. In some embodiments, corresponding updates are provided from the orchestrator associated with that vendor's system to orchestrators, which in turn, update their corresponding local data models. The umbrella model of the conductor may be updated in a manner similar to initializing the umbrella model of the conductor. Vendors may also supply information in written documentation. Such documentation may be fed through a scanner that converts it into machine-readable form. An orchestrator can be associated with such a scanner. In some cases, it may not be possible to obtain local data model information in machine-readable form. In those cases, programmers may update the umbrella model and the local data models in a manner similar to that described above.

In some embodiments, a vendor performs a software update (e.g., updates the code to include or remove lines of code) to one or more of the subsystems that it has provided. This update may make changes to the local data model. These changes may be made without the knowledge of the system operator. This can happen in two ways. First, the vendor may have access to the subsystem via a special vendor accessible port on the subsystem and may not tell the system operator that a software update has been performed. Second, the vendor may provide the system operator with the software update to deploy, but neglect to inform the system operator that a data model change has been made. In either case, the operation of the changed data model may result in apparent changes in subsystem behavior that trigger operations and/or security alarms. For example, the subsystem may have previously outputted a first value prior to the software update, but output a second value after the software update. The orchestrator associated with the subsystem is configured to output an alert because the subsystem's output deviates from the first value. In some embodiments, these alerts are subject to false positive filtering and root cause analysis as described herein. The orchestrators working together will identify what has happened and either automatically update the local and umbrella data models, or inform operations staff that a change has occurred needing manual assistance through one of the API's.

Figure 17:
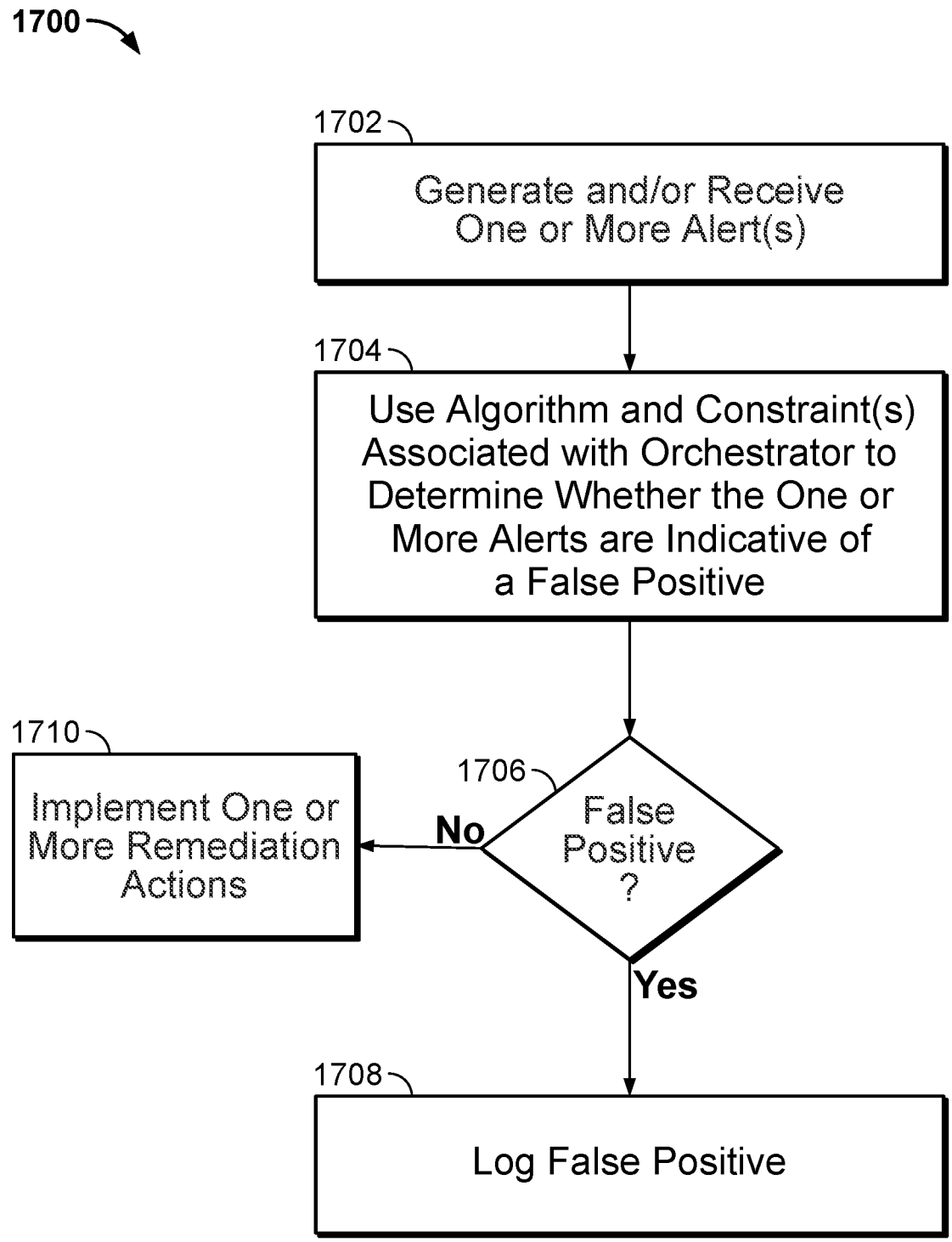
FIG. 17 is a flow diagram illustrating a process for performing false positive detection in accordance with some embodiments.

FIG. 17 is a flow diagram illustrating a process for performing false positive detection in accordance with some embodiments. In the example shown, process 1700 may be implemented by an orchestrator, such as 121-125, 331-342, 453, 409, 412, 414, 416, 418, 420, 423, 425, 426, 533, 534, 620, 622, 625, 621, 732-740, 821-827. In some embodiments, process 1700 is implemented by a conductor, such as 130, 330, 430, 530, 630, 730, 1140, 1230, 1300.

At 1702, one or more alerts are generated and/or received. A system is comprised of a plurality of subsystems. A subsystem may include one or more devices and/or one or more components. The one or more alerts are indicative of a behavior change of the system, e.g., at least one of the subsystems has changed its behavior. Some or all of the subsystems may be associated with a corresponding orchestrator.

An orchestrator monitors the data of the subsystem to which the orchestrator is associated. An orchestrator may generate an alert based on the monitored data. An orchestrator may provide the alert to one or more other orchestrators of the system. An orchestrator may receive one or more alerts from one or more other orchestrators. An orchestrator may receive from one or more other orchestrators data associated with one or more data elements of the one or more subsystems to which the one or more other orchestrators are associated.

In some embodiments, an orchestrator is configured to output an alert based on an output of a histogram. Corresponding histograms may be generated for each data element associated a subsystem and the orchestrator is configured to track the values of each data element and the number of times each value was generated. The orchestrator may determine a sample size of data element values. The sample size of data element values may be based on a time range (e.g., 12 pm-12 am) or a total number of samples (e.g., 50 samples). A statistically valid moving sum average histogram may be constructed for each sample period. The orchestrator may compare the current moving sum average of the current sample period to the moving sum average of one or more previous sample periods. In the event the delta between the two periods is greater than a threshold amount, the orchestrator may be configured to generate an alert.

At 1704, an algorithm and one or more constraints associated with an orchestrator are used to determine whether the one or more alerts are indicative of a false positive. Each orchestrator of the system may have a corresponding objective. The algorithm associated with an orchestrator may depend on the corresponding objective. The one or more constraints associated with the orchestrator may depend on the algorithm associated with the orchestrator. For example, a first orchestrator with an objective of ensuring a subsystem operates in a secure manner may have a different algorithm and corresponding constraints than a second orchestrator with an object of ensuring a device operates within a temperature range. The one or more constraints associated with the first orchestrator may be different than the one or more constraints associated with the second orchestrator.

In some embodiments, the system includes a conductor. A conductor may receive information from a threat intelligence system or some other source. The conductor may use the information to update the corresponding algorithm and associated constraints of some or all of the orchestrators in the system. In other embodiments, an orchestrator receives information from a threat intelligence system or some other source, and uses the information to update the corresponding algorithm and associated constraints of some or all of the orchestrators in the system.

An orchestrator is associated with a corresponding local data model. A local data model is comprised of one or more data elements. A value associated with a data element may be determined based on data associated with an orchestrator or data that is received and associated one or more other orchestrators.

The algorithm associated with an orchestrator determines how the orchestrator is to score data element values in a local data model that the orchestrator uses to determine whether the one or more alerts are associated with a true positive or a false positive. An orchestrator may be programmed by a conductor to use particular data elements in its algorithm. For example, a data element may output a value in the event a software upgrade was performed. The score associated with the data element is based on the outputted value of the data element. In other embodiments, different types of algorithms are used, such as "if, then, else" type algorithms, pattern matching algorithms, tree and branch analysis algorithms, etc.

At 1706, it is determined whether the one or more alerts are associated with a false positive. The orchestrator assigns each of the data elements a corresponding score based on a corresponding data element value. The corresponding score associated with each of the data elements may be summed to determine an overall score associated with the one or more alerts.

The one or more constraints associated with an orchestrator may set one or more threshold values that indicate how the orchestrator is to respond based on the one or more alerts. For example, an orchestrator may log the one or more alerts as a false positive in the event the overall score associated with the one or more alerts is less than a first threshold. The orchestrator may perform one or more remediation actions in the event the overall score associated with the one or more alerts is greater than or equal to the first threshold.

In the event the one or more alerts are determined be associated with a false positive, process 1700 proceeds to 1708 and the one or more alerts are logged as a false positive In the event the one or more alerts are not determined to be associated with a false positive, process 1700 proceeds to 1710. In some embodiments, in the event the one or more alerts are not determined to be associated with a false positive, the data used to determine that there is a false positive is provided to a machine learning model and in the event the machine learning model determines there is a false positive, process 1700 proceeds to 1710. In some embodiments, an output of the machine learning model determines the one or more remediation actions that are to be implemented.

At 1710, one or more remediation actions are implemented. The one or more remediation actions may start with the remediation action that is the fastest, least cost, least impact on user experience alternative and if that proves not to be effective, then the next remediation action in rank order is tried, and so forth until the alert(s) are no longer generated and/or received.

The one or more remediation actions to be implemented may be based on the overall score associated with the one or more alerts. For example, a first remediation action may be implemented in the event the overall score associated with the one or more alerts is greater than or equal to the first threshold, but less than a second threshold. A second remediation action may be implemented in the event the overall score associated with the one or more alerts is greater than the first threshold and greater than or equal to the second threshold.

The one or more remediation actions may be specific to the orchestrator or conductor performing the false positive analysis. For example, the one or more remediation actions available to a first orchestrator or a first conductor may be different than the one or more remediation actions available to a second orchestrator or a second conductor. A remediation action may include the first orchestrator sending to a second orchestrator an instruction to perform an action and in response to receiving the instruction to perform the action, the second orchestrator causes the device or component to which it is associated to perform the action. A remediation action may include a conductor sending to an orchestrator an instruction to perform an action and in response to receiving the instruction to perform the action, the orchestrator causes the device or component to which it is associated to perform the action. A remediation action may include a first conductor sending to a second conductor an instruction to perform an action and in response to receiving the instruction to perform the action, the second conductor causes the device or component to which it is associated to perform the action.

Remediation actions may include, but are not limited to, notifying a SOC operator, initiating a separate backup of an application, deleting third party software, downloading and (re) installing third party software, correctly configuring third party software, reinstalling an app, installing a test data set and running an app test script, rolling the device/component to a standard backup, installing a patch, initiating a process to retire a subsystem/component and replace it with a new one, etc.

Figure 18:
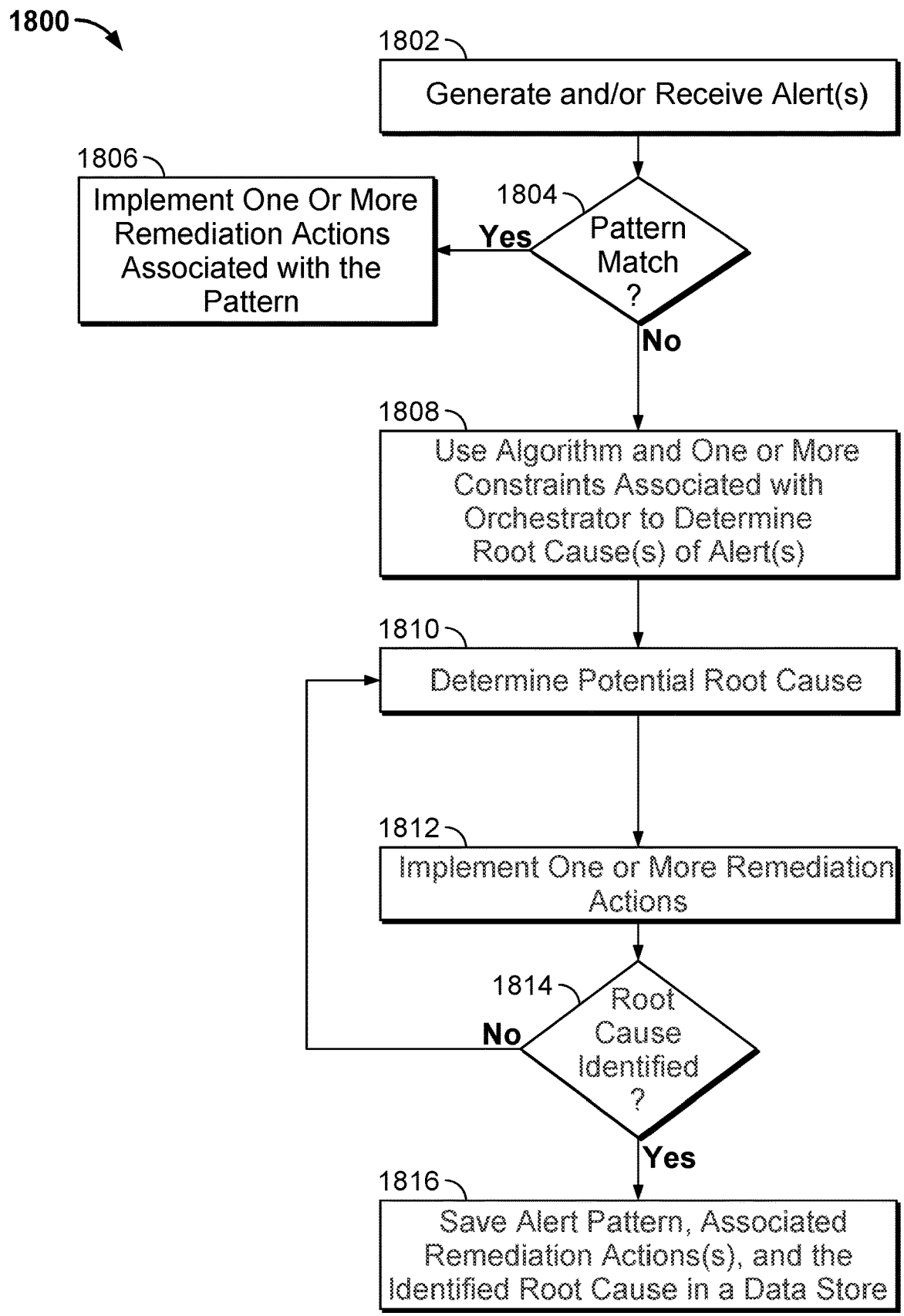
FIG. 18 is a flow diagram illustrating a process for performing root cause analysis in accordance with some embodiments.

FIG. 18 is a flow diagram illustrating a process for performing root cause analysis in accordance with some embodiments. In the example shown, process 1800 may be implemented by an orchestrator, such as orchestrators 121-125, 331-342, 453, 409, 412, 414, 416, 418, 420, 423, 425, 426, 533, 534, 620, 622, 625, 621, 732-740, 821-827. In some embodiments, process 1800 is implemented by a conductor, such as 130, 330, 430, 530, 630, 730, 1140, 1230, 1300.

At 1802, one or more alerts are generated and/or received. A system is comprised of a plurality of subsystems. A subsystem may include one or more devices and/or one or more components. The one or more alerts are indicative of a behavior change associated with the system, e.g., at least one of the subsystems has changed its behavior. Some or all of the subsystems may be associated with a corresponding orchestrator.

An orchestrator monitors the data of the subsystem to which the orchestrator is associated. An orchestrator may generate an alert based on the monitored data. An orchestrator may provide the alert to one or more other orchestrators of the system. An orchestrator may receive one or more alerts from one or more other orchestrators. An orchestrator may receive from one or more other orchestrators data associated with one or more data elements of the one or more subsystems to which the one or more other orchestrators are associated. In some embodiments, a constraint associated with an orchestrator may cause the orchestrator to wait a threshold time period after receiving and/or generating a first alert before proceeding to step 1804.

In some embodiments, an orchestrator is configured to output an alert based on an output of a histogram. Corresponding histograms may be generated for each data element associated a subsystem and the orchestrator is configured to track the values of each data element and the number of times each value was generated. The orchestrator may determine a sample size of data element values. The sample size of data element values may be based on time (e.g., every day) or a total number of samples (e.g., 50 samples). A statistically valid moving sum average histogram may be constructed for each sample period. The orchestrator may compare the current moving sum average of the current sample period to the moving sum average of one or more previous sample periods. In the event the delta between the two periods is greater than a threshold amount, the orchestrator may be configured to generate an alert.

At 1804, it is determined whether there is a pattern match. Each of the orchestrators may have a local data store that includes a data structure that associates patterns with one or more corresponding remediation actions. For example, a pattern may be comprised of a first alert being received from a first orchestrator and a second alert being received from a second orchestrator 10 minutes after the first alert is received. The data structure may store an entry that associates this pattern with one or more corresponding remediation actions. In some embodiments, the data structure stores patterns of alerts associated with one or more orchestrators. In some embodiments, the data structure stores patterns of data element values associated with one or more orchestrators.

The patterns may consist of a specific set of symptoms and/or parameter values that have been shown in the past to have a specific root cause. Patterns can originate in a variety of ways and come from a variety of sources. In some embodiments, step 1804 is optional.

In the event the one or more alerts match a pattern, process 1800 proceeds to 1806. In the event the one or more alerts do not match a pattern, process 1800 proceeds to 1808.

At 1806, one or more remediation actions corresponding to the pattern match are implemented. Remediation actions may include, but are not limited to, notifying a SOC operator, initiating a separate backup of an application, deleting third party software, downloading and (re) installing third party software, correctly configuring third party software, reinstalling an app, installing a test data set and running an app test script, rolling the device/component to a standard backup, installing a patch, initiating a process to retire a subsystem/component and replace it with a new one, etc.

At 1808, an algorithm and one or more constraints associated with an orchestrator are used to determine a root cause associated with the one or more alerts.

An algorithm associated with an orchestrator may assign a cost value to each of the subsystems associated with a system. The cost associated with a subsystem element may be based on the purchase price of the type of each subsystem element, the vendor's annual maintenance fee for the subsystem, the number of lines of code in each subsystem, the running code footprint in each subsystem, processor cycles per second consumed by each subsystem, number of virtual machines per subsystem, number of containers per subsystem, number of processors used, amount of on-line storage consumed, number of internal communications interfaces, number of external communications interfaces, bandwidth of interfaces, number and type of mechanical components, combinations of these, etc.

At 1810, a potential root cause is determined. In some embodiments, the subsystem to which an orchestrator is associated is determined to be the potential root cause. In some embodiments, a different subsystem is determined to be the potential root cause. In the event a different subsystem is determined to be the potential root cause, a message indicating one or more remediation actions are to be performed may be sent to the selected subsystem, and in response, the orchestrator associated with the different subsystem may perform the one or more remediation actions.

A constraint associated with the orchestrator may determine how to select a potential root cause of the one or more alerts. In some embodiments, a subsystem with a highest cost value among the plurality of subsystem is selected. The selected subsystem may perform one or more remediation actions, and if the problem associated with the system is not solved, i.e., the one or more alerts are still being generate or received, a constraint associated with the orchestrator may cause the orchestrator to select the subsystem with a next highest cost value among the plurality of subsystem.

In some embodiments, a subsystem with a lowest cost value among the plurality of subsystems is selected. The selected subsystem may perform one or more remediation actions, and if the problem associated with the system is not solved, a constraint associated with the orchestrator may cause the orchestrator to select the subsystem with a next lowest cost value among the plurality of subsystems.

In some embodiments, a subsystem with a highest frequency of alerts among the plurality of subsystems is selected. The selected subsystem may perform one or more remediation actions, and if the problem associated with the system is not solved, a constraint associated with the orchestrator may cause the orchestrator to select the subsystem with a next highest frequency of alerts among the plurality of subsystems.

At 1812, one or more remediation actions associated with the determined potential root cause are implemented. Remediation actions may include, but are not limited to, notifying a SOC operator, initiating a separate backup of an application, deleting third party software, downloading and (re)installing third party software, correctly configuring third party software, reinstalling an app, installing a test data set and running an app test script, rolling the subsystem to a standard backup, installing a patch, initiating a process to retire a subsystem/component and replace it with a new one, etc.

The one or more remediation actions may be specific to the orchestrator or conductor performing the root cause analysis. For example, the one or more remediation actions available to a first orchestrator or a first conductor may be different than the one or more remediation actions available to a second orchestrator or a second conductor.

At 1814, it is determined whether the root cause associated with the one or more alerts is identified. The root cause associated with the one or more alerts is identified in the event the one or more alerts cease to be alerts after performing the one or more protective measures. In the event the root cause associated with the one or more alerts is identified, process 1800 proceeds to 1816. In the event the root cause associated with the one or more alerts is not identified, process 1800 returns to 1810.

At 1816, an alert pattern, associated remediation actions (s), and the identified root cause are saved in a data store. The alert pattern, associated remediation actions(s), and the identified root cause are stored to enable further instances of the alert pattern to be efficiently identified at 1804 and solved by using the associated remediation action(s). The alert pattern and associated remediation action (s) are stored in a data store local to the orchestrator or globally throughout the system (e.g., stored by other orchestrators and/or a conductor).

Figure 19:
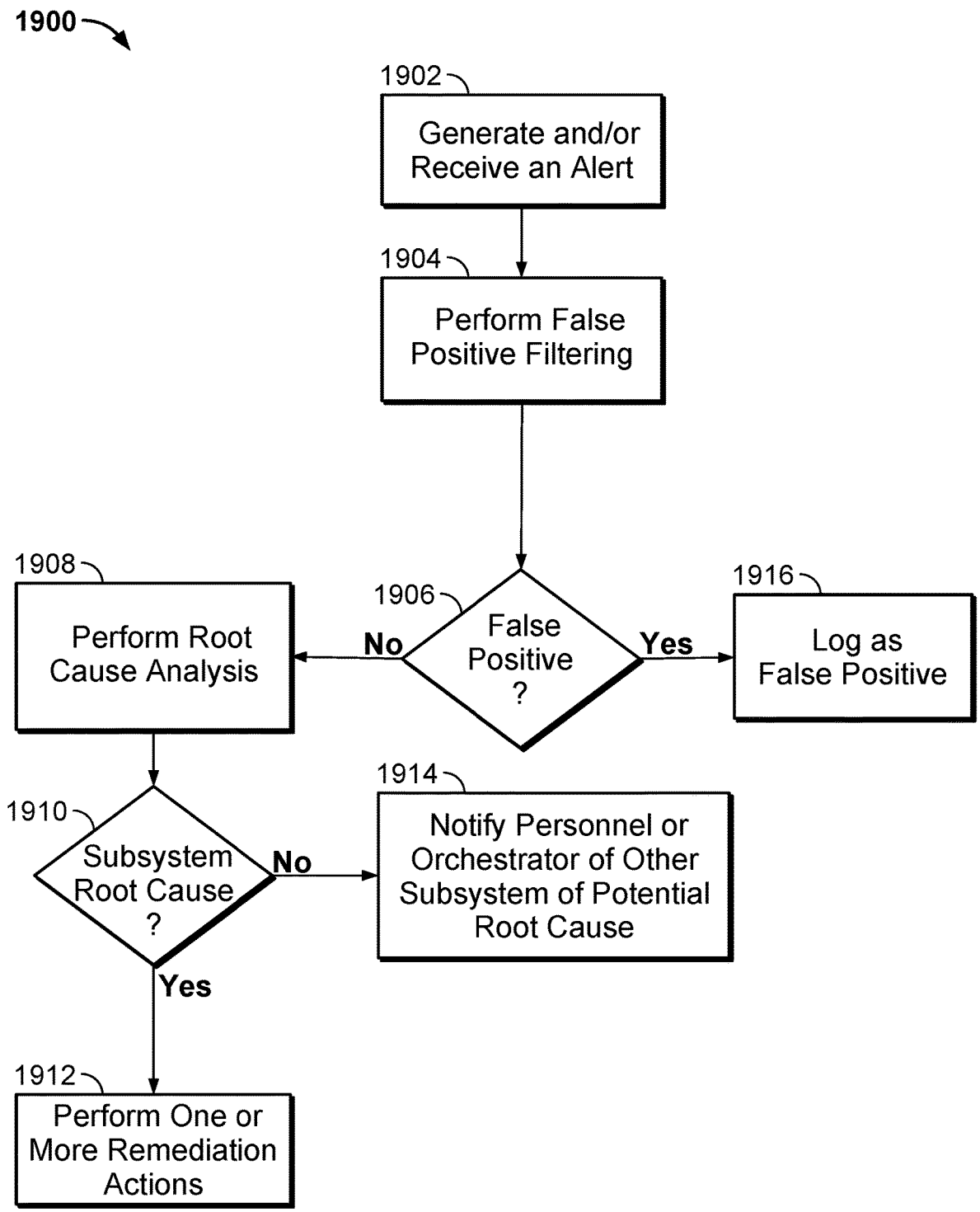
FIG. 19 is a flow chart illustrating a process for performing false positive filtering and root cause analysis in accordance with some embodiments.

FIG. 19 is a flow chart illustrating a process for performing false positive filtering and root cause analysis in accordance with some embodiments. In the example shown, process 1900 may be implemented by an orchestrator, such as orchestrators 121-125, 331-342, 453, 409, 412, 414, 416, 418, 420, 423, 425, 426, 533, 534, 620, 622, 625, 621, 732-740, 821-827. In some embodiments, process 1900 is implemented by a conductor, such as 130, 330, 430, 530, 630, 730, 1140, 1230, 1300.

At 1902, an alert is generated and/or received. In some embodiments, the alert is generated by an orchestrator associated with a subsystem. The orchestrator may be monitoring a behavior associated with the subsystem and trigger an alert when the behavior associated with the subsystem deviates from a normal behavior associated with the subsystem. As described above, the orchestrator may use a histogram behavior analysis algorithm to determine that the behavior associated with the subsystem deviates from the normal behavior associated with the subsystem.

One or more alerts may be received from one or more distributed orchestrators that are associated with one or more corresponding subsystems. The orchestrator may receive the alert from a distributed orchestrator in the event the distributed orchestrator determines that the behavior of the subsystem with which the distributed orchestrator is associated deviates from a normal behavior. The distributed orchestrator may also use the histogram behavior analysis algorithm to determine that the behavior associated with the subsystem to which it is associated, deviates from the normal behavior of the subsystem. In some embodiments, the alert is received from an orchestrator that is associated with a security subsystem.

At 1904, false positive filtering is performed. The orchestrator may use an algorithm, such as a scoring algorithm, to determine whether the alert is a true positive or a false positive. The orchestrator may store a local data model that is comprised of a plurality of data elements. Some of the data elements are data elements associated with the subsystem with which the orchestrator is associated. Some of the data elements are data elements associated with the one or more corresponding subsystems with which the one or more distributed orchestrators are associated.

Each of the one or more distributed orchestrators has its own corresponding local data model. The orchestrator is configured to subscribe to updates to the corresponding local data models of the one or more distributed orchestrators and vice versa. That is, when the value of a data element of a first subsystem is updated, the orchestrator associated with the first subsystem may provide the updated value to one or more other orchestrators. Thus, the orchestrator's local data model is up-to-date.

The orchestrator may analyze the data element values of its local data model generate corresponding scores for each of the data elements. A data element of the orchestrator's local data model may be associated with another subsystem. For a data element that is associated with another subsystem and the orchestrator automatically receives (e.g., subscribes) updates of the value of the data element, the local data model of the orchestrator already stores the latest value for the data element. This reduces the amount of time needed by the orchestrator to perform false positive filtering because the orchestrator already has the data element values that it use to determine whether or not the alert is indicative of a false positive or a true positive. For a data element that is associated with another subsystem and the orchestrator does not automatically receive updates of the value of the data element, the orchestrator may request the orchestrator associated with the other subsystem to provide a latest value for the data element. In some embodiments, the latest value may indicate a change associated with the other subsystem. A data element value may indicate that a change occurred. For example, the change may be the result of normal activity (e.g., a software upgrade) or the result of a natural failure associated with the other subsystem (e.g., power failure). The alert may be determined to be the result of a natural failure in the event contextual information associated with the alert matches a known pattern.

At 1906, it is determined whether the alert is a false positive. The orchestrator may use the corresponding scores for each of the data elements to determine whether the alert is indicative of a true positive or a false positive. For example, the orchestrator may sum the corresponding scores to determine a total score and compare the total score to one or more thresholds to determine whether the alert is indicative of a true positive or a false positive.

In the event the alert is determined to be a false positive, process 1900 proceeds to 1916 and the alert is filtered out as a non-actionable alert and logged as a false positive. In the event the alarm is determined not to be a false positive, i.e., the alert is a true positive, process 1900 proceeds to 1908.

At 1908, root cause analysis is performed. The orchestrator may implement a combination of one or more algorithms to perform root cause analysis. The orchestrator may analyze the data element values in its local data model to determine whether the contextual information surrounding the alert matches a known pattern. The known pattern may identify a root cause of the alert (e.g., whether the subsystem associated with the orchestrator is the root cause of the alert or whether another subsystem associated with a different orchestrator is the root cause of the alert.). In some embodiments, the pattern match identifies the subsystem associated with the orchestrator as the root cause of the alert. In some embodiments, the pattern match identifies another subsystem associated with a different orchestrator as the root cause of the alert.

The orchestrator may analyze the data element values in its local data model to determine that the contextual information surrounding the alert does not match a known pattern. When the contextual information surrounding the alert does not match a known pattern, the orchestrator may use an algorithm to determine a root cause of the alert.

After the initial alert is generated or received at 1902, one or more other alerts may be generated and/or received. The orchestrator may analyze the alerts to determine a root cause of the alert(s) by assigning scores to one or more subsystems. Scores may be assigned in different ways, such as a cost function, distance function, complexity of subsystem, etc. The orchestrator may determine the subsystem with the highest assigned score to be the root cause of the alert.

At 1910, it is determined whether a subsystem to which the orchestrator is associated, is the root cause of the alert. In the event the subsystem is determined to be the root cause of the alert, process 1900 proceeds to 1912 and one or more remediation actions are performed. In the event the subsystem is determined not to be the root cause of the alert, process 1900 proceeds to 1914 where personnel associated with the system is notified of a potential root cause of the alert(s) or the orchestrator associated with a subsystem determined to be the potential root cause of the alert(s) is notified. In response to the notification, the orchestrator may initiate one or more remediation actions.

Figure 20:
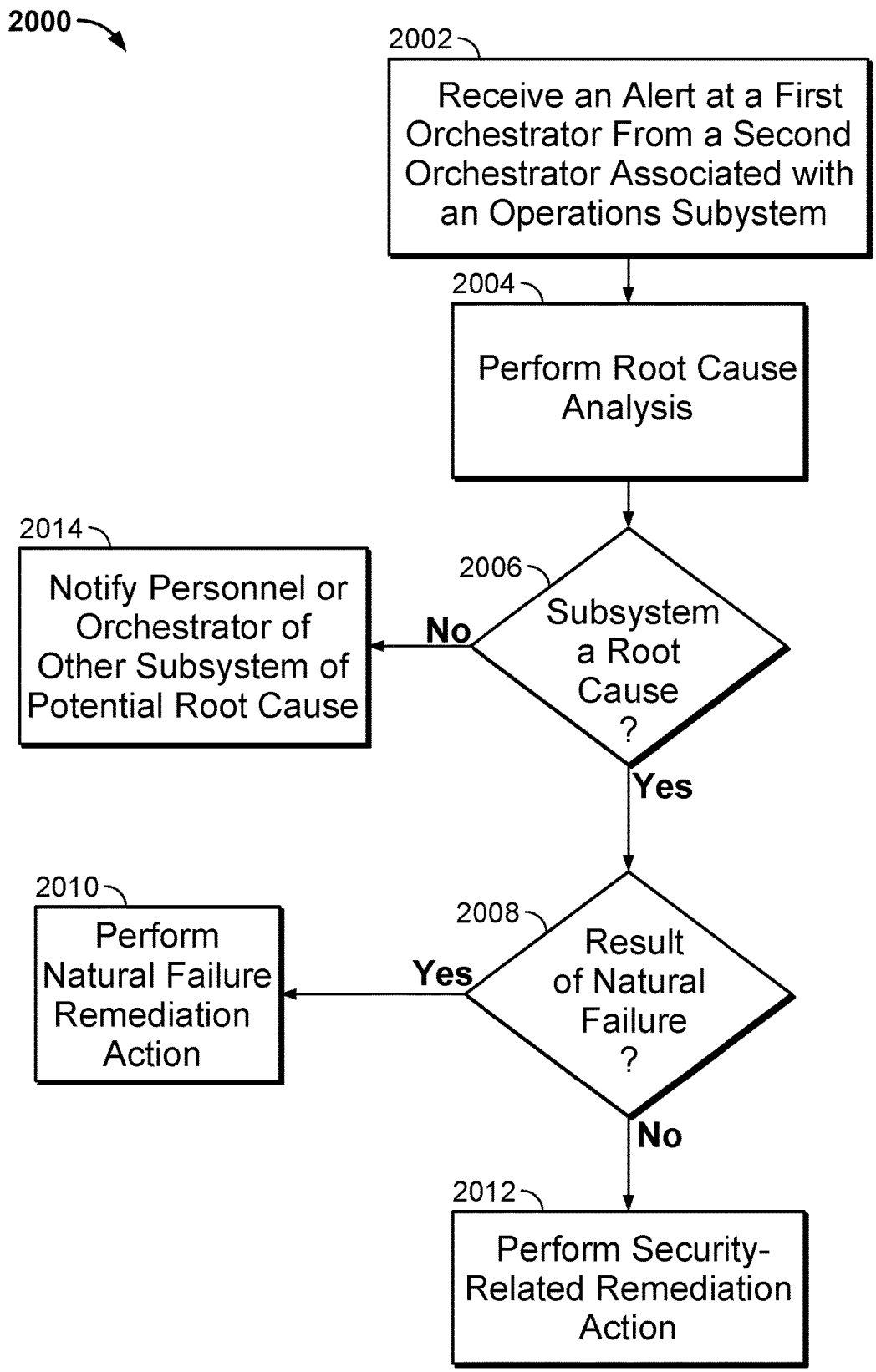
FIG. 20 is a flow chart illustrating a process for performing root cause analysis in accordance with some embodiments.

FIG. 20 is a flow chart illustrating a process for performing root cause analysis in accordance with some embodiments. In the example shown, process 2000 may be implemented by an orchestrator, such as orchestrators 121-125, 331-342, 453, 409, 412, 414, 416, 418, 420, 423, 425, 426, 533, 534, 620, 622, 625, 621, 732-740, 821-827. In some embodiments, process 2000 is implemented by a conductor, such as 130, 330, 430, 530, 630, 730, 1140, 1230, 1300.

At 2002, an alert is received at a first orchestrator associated with a first subsystem from a second orchestrator associated with an operations subsystem. The operations subsystem may be configured to monitor operations within the system that at least includes the first subsystem and the operations subsystem. The alert may indicate an operations problem associated with the first subsystem (e.g., abnormally high or low sensor reading, abnormal communications, abnormal bit error rate, abnormal temperature, etc.).

At 2004, root cause analysis is performed. The root cause analysis may be performed in a manner as described above. At 2006, it is determined whether the first subsystem is the root cause of the alert. In the event it is determined that the first subsystem is the root cause of the alert, then process 2000 proceeds to 2008. In the event it is determined that the first subsystem is not the root cause of the alert, then process 2000 proceeds to 2014 where personnel associated with the system is notified of a potential root cause of the alert(s) or the orchestrator associated with a subsystem determined to be the potential root cause of the alert(s) is notified. In response to the notification, the orchestrator may initiate one or more remediation actions.

At 2008, it is determined if the root cause of the alert is a result of a natural failure. In the event it is determined that the root cause of the alert is a result of a natural failure, then process 2000 proceeds to 2010 and a remediation action to address the natural failure is performed.

In some embodiments the remediation action to address the natural failure does not solve the problem. This generates another alert indicating a problem with subsystem A is received from the orchestrator associated with the operations subsystem. In such an embodiment, the root cause is then determined to be a result of a security problem.

In the event it is determined that the root cause of the alert is not a result of a natural failure, i.e., the root cause of the alert is a result of a security problem, then process 2000 proceeds to 2012 and a remediation action to address the security problem is performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a communication interface configured to communicate with one or more orchestrators associated with one or more subsystems of the system and/or one or more conductors associated with the one or more subsystems of the system; and
 a processor coupled with the communication interface, wherein the processor is configured to:
  receive one or more alerts from the one or more orchestrators and/or the one or more conductors;
  utilize one or more of an algorithm, an objective, and one or more constraints associated with the one or more orchestrators and/or the one or more conductors to determine that the one or more received alerts are not indicative of a false positive; and
  implement one or more remediation actions to address a root cause associated with the one or more alerts, wherein the root cause associated with the one or more alerts is resolved using a corresponding cost function associated with the one or more subsystems.

2. The system of claim 1, wherein the one or more alerts is indicative of a behavior change associated with at least one of the one or more subsystems.

3. The system of claim 1, wherein at least one of the one or more orchestrators and/or the one or more conductors is associated with an artificial intelligence system.

4. The system of claim 1, wherein a first orchestrator of the one or more orchestrators and/or the one or more conductors associated with a first subsystem of the one or more subsystems is configured to provide an output to, and/or receive an input from, an artificial intelligence system.

5. The system of claim 4, wherein the artificial intelligence system is configured to determine whether there is a problem with the first subsystem.

6. The system of claim 4, wherein a first alert of the one or more alerts is generated in response to the first orchestrator or a first conductor, and the artificial intelligence system determining that the first subsystem is exhibiting abnormal behavior or a detected behavior matches a known pattern of undesired behavior.

7. The system of claim 1, wherein the processor is configured to:
receive information about one or more current types of attacks from an orchestrater and/or a conductor that is associated with an external information source;
update the algorithm, the objective, and/or the one or more constraints based on the received information; and
determine, using the updated algorithm, that the one or more received alerts are not indicative of the false positive.

8. The system of claim 1, wherein the processor is configured to:
receive information about one or more current types of attacks from an orchestrater and/or a conductor that is associated with an external information source;
update the algorithm, the objective, and/or the one or more constraints based on the received information; and
utilize the updated algorithm to generate a first alert of the one or more alerts.

9. The system of claim 8, wherein the processor is configured to determine that the first alert and the one or more received alerts match a known pattern of alerts.

10. The system of claim 1, wherein the algorithm associated with the processor is part of a machine learning model.

11. The system of claim 10, wherein an output of the machine learning model determines the one or more remediation actions to be implemented to address the root cause associated with the one or more alerts.

12. The system of claim 1, wherein the processor is further configured to determine a potential root cause associated with the one or more received alerts.

13. The system of claim 12, wherein the processor is configured to utilize an AI system to determine which subsystem of the one or more subsystems is the potential root cause associated with the one or more received alerts.

14. The system of claim 13, wherein the AI system is configured to determine one or more remediation actions that are to be implemented to address the potential root cause associated with the one or more received alerts.

15. The system of claim 12, wherein the potential root cause associated with the one or more received alerts is identified as a cyber-attack.

16. The system of claim 12, wherein to determine the potential root cause associated with the one or more received alerts, the processor is configured to utilize a constraint of the one or more constraints to determine how to select the potential root cause associated with the one or more received alerts.

17. The system of claim 16, wherein a subsystem with a highest cost value among the one or more subsystems is selected and a remediation action associated with the selected subsystem is caused to be implemented.

18. The system of claim 17, wherein in response to determining that a problem associated with the one or more received alerts is not solved, a second subsystem with a next highest cost value is selected and a remediation action associated with the second subsystem is caused to be implemented.

19. The system of claim 17, wherein in response to determining that a problem associated with the one or more received alerts is not solved, a second subsystem with a next lowest cost value is selected and a remediation action associated with the second subsystem is caused to be implemented.

20. The system of claim 16, wherein a subsystem with a lowest cost value among the one or more subsystems is selected and a remediation action associated with the selected subsystem is caused to be implemented.

21. The system of claim 16, wherein a subsystem with a highest frequency of alerts among the one or more subsystems is selected and a remediation action associated with the selected subsystem is caused to be implemented.

22. The system of claim 21, wherein in response to determining that a problem associated with the one or more received alerts is not solved, a second subsystem with a next highest frequency of alerts is selected and a remediation action associated with the second subsystem is caused to be implemented.

23. The system of claim 1, wherein at least one of the one or more orchestrators, and/or conductor(s) is associated with a human operator.

24. The system of claim 1, wherein at least one of the one or more alerts is resolved using a known remediation action based on matching a previous pattern.

25. A method, comprising:
receiving one or more alerts from one or more orchestrators associated with one or more subsystems of a system and/or one or more conductors associated with the one or more subsystems of the system;
utilizing one or more of an algorithm, an objective, and one or more constraints associated with the one or more orchestrators and/or the one or more conductors to determine that the one or more received alerts are not indicative of a false positive; and
implementing one or more remediation actions to address a root cause associated with the one or more alerts, wherein the root cause associated with the one or more alerts is resolved using a corresponding cost function associated with the one or more subsystems.

26. A computer program product, the computer program product being embodied in a non-transitory computer readable storage medium and comprising computer instructions for:
receiving one or more alerts from one or more orchestrators associated with one or more subsystems of a system and/or one or more conductors associated with the one or more subsystems of the system;
utilizing one or more of an algorithm, an objective, and one or more constraints associated with the one or more orchestrators and/or the one or more conductors to determine that the one or more received alerts are not indicative of a false positive; and
implementing one or more remediation actions to address a root cause associated with the one or more alerts, wherein the root cause associated with the one or more alerts is resolved using a corresponding cost function associated with the one or more subsystems.

* * * * *